(12) United States Patent
Hayes et al.

(10) Patent No.: US 9,118,644 B2
(45) Date of Patent: Aug. 25, 2015

(54) METHOD FOR DIRECTING REQUESTS TO TRUSTED RESOURCES

(75) Inventors: John W Hayes, Reno, NV (US);
Christopher L Hamlin, San Jose, CA (US)

(73) Assignee: BlackRidge Technology Holdings, Inc., Reno, NV (US)

( * ) Notice: Subject to any disclaimer, the term of this patent is extended or adjusted under 35 U.S.C. 154(b) by 0 days.

(21) Appl. No.: 13/573,238

(22) Filed: Aug. 30, 2012

(65) Prior Publication Data

US 2013/0133045 A1 May 23, 2013

Related U.S. Application Data

(63) Continuation-in-part of application No. 11/242,637, filed on Sep. 30, 2005, now Pat. No. 8,346,951, and a continuation-in-part of application No. 13/373,586, filed on Nov. 18, 2011, now Pat. No. 8,572,697.

(51) Int. Cl.
*G06F 15/16* (2006.01)
*H04L 29/06* (2006.01)
*H04L 29/08* (2006.01)

(52) U.S. Cl.
CPC ............ *H04L 63/08* (2013.01); *H04L 63/0807* (2013.01); *H04L 63/1441* (2013.01); *H04L 67/1023* (2013.01); *H04L 67/1029* (2013.01); *H04L 63/0254* (2013.01); *H04L 63/1458* (2013.01)

(58) Field of Classification Search
USPC .................................................. 709/226, 229
See application file for complete search history.

(56) References Cited

U.S. PATENT DOCUMENTS

| | | | | |
|---|---|---|---|---|
| 7,024,460 | B2 * | 4/2006 | Koopmas et al. | 709/206 |
| 2006/0059565 | A1 * | 3/2006 | Green et al. | 726/27 |
| 2008/0155665 | A1 * | 6/2008 | Ruppert et al. | 726/5 |

* cited by examiner

*Primary Examiner* — Afshawn Towfighi
(74) *Attorney, Agent, or Firm* — Thomas N. Giaccherini

(57) ABSTRACT

The present invention enables an enterprise to move from an implicitly trusted resource pool to an explicitly authenticated resource pool. Trust information is generally conveyed whenever a new resource is added to the pool and trust information is revoked when a resource is removed from the pool or is unable to provide its advertised resources. The dynamic, event driven conveyance of trust information is particularly important in highly virtualized environments where virtual resources are dynamically scaled up and down in response to resource demand.

27 Claims, 48 Drawing Sheets

Trust Director receives Authentication Objects from Each Network Resource

A statistical object is the output of a function.
The function points to an output string of values
based on an input A graph showing the approximate probability of at least two people sharing a birthday amongst a certain number of people Remote System has a copy of each Certificate that is expected to be used The Solution:
Create a representation of each Certificate, called a Cryptographic Hash, which is only 32 bits long, and send to the Remote System The Solution, in Greater Detail:

Ben needs to communicate with the Remote System

Remote System receives Ben's communication

Statistical Object Matcher

Accumulated Statistical Object Selector

Original Object Identifier

Figure 41
Ben's first communication fails.
Ben does not receive response to his first communication to the Remote System, so he tries again:
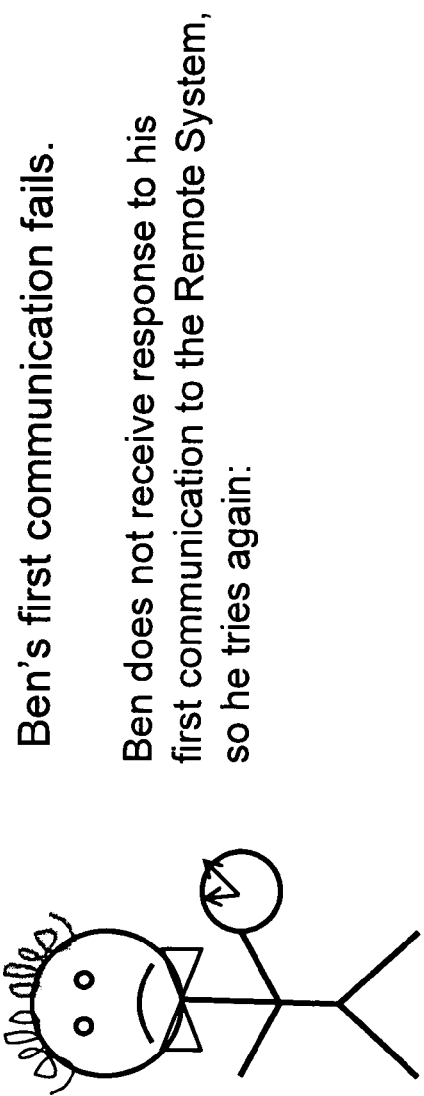
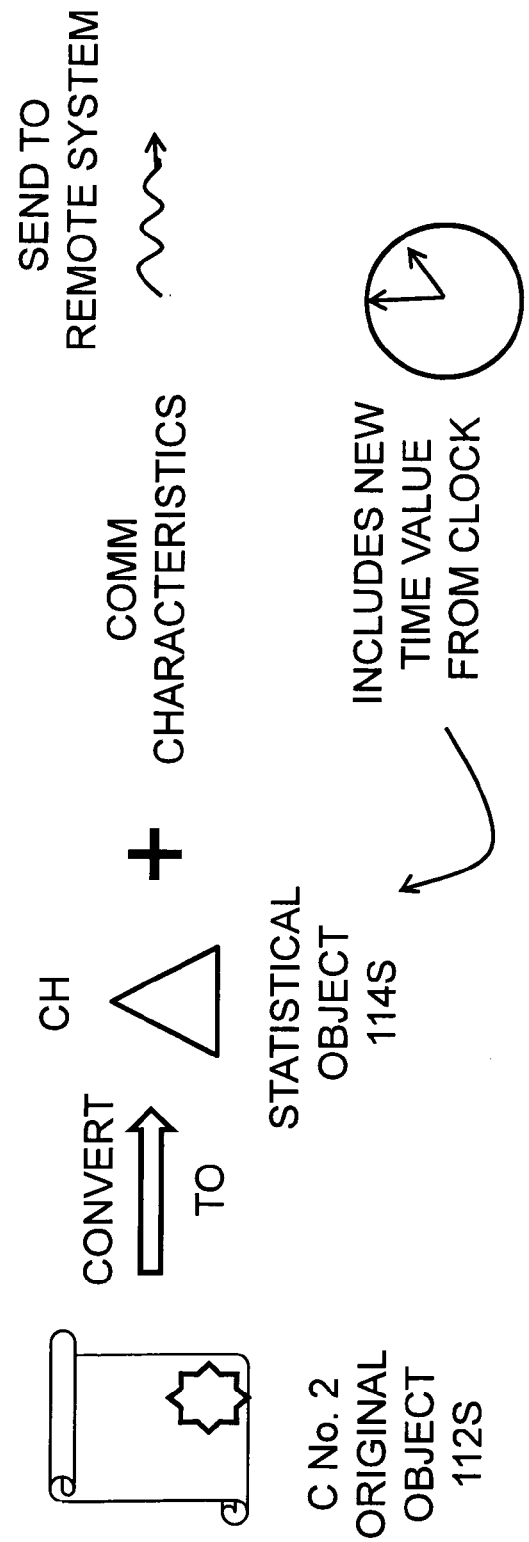

Figure 42
Second Try
Now that time has passed, the clock value used to generate statistical objects has changed.
The new statistical objects are now:
| | | | NEW SO 114S |
|---|---|---|---|
| No. 1 | 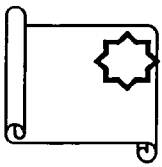 | 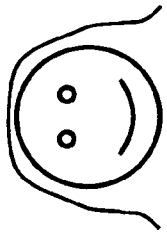 Sally | 84256 |
| No. 2 | 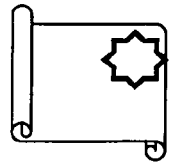 | 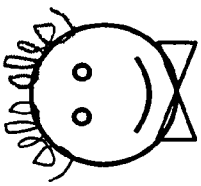 Ben | 84256 |
| No. 3 | | 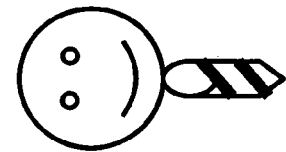 Greg | 10845 |

Ben sends a second communication:

A match is found:

Greg & Sally are discarded!

METHOD FOR DIRECTING REQUESTS TO TRUSTED RESOURCES

CROSS-REFERENCE TO RELATED PENDING U.S. PATENT APPLICATIONS, CLAIMS FOR PRIORITY & INCORPORATION BY REFERENCE

The Present Patent Application is a Continuation-in-Part Patent Application, based on:
U.S. Ser. No. 11/242,637, entitled Method for First Packet Authentication, filed on 30 Sep. 2005; and
U.S. Ser. No. 13/373,586, entitled Method for Statistical Object Identification, filed on 18 Aug. 2011.

The Applicants hereby claim the benefit of priority under 35 USC Sections 119 and/or 120 for any subject matter which is commonly disclosed in the Present Patent Application and in U.S. Ser. No. 11/242,637 and in U.S. Ser. No. 13/373,586.

The text and drawings of U.S. Ser. No. 11/242,637 are hereby incorporated by reference.

FEDERALLY SPONSORED RESEARCH OR DEVELOPMENT

None.

FIELD OF THE INVENTION

The present invention relates to computer, information appliance and network security systems. More particularly, one embodiment of the present invention pertains to methods for directing resource requests from a client to one of a plurality of trusted resources.

BACKGROUND OF THE INVENTION

Data centers are no longer relying on rows and rows of fixed function servers, with each server running a single application. Today, data centers rely heavily on virtualization, enabling a single server to run multiple instances of operating systems and their applications concurrently. This enables data centers to dynamically allocate resources in response to demand. These dynamic resources include primarily applications and storage, and scale up and scale down in response to the needs of the clients accessing them. In advanced architectures, if the capacity of the data center is reached, additional virtual resources outside of the data center can also be used. In all of these cases, the use of virtualized resources is unnoticed and undetectable to the network clients. The virtual resources are indistinguishable from a non-virtualized physical resource. To access these virtual resources, directors and load balancers are used to steer and distribute resource requests to the various resources.

Before virtualization, each server was physically provisioned by an IT administrator and was trusted to deliver its advertised resource. After virtualization, a server could deliver many different resources, which are now independent of the physical server that is delivering the resource. The ability of pools of servers to deliver virtualized resources introduces new paths for attack and compromise of resources and resource requesters. Among these new paths for attack are insuring that when a resource is requested, that resource is being delivered by an authentic, trusted service and not an imposter. The presence of an imposter server is not necessarily the result of a malevolent action; this can also be cause by mis-configuration or the lack of proper re-configuration after a scale down event of virtual resources. A scale down event is when some number of virtual resources is decommissioned. The development of such a mechanism would constitute a major technological advance, and would satisfy long felt needs and aspirations in the network security industry.

SUMMARY OF THE INVENTION

The present invention takes a network request and directs it to one of a group of resources that can satisfy the request. This group of resources has been authenticated to insure that they are in fact authentic resources who can satisfy requests. In an advanced form, the requesting client is authenticated prior to selecting one of the authenticated resources. The result is that a resource request from an authenticated network client that is authorized to access the requested resource is directed to one of a group of authenticated network resources. This insures that an authenticated, authorized request is satisfied for an authenticated resource.

If one of the group of authenticated resources becomes unavailable, its authentication is simply revoked which prevents new resource requests from being directed to it until it is again capable of satisfying the requests and has re-authenticated itself. If a network resource presents itself and is unable to authenticate itself, no resource requests will be sent to the unauthenticated network resource.

An appreciation of the other aims and objectives of the present invention and a more complete and comprehensive understanding of this invention may be obtained by studying the following description of a preferred embodiment, and by referring to the accompanying drawings.

A BRIEF DESCRIPTION OF THE DRAWINGS

Figure 36:
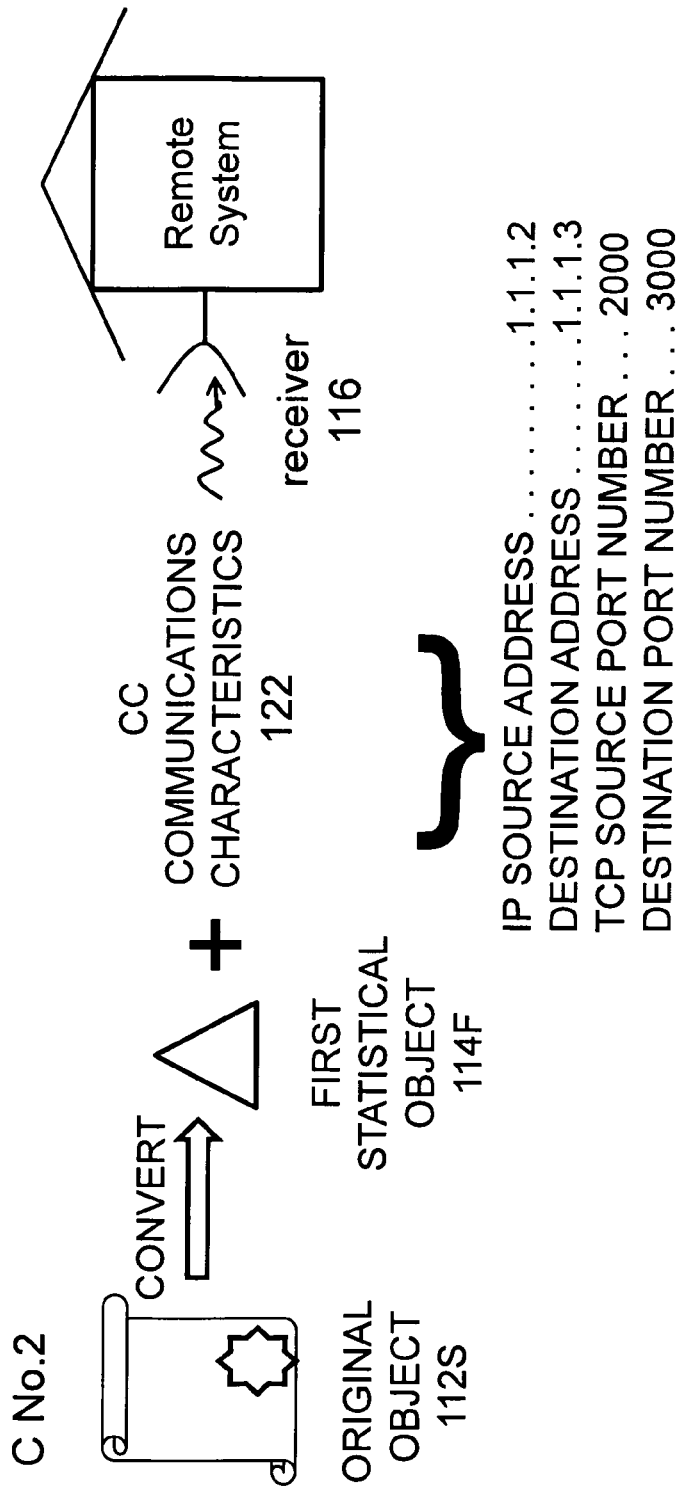

FIG. 36 furnishes a view of Ben's first communication with the remote system.

Figure 37:
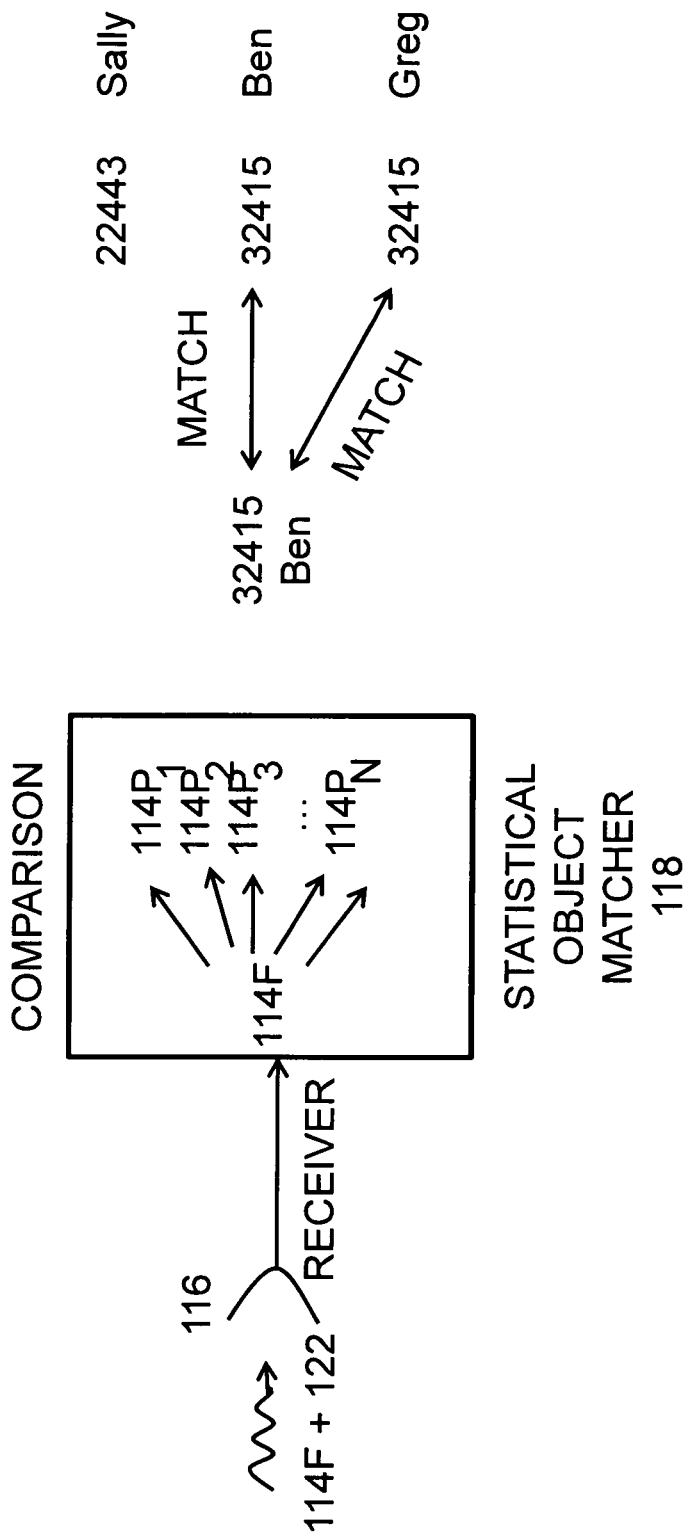

FIG. 37 depicts the comparison process that occurs within a statistical object matcher.

Figure 38:
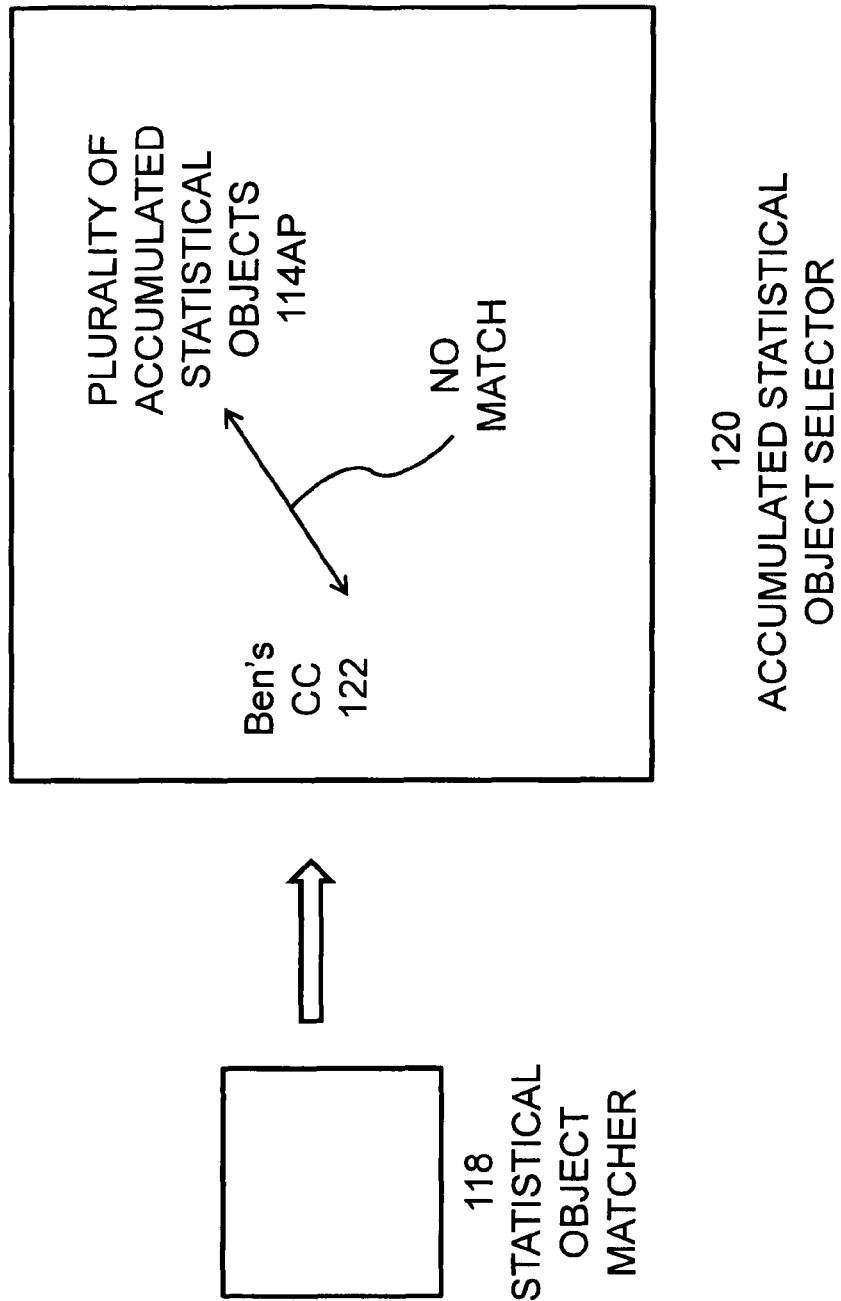

FIG. 38 illustrates the role of an accumulated statistical object selector.

Figure 39:
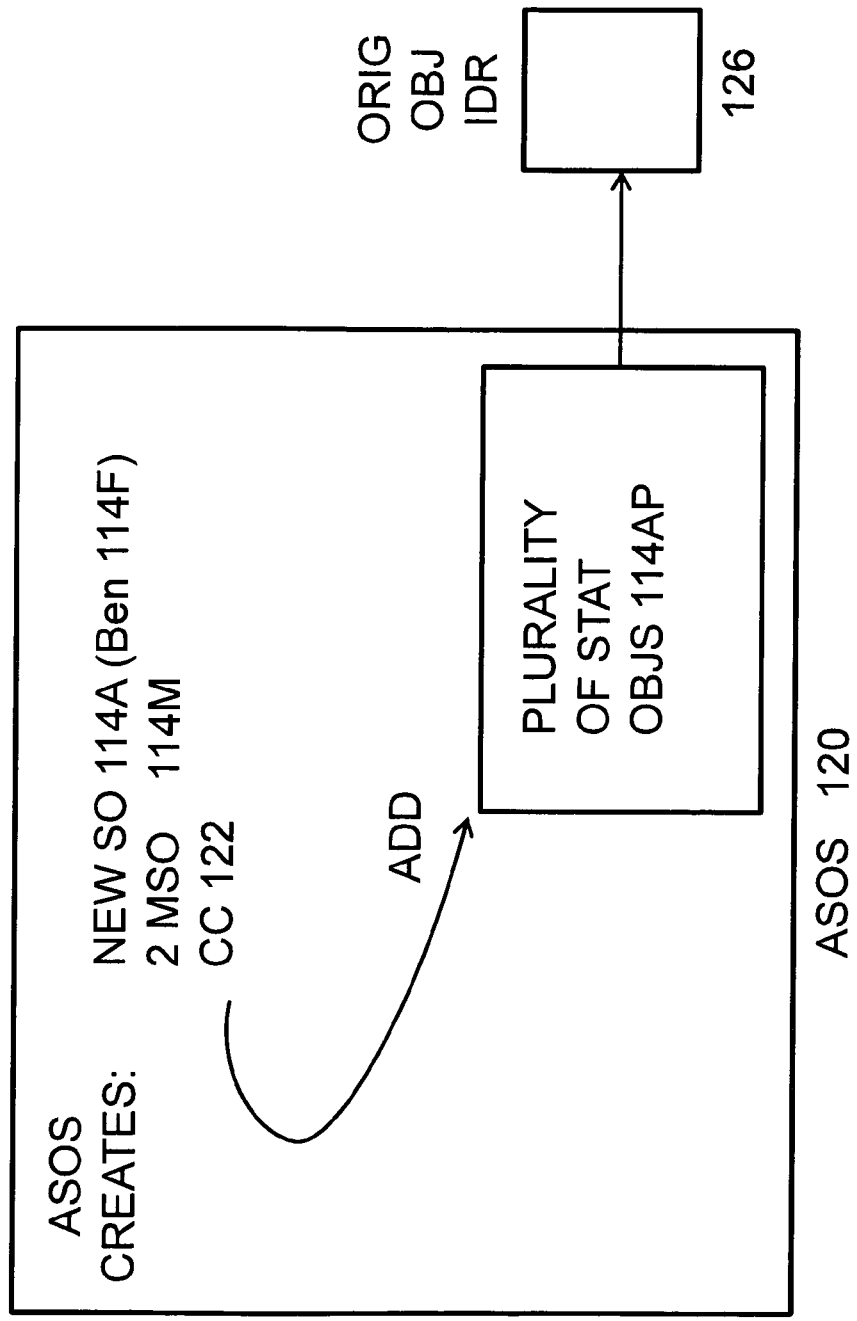

FIG. 39 illustrates the function of an accumulated statistical object selector.

Figure 40:
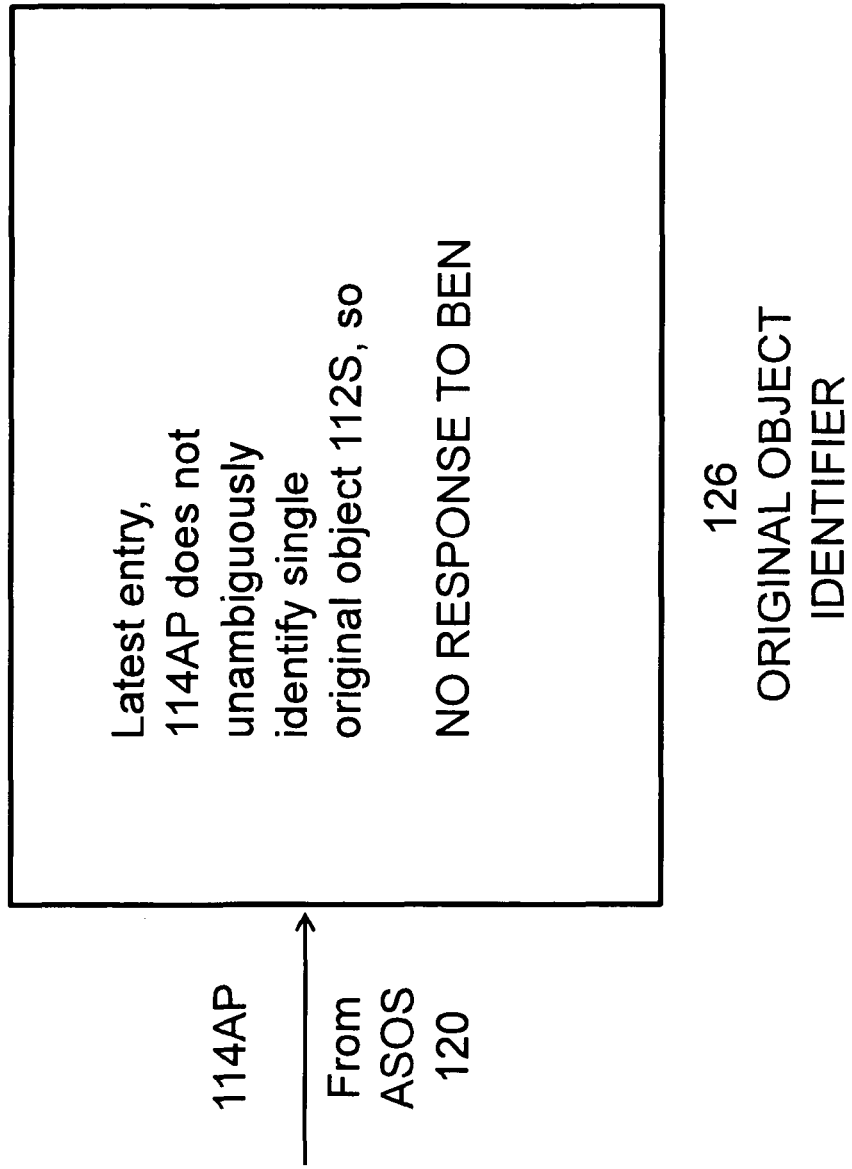

FIG. 40 illustrates the task of an original object identifier.

FIG. 41 shows that Ben's first communication has failed to be authenticated.

FIG. 42 supplies a schematic view of Ben's second attempt to communicate with the remote system.

Figure 43:
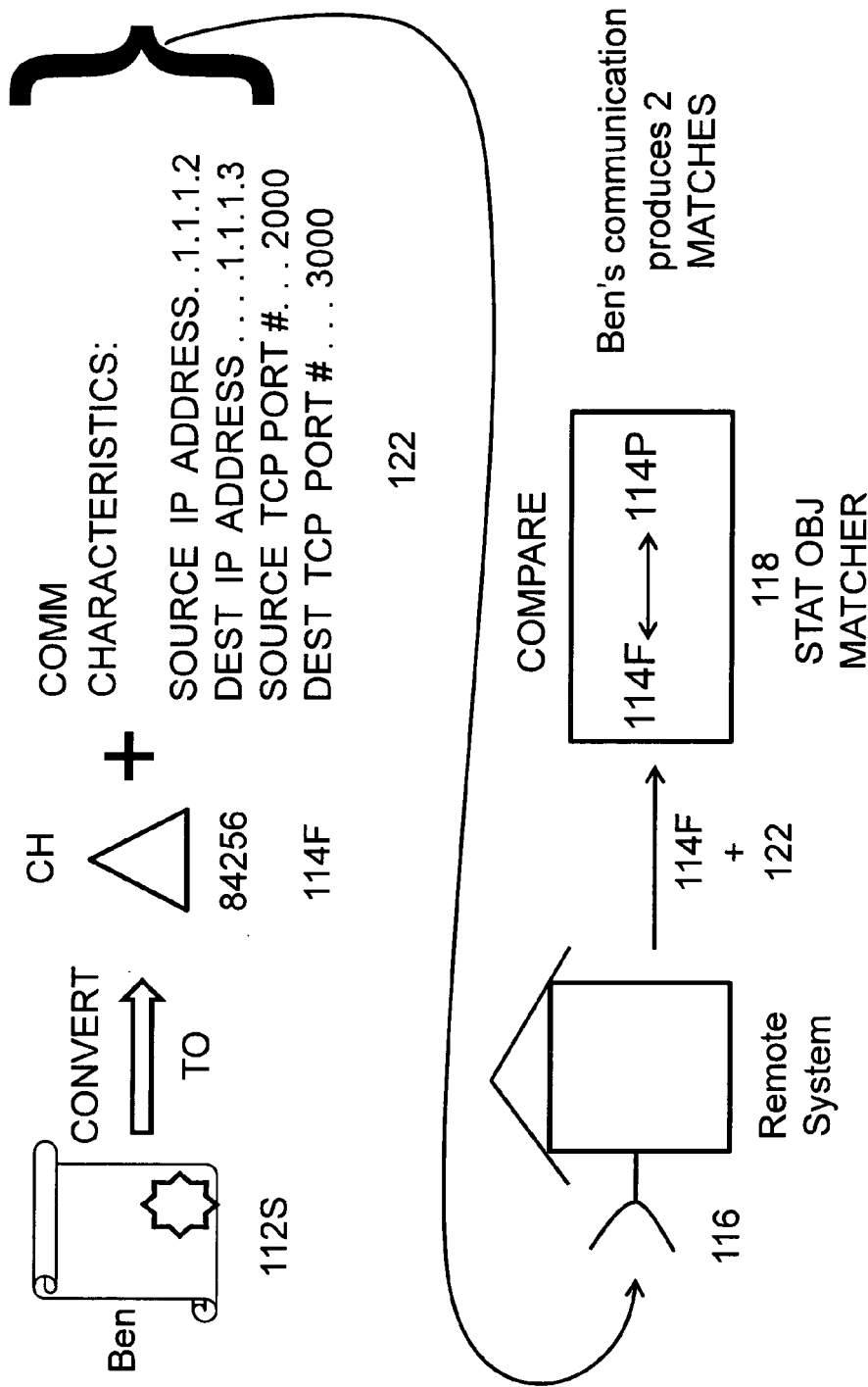

FIG. 43 depicts the second communication, and the resulting match that is produced in the statistical object matcher.

Figure 44:
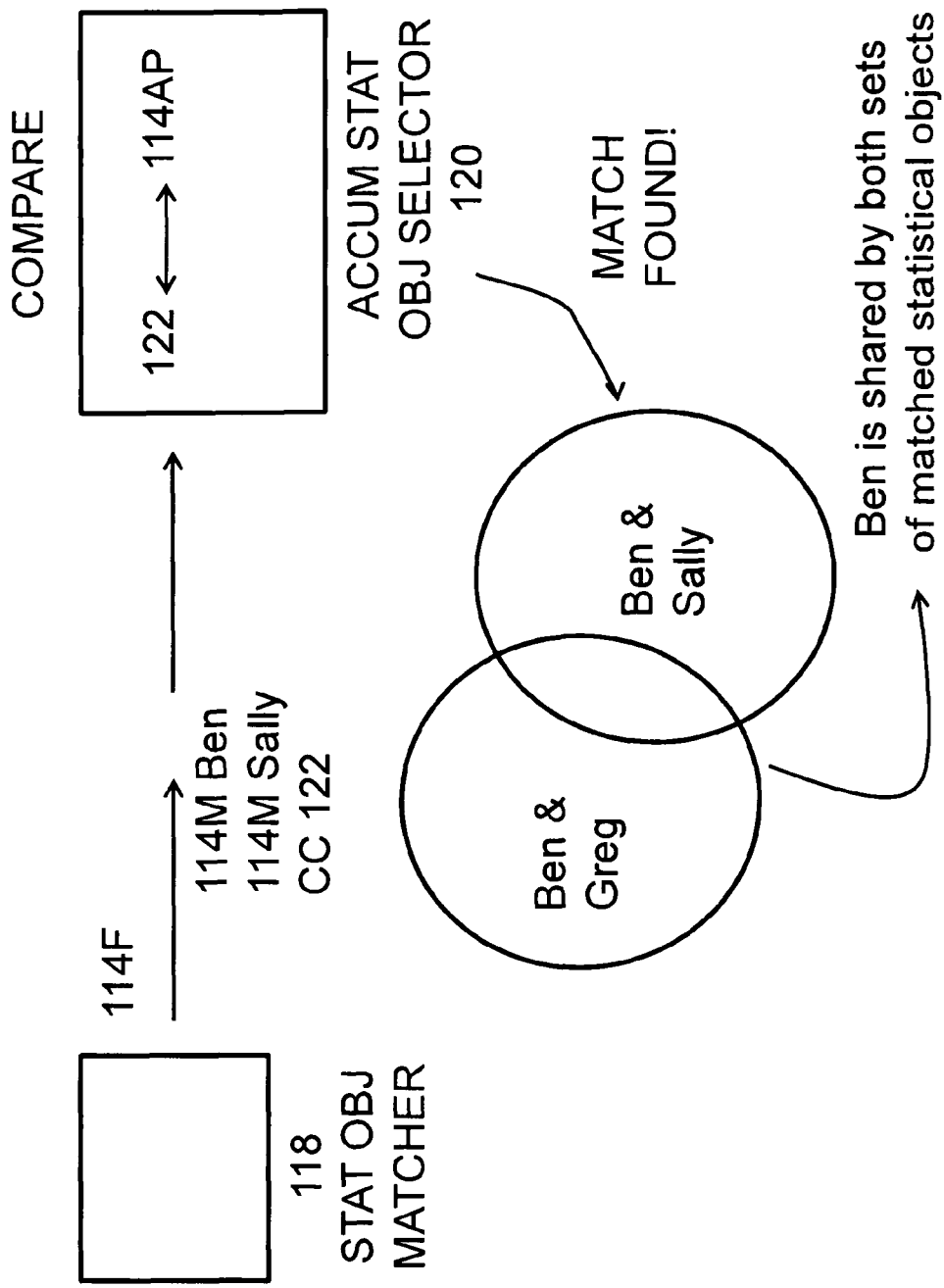

FIG. 44 illustrates the process of finding a match.

Figure 45:
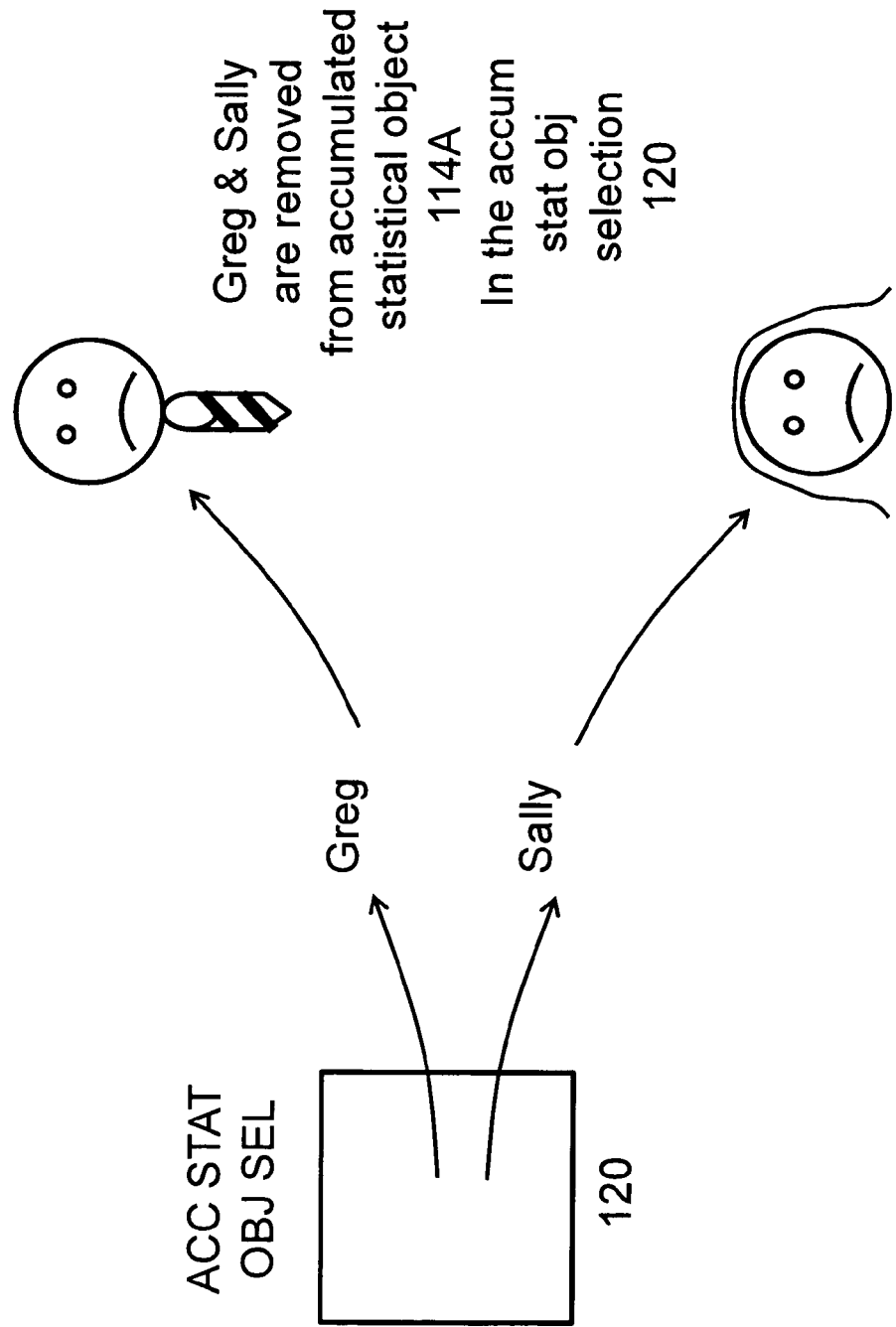

FIG. 45 shows how the accumulated statistical object selector discards statistical objects that do not lead to an authenticating match.

Figure 46:
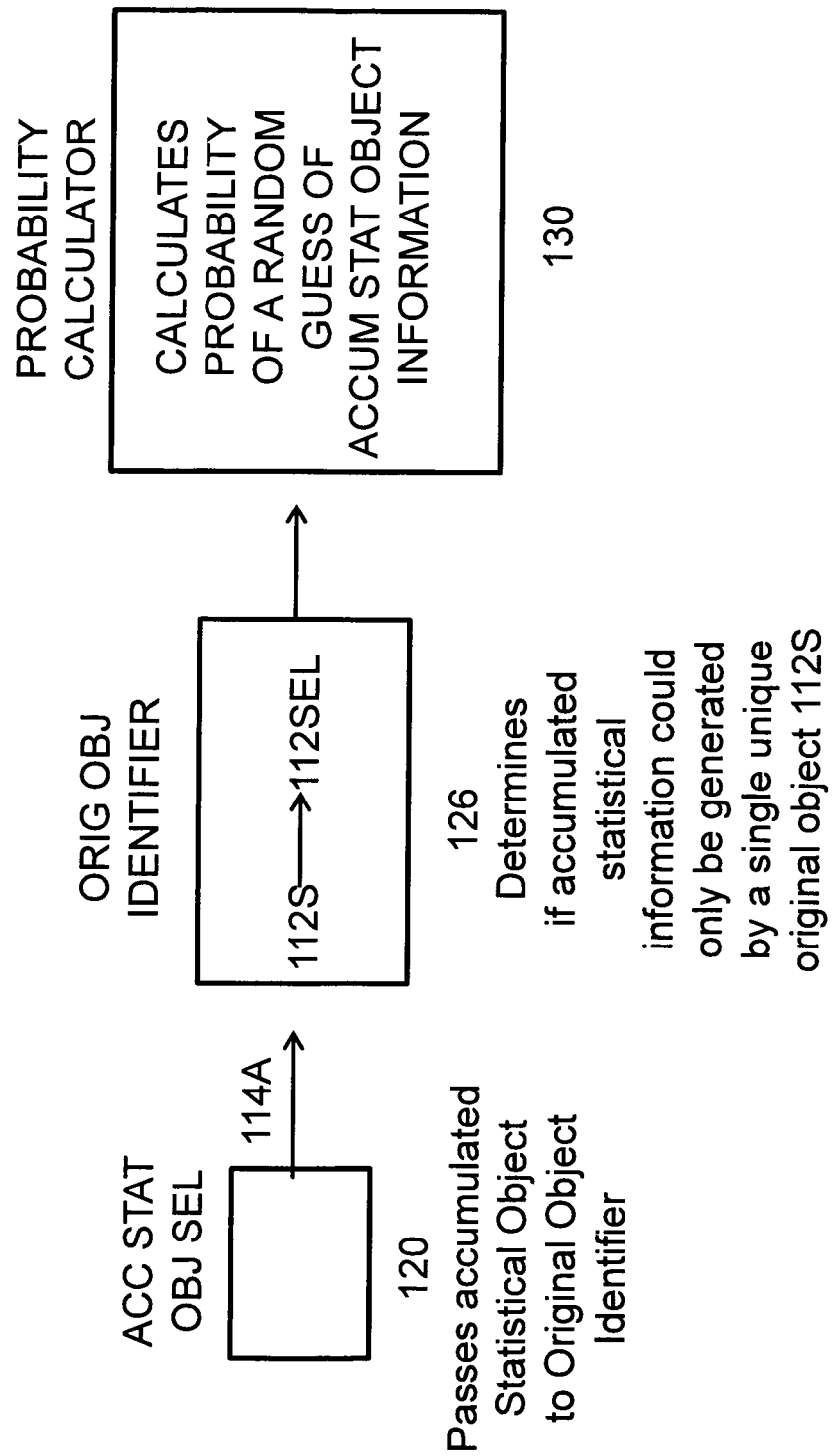

FIG. 46 furnishes a view of a probability calculator, which computes the probability of a successful guess of accumulated statistical object information.

Figure 47:
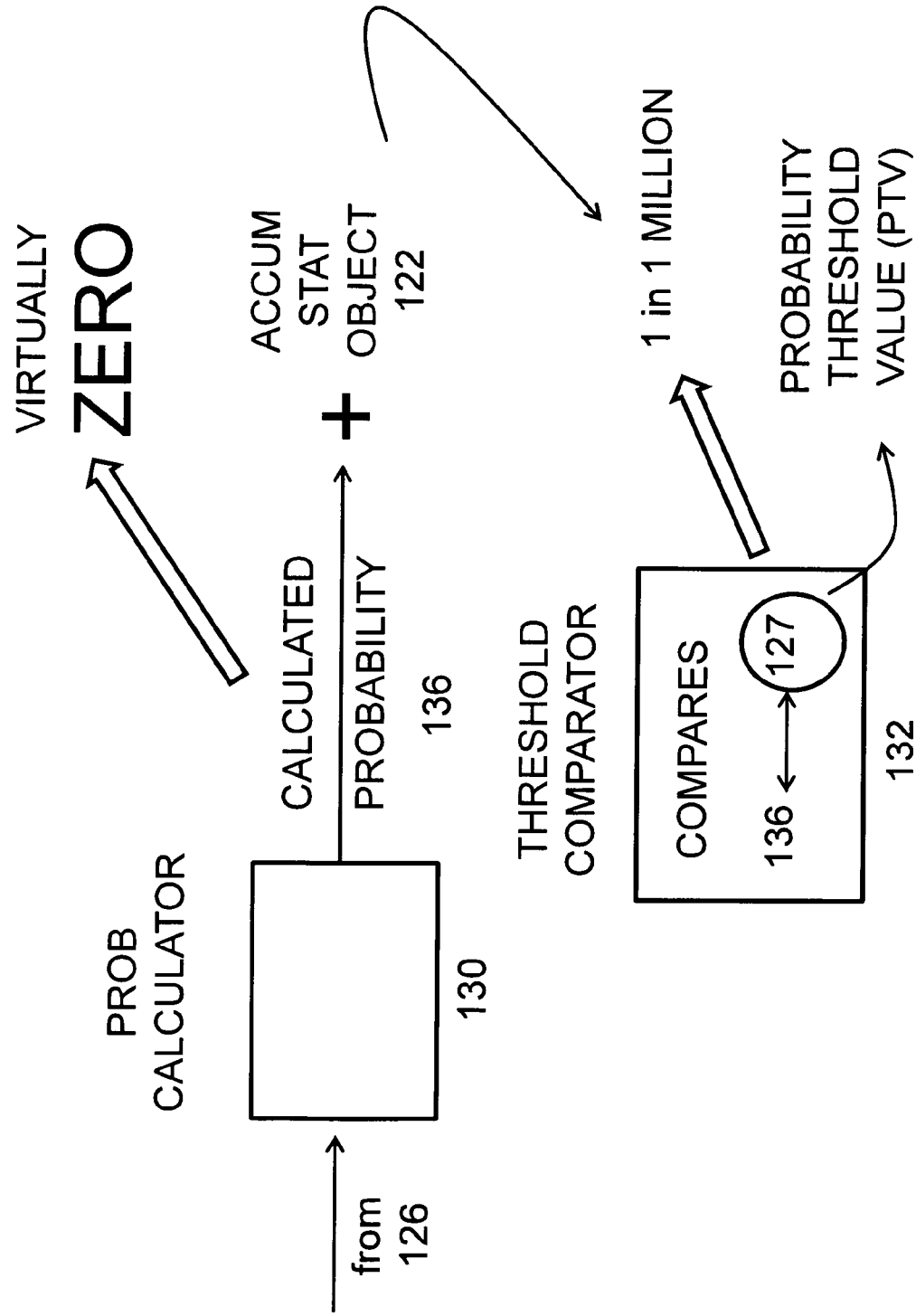

FIG. 47 reveals the function of a threshold comparator, which compares the calculated probability to a probability threshold value.

Figure 48:
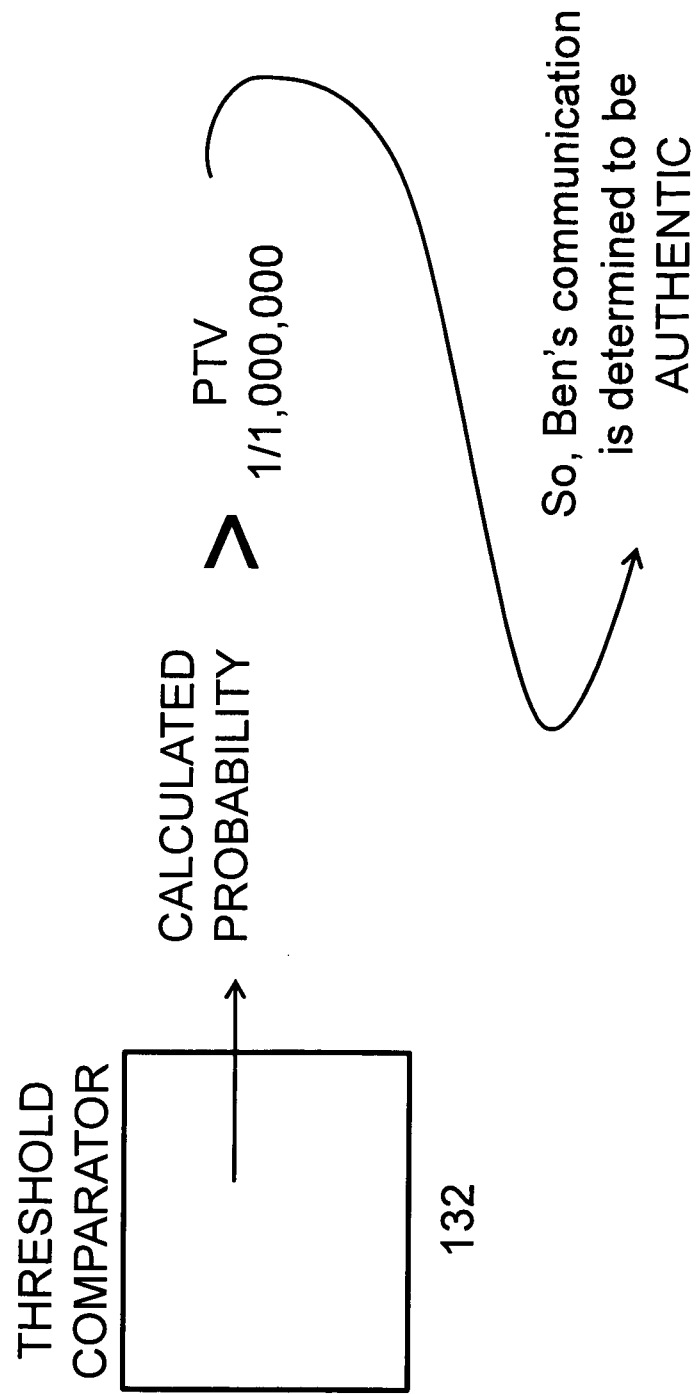

FIG. 48 exhibits the final result, the authentication of Ben's second communication.

A DETAILED DESCRIPTION OF PREFERRED & ALTERNATIVE EMBODIMENTS

I. Overview of the Invention

One embodiment of the present invention enables an enterprise to move from an implicitly trusted resource pool to an explicitly authenticated resource pool. An implicitly trusted resource pool is a pool of resources available via network accesses that is trusted when it is installed and configured, but does not explicitly convey trust to resource management entities which are responsible for directing requests to resource pools. An explicitly trusted resource pool is a pool of resources that explicitly conveys trust information periodically and on an event driven basis. Trust information is generally conveyed whenever a new resource is added to the pool and trust information is revoked when a resource is removed from the pool or is unable to provide its advertised resources. The dynamic, event driven conveyance of trust information is particularly important in highly virtualized environments where virtual resources are dynamically scaled up and down in response to resource demand. As new resources become available, network load balancers distribute authenticated resource requests to the new resources. The trust in the resources is based on the trust in the virtualization system and the correct configuration of both the virtualization system manager and the network load balancer. Without the present invention, there is no direct authentication of the network resources themselves.

Networks today do not use authentication as part of their packet and session processing. They rely in an implicit trust of the network and infrastructure. This lack of authentication presents an opportunity for bad actors to install rogue devices and applications within an implicitly trusted network. Once installed, these rogue devices and applications can go undetected because they are implicitly trusted as an authentic device or application. With the present invention, each network device, resource and application must periodically provide authentication credentials to the trust director, making the authentication of network resources explicit thus providing explicit trust in those authenticated resources.

The present invention may also authenticate resource requests before directing them to one of a number of resources that have been authenticated. This provides a complete end-to-end system where authenticated requests are directed to trusted resources. The present invention is designed to operate in heterogeneous hypervisor and virtualization management environments. Datacenters using the present invention are not limited to using a single hypervisor vendor or hypervisor management system. For instance, a deployable datacenter may be based on one hypervisor system, while a larger fixed datacenter may be based on a different hypervisor system. With the present invention, authenticated requests can be directed to authenticated resource, without regard to the underlying hypervisor system, increasing both the trust and the flexibility of the network resources.

With the development of Transport Access Control (TAC) and TAC's ability to perform authentication on the first packet of a TCP session establishment request (TCP-SYN), authentication can be accomplished without first requiring the establishment of a TCP session. This greatly strengthens the security of a network resources protected by TAC by providing strong authentication of the requestor's identity before establishing a TCP session. TAC uses statistical objects, which are cryptographic hashes of keying material associated with an identity and various clocking material to enable expiration and uniqueness amongst statistical objects. Statistical objects are used in place of other identity certificates because they require fewer bits to communicate. This is important when using communications channels with limited bandwidth. The access policies to resources protected by TAC are based on the identity conveyed by TAC. This is the first step in providing explicit trust. The network resources beyond TAC policy enforcement point are still only implicitly trusted; there is no mechanism to provide explicit trust and authentication of those network resources. Furthermore, since network resources are passive and accept resource requests that are directed to them, there is no present mechanism to convey trust or authentication information.

Figure 1:
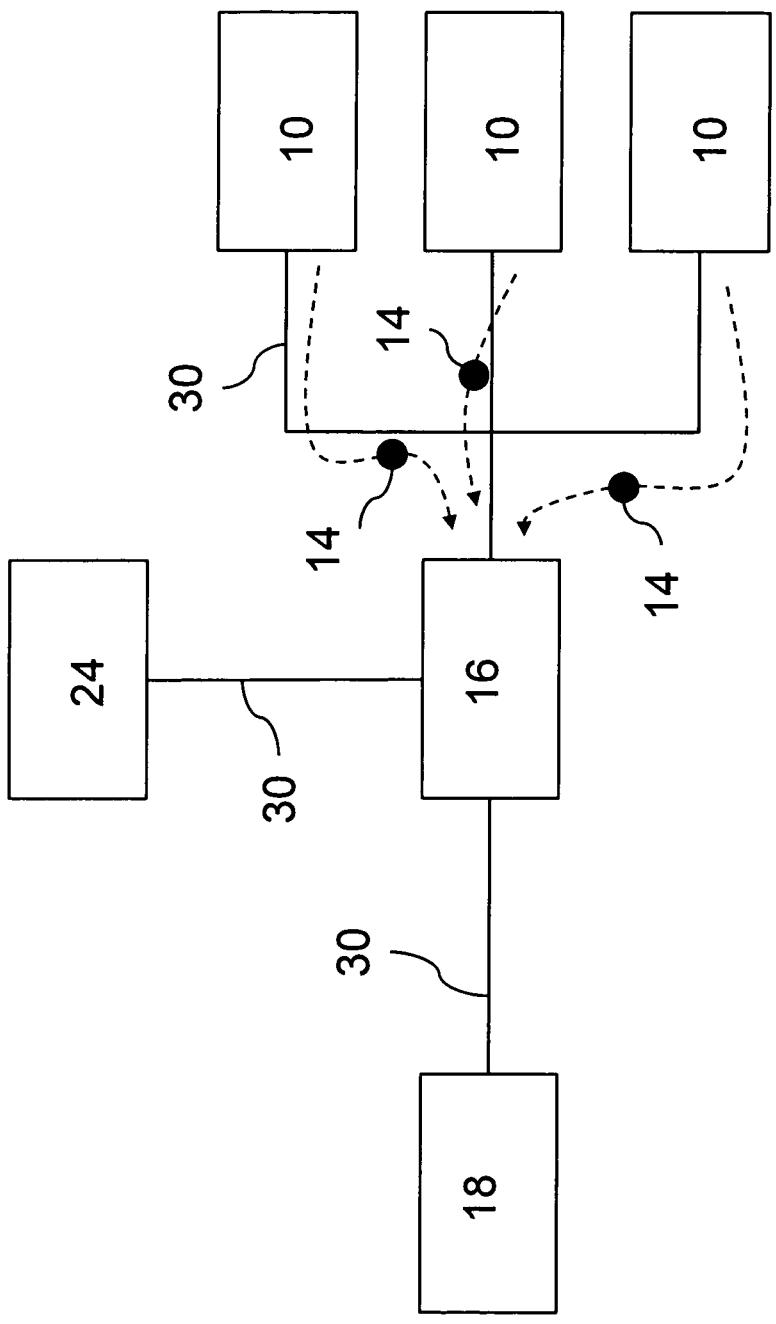
FIG. 1 shows a plurality of network resources providing authentication to a trust director.

FIG. 1 shows a plurality of network resources providing authentication to a trust director.

Figure 2:
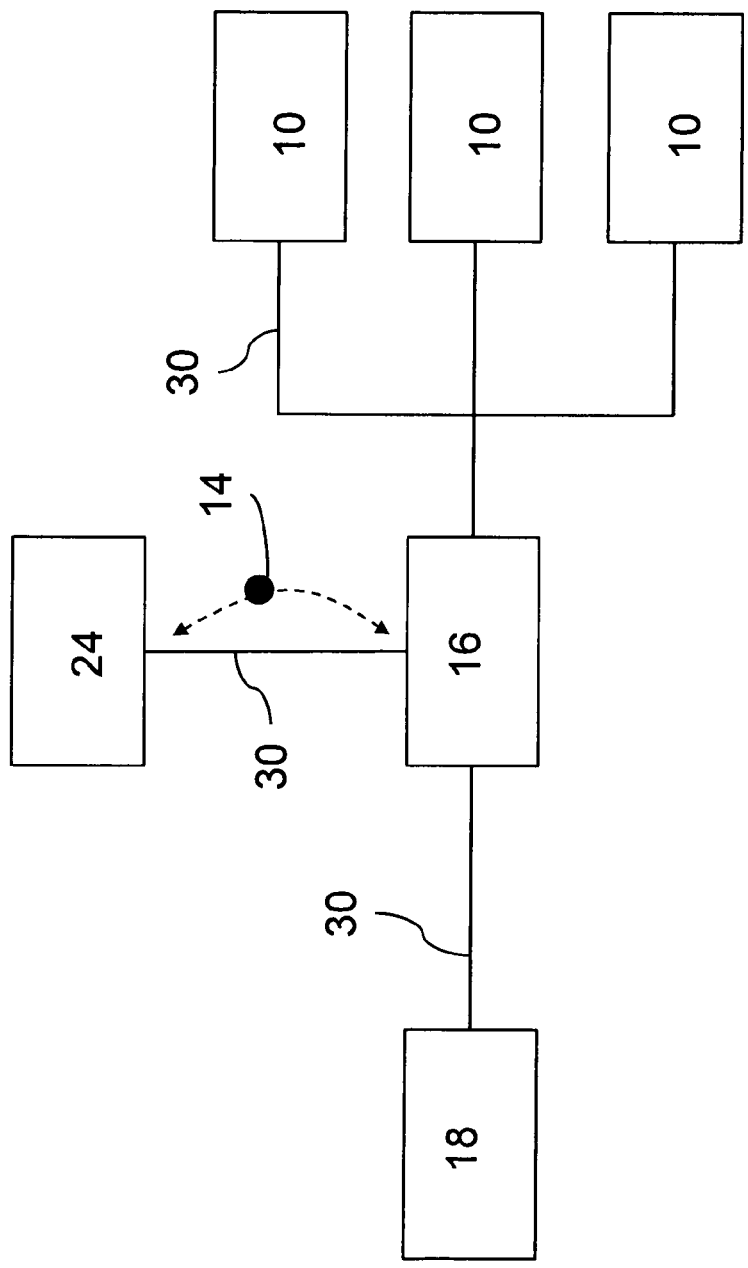
FIG. 2 shows a trust director processing authentication objects received from network resources.

FIG. 2 shows a trust director processing authentication objects received from network resources.

Figure 3:
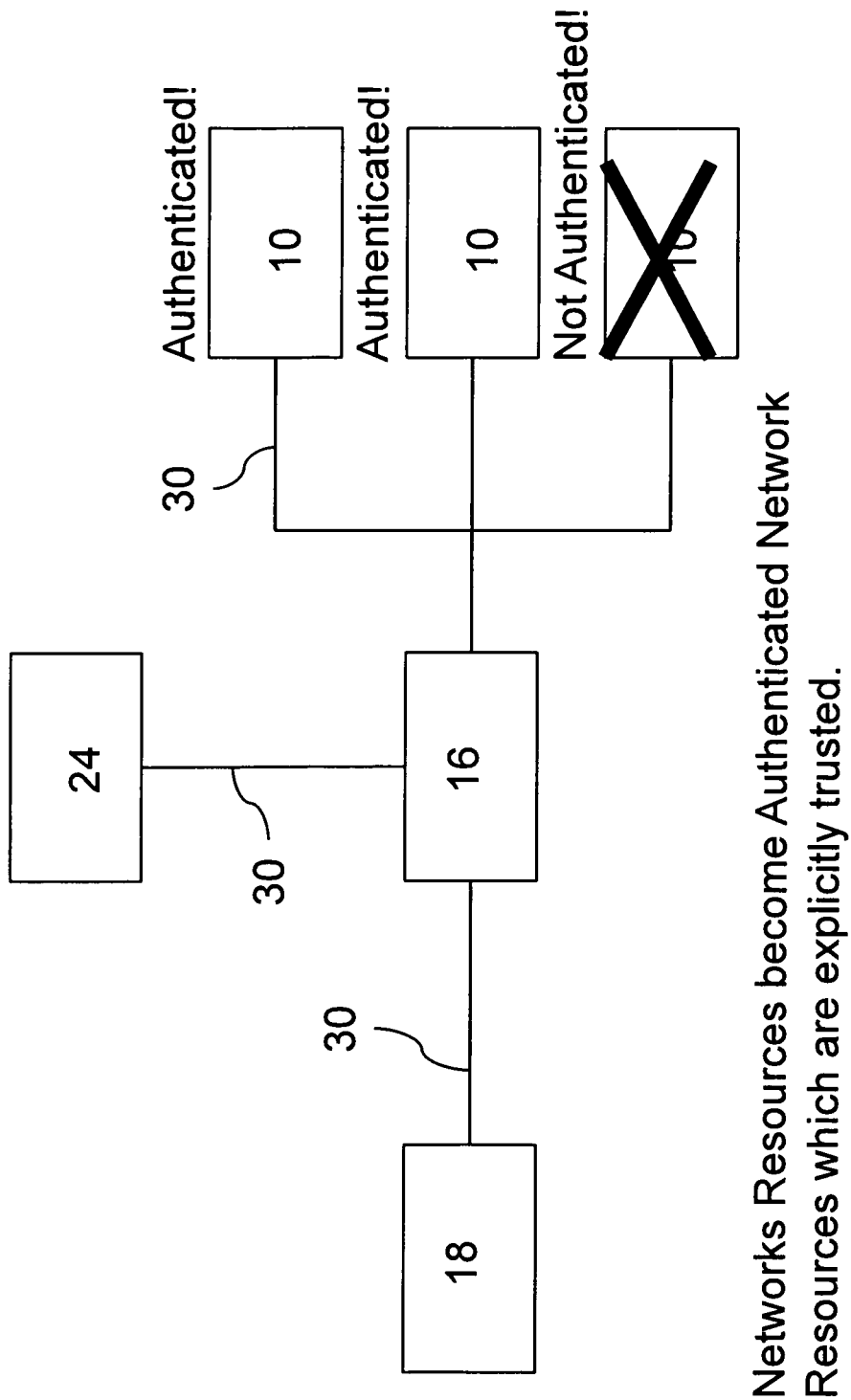
FIG. 3 shows the resulting authenticated network resources.

FIG. 3 shows the resulting authenticated network resources.

Figure 4:
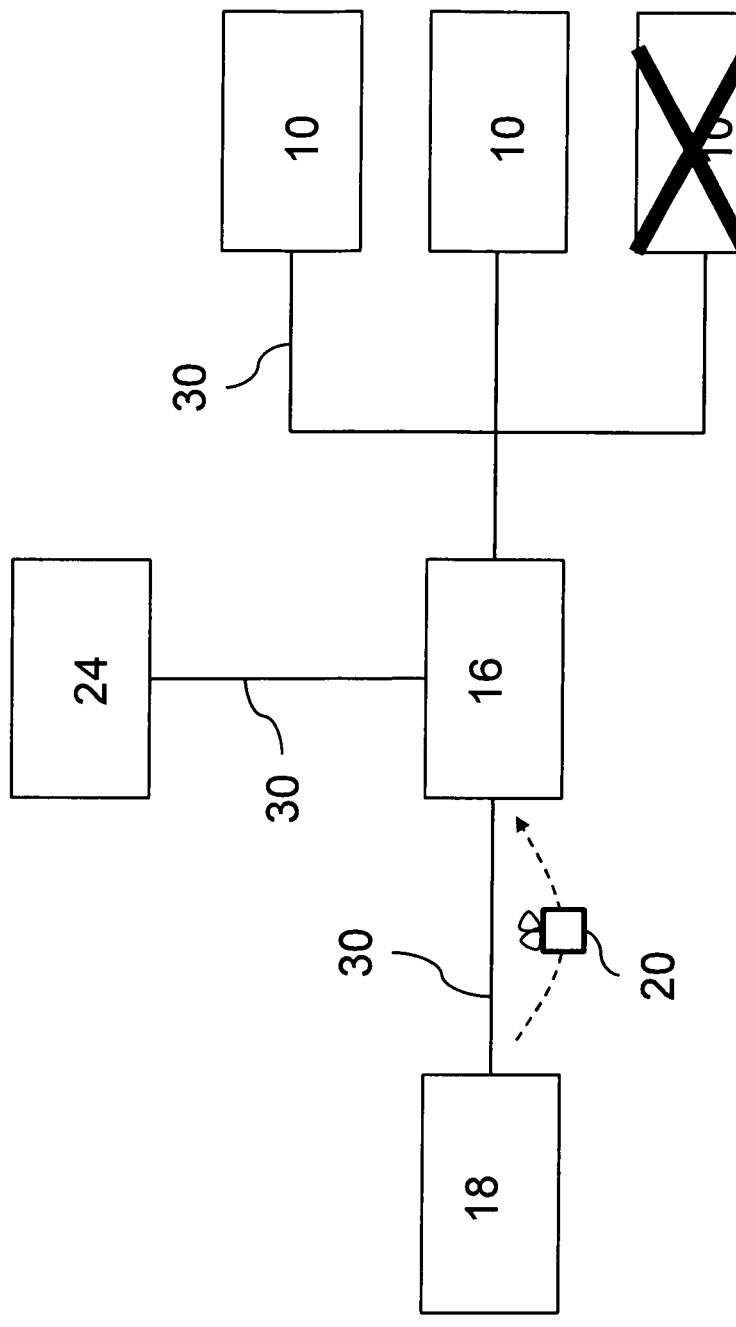
FIG. 4 shows a resource request being sent from a network client to a trust director.

FIG. 4 shows a resource request being sent from a network client to a trust director.

Figure 5:
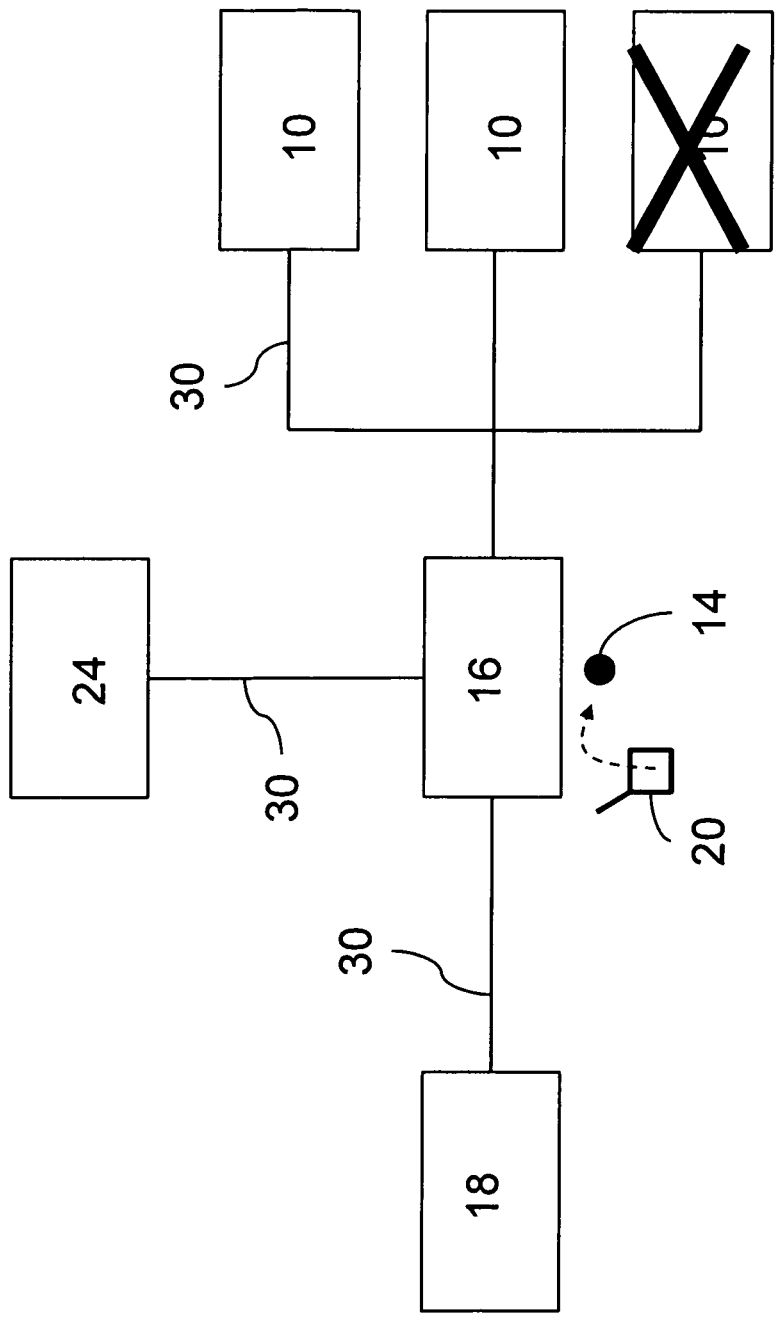
FIG. 5 shows a trust director extracting an authentication object from a resource request.

FIG. 5 shows a trust director extracting an authentication object from a resource request.

Figure 6:
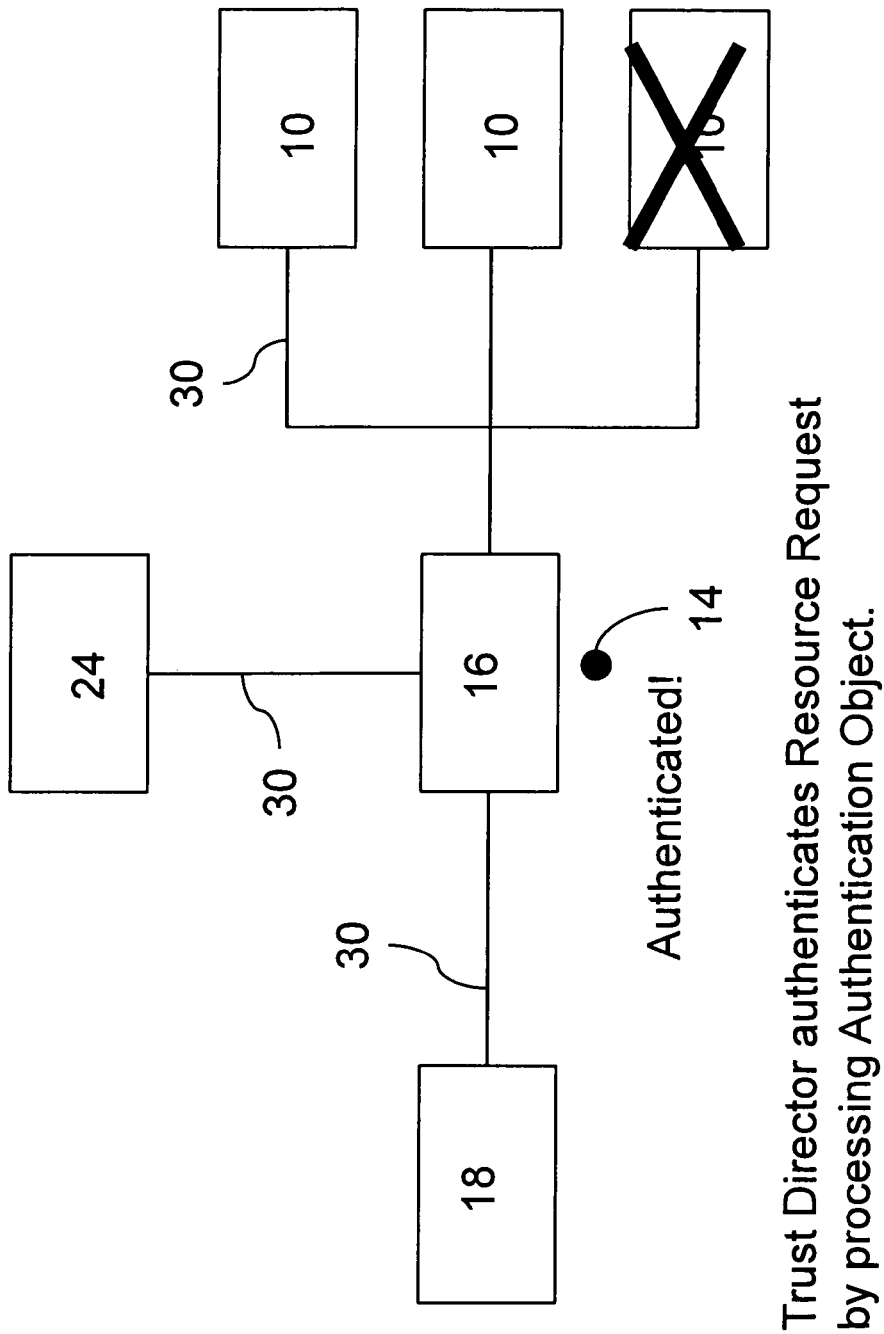
FIG. 6 shows a trust director authenticating a resource request by processing the authentication object.

FIG. 6 shows a trust director authenticating a resource request by processing the authentication object.

Figure 7:
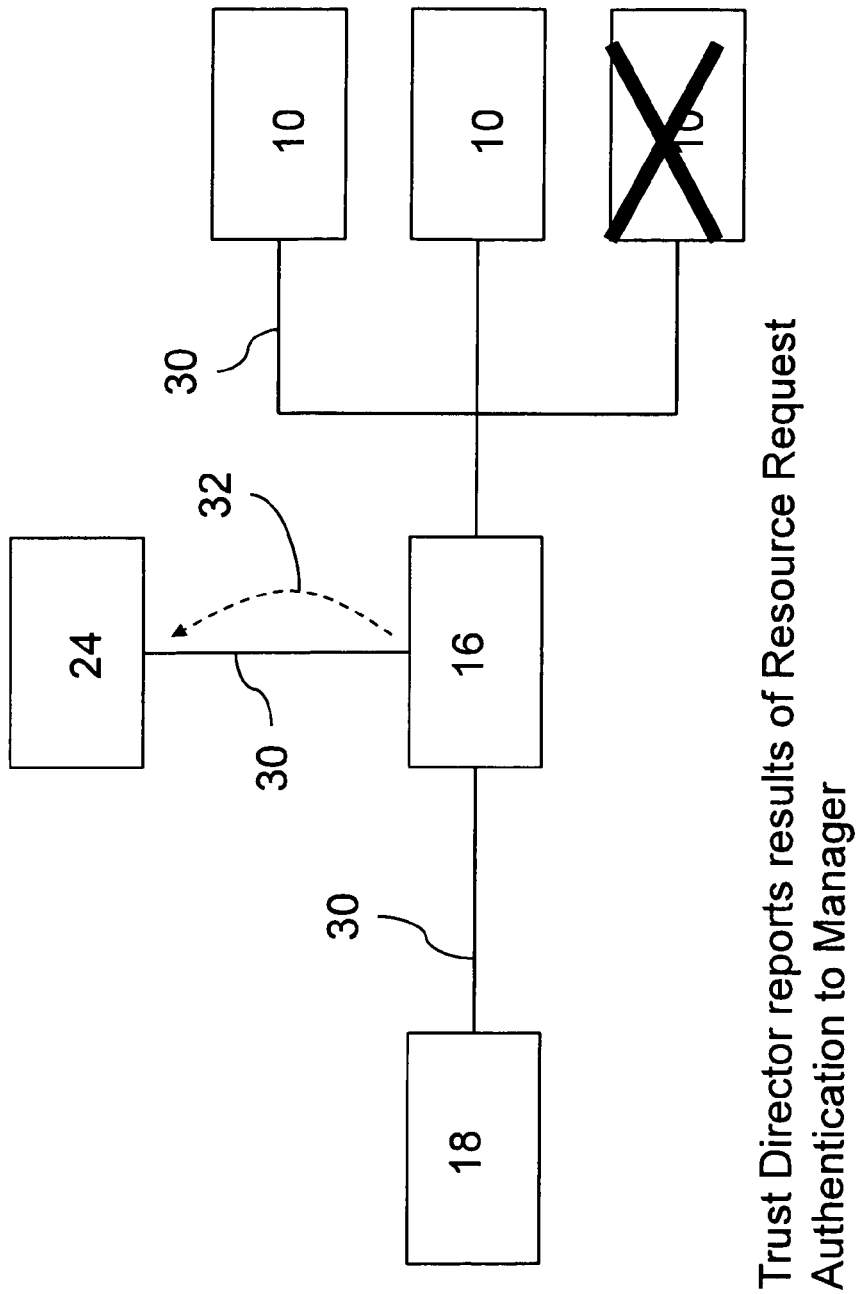
FIG. 7 shows a trust director reporting the result of the resource request authentication to a manager.

FIG. 7 shows a trust director reporting the result of the resource request authentication to a manager.

Figure 8:
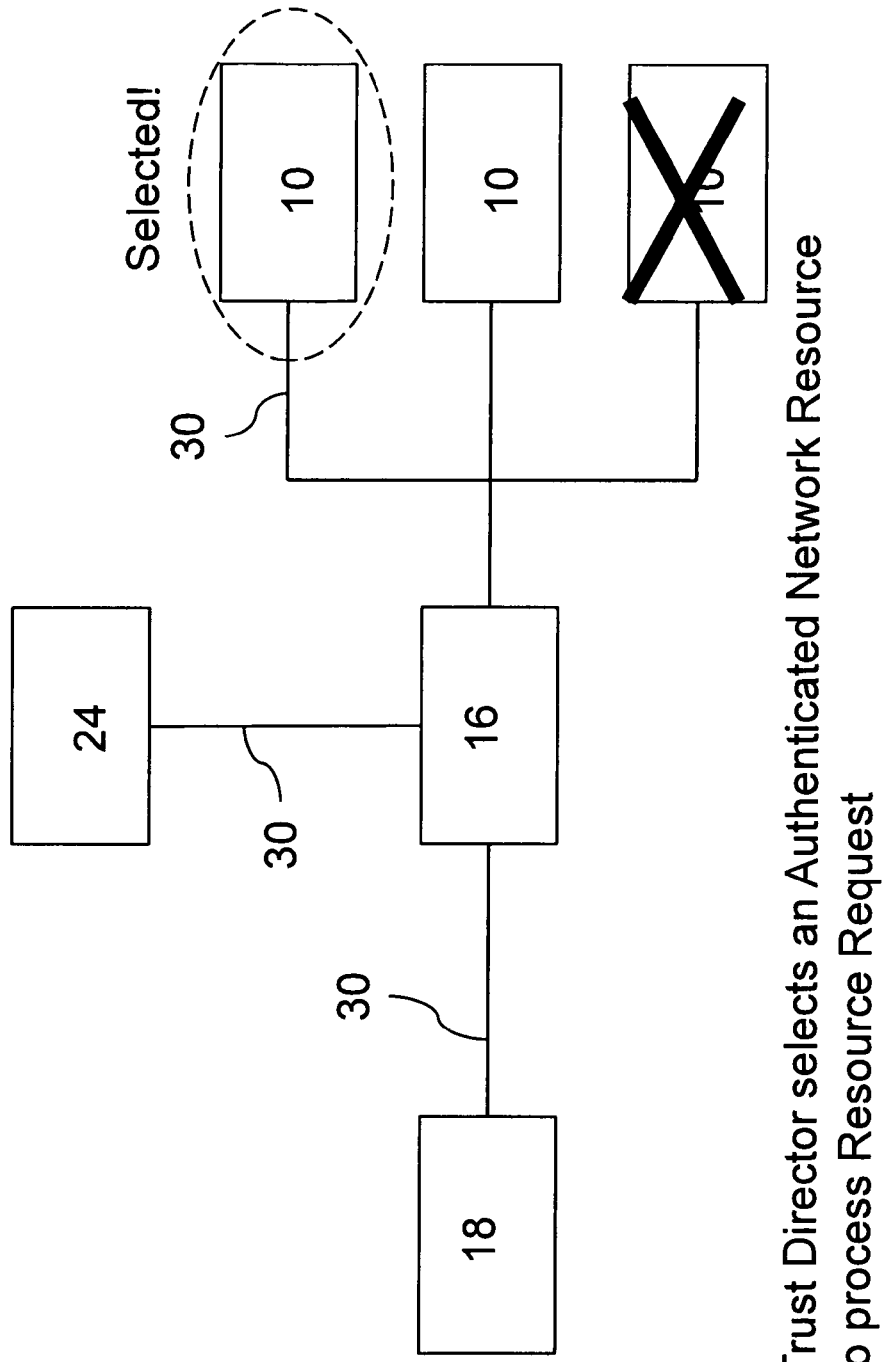
FIG. 8 shows a trust director selecting an authenticated network resource.

FIG. 8 shows a trust director selecting an authenticated network resource.

Figure 9:
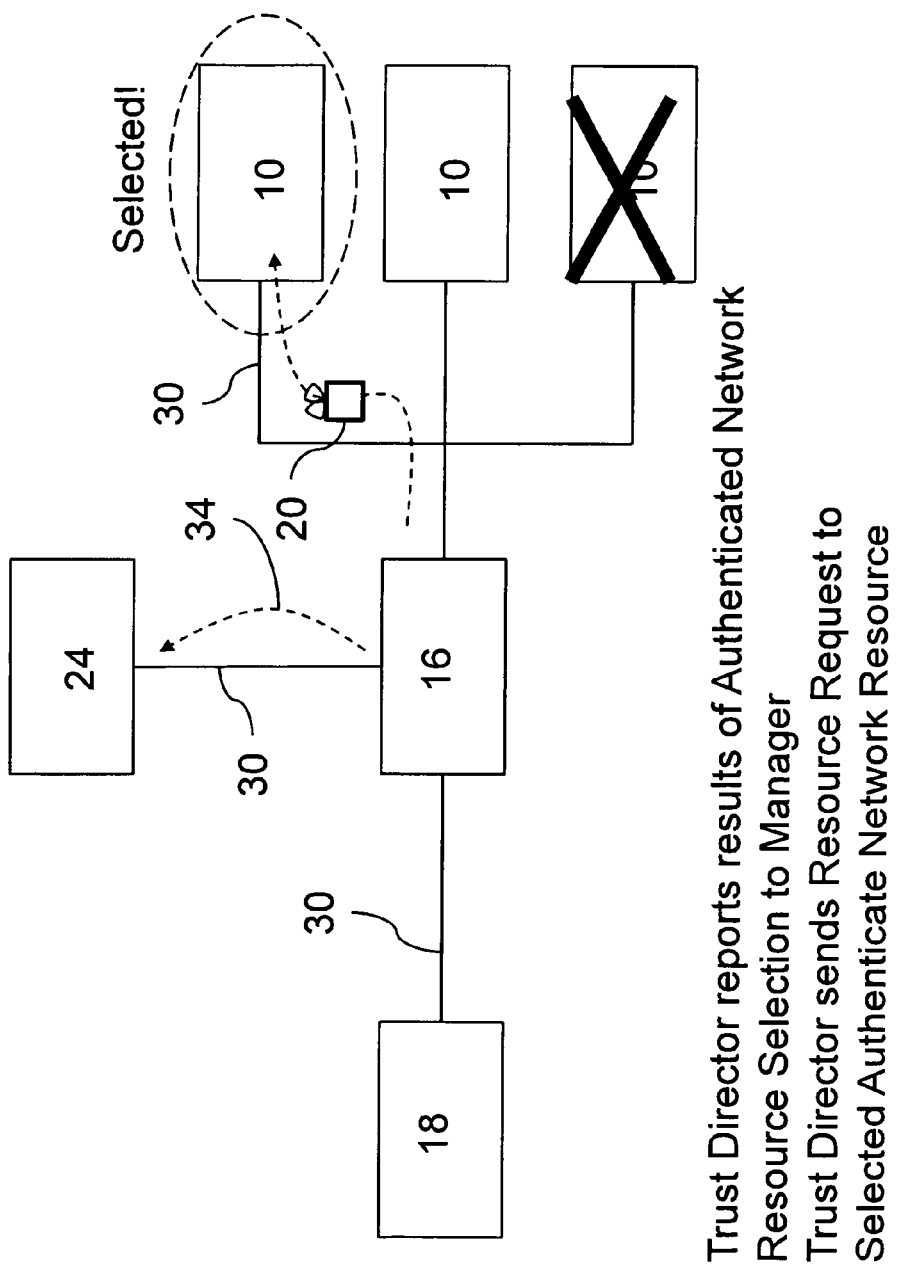
FIG. 9 shows a trust director reporting the result of the authenticated network resource selection to a manager and sending the resource request to the selected authenticated network resource.

FIG. 9 shows a trust director reporting the result of the authenticated network resource selection to a manager and sending the resource request to the selected authenticated network resource.

Figure 10:
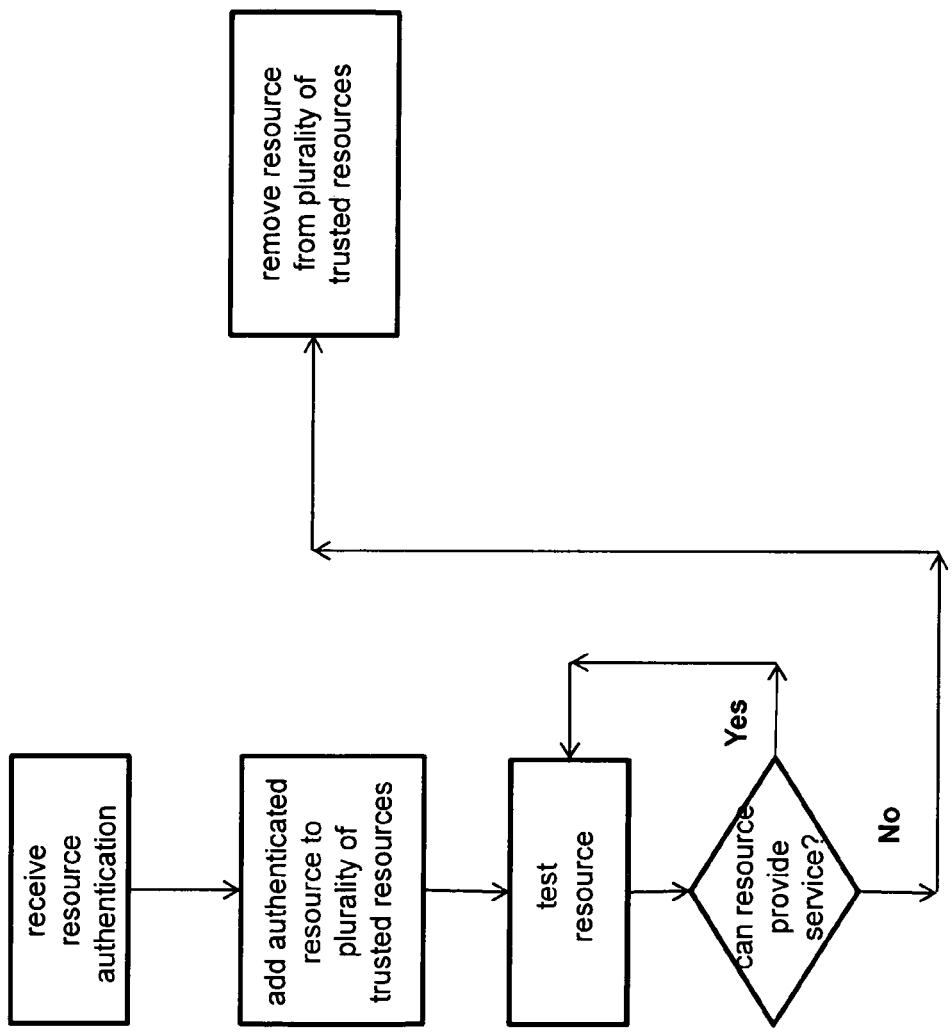
FIG. 10 is an flowchart of network resources providing authentication to the trust director.

FIG. 10 is an flowchart of network resources providing authentication to the trust director.

Figure 11:
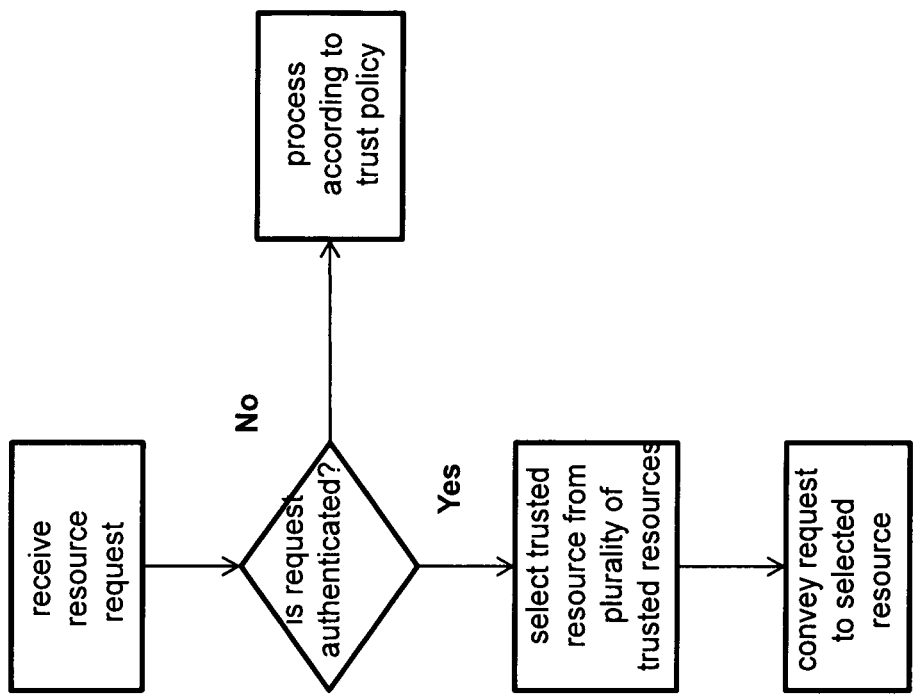
FIG. 11 is a flowchart of a network request being authenticated and the sent to a previously authenticated network resource.

FIG. 11 is a flowchart of a network request being authenticated and the sent to a previously authenticated network resource.

The present invention comprises methods and apparatus for transforming the state of a combination of hardware elements. In the Method Claims which follow this Specification, the method steps change or transform the state of the hardware elements to achieve a specified and beneficial result. In the Apparatus Claims which follow, each hardware element performs a particular task, and changes state to achieve a specified and beneficial result.

II. Transport Access Control

Transport Access Control (TAC) is described in Pending U.S. Ser. No. 11/242,637, entitled Method for First Packet Authentication, which was filed on 30 Sep. 2005. The text and drawings of U.S. Ser. No. 11/242,637 are hereby incorporated by reference.

TAC provides a mechanism to camouflage a network connected device from being detected on the network in much the same way that piece of artwork hung on a wall can camouflage a safe or compartment behind it. Camouflage works by allowing something to be hidden or by blending in with its surroundings. If a camouflaged object moves, or the object it is hiding behind moves, the camouflaged object may reveal itself. If the artwork is moved, it reveals a camouflaged or concealed safe. Once the presence of the safe is revealed, the combination of the safe may be worked to gain access to its contents. A network connected device reveals itself on the network by responding to requests. If it is desired to have the network connected device conceal itself until a authorized request is received, then a mechanism to authorize a received request is required.

TAC enables a network connected device to authorize a received TCP connection request without relying solely on a initiator's IP address. If the authorization is successful, then the connection establishment process is continued. If the authorization fails, the request is "black-holed," even though there is an application associated with the TCP port in the connection request.

The authorization mechanism uses a combination of various fields in the IP and TCP headers in the TCP connection request. All of these fields have a primary function that is defined in the IP and TCP specifications. The use of existing fields to pass a authorization key is necessary because the TCP protocol specification does not provide a mechanism to pass user data on a TCP connection request. A mechanism to pass user data on a connection request exists for the ISO TP4 protocol.

The goal of TAC is to enable an authorization mechanism that functions using only the fields in the IP and TCP headers that are normally present in the TCP connection establishment request. This mechanism must not define any new or additional fields and must preserve the functionality of the fields already present. Specifically, the authorization mechanism must encode itself within the fields that are already present without affecting their function. This mechanism must also not require the use of any optional fields that may not be supported by all networking equipment.

Within the IP and TCP headers there are fields that have strictly defined meanings that do not allow any additional encoding because this would alter the functionality of the IP and/or TCP protocols. Examples of such fields are the Source Address, Destination Address, Checksum, Source Port and Destination Port fields.

Within the TCP header, on a connection request (TCP-SYN), the Sequence Number (SEQ) field specifies the starting sequence number for which subsequent data octets are numbered. Additional TCP specifications recommend that this number be randomly generated. This field is 32 bits long. Also within the TCP header is the Acknowledgment Number (ACK) field. This field is not used on a TCP-SYN. This field is 32 bits long and is adjacent to the SEQ field. This gives us 64 bits of data to use as a authorizing key. A smaller key of less than 64 bits may be used if desired. It is also be possible to increase the size of the authorization key over 64 bits by using the TCP window field, the TCP urgent pointer field or other TCP fields that do not effect the connection setup procedure.

The initiator generates an authorization key. The initiator then sends a TCP connection request, inserting an authorization key in the SEQ and ACK fields, to the desired network connected device. The receiving device, upon receiving the connection request, extracts the authorization key. The receiving device then processes the authorization key to determine if the TCP connection request is authorized. During the act of processing the authorization key, the receiving device may also use the initiator's IP address, the time of day or date that the request was received, the physical port the request was received on, or any other information, implicitly or explicitly carried with the TCP connection request to determine the validity of the connection request. If the connection request, the extracted authorization key and all connection establishment granting criteria are met, then the receiving network device authorizes the request and continues the connection establishment transaction by sending a TCP-SYN/ACK in accordance to the TCP protocol specification. If the connection request, the extracted authorization key and all additional connection establishment authorization criteria are not met, then the receiving network device discards the request and nothing is sent to the connection initiator.

TAC provides methods for concealing the existence of a device connected to a computer network or concealing the existence of certain applications running on a device connected to a computer network. This concealment works by authorizing a TCP connection request using an authorization key embedded within the TCP connection request.

In one preferred embodiment of the invention, the authorization is performed by the receiving host server.

In another preferred embodiment, the authorization is performed by an intervening network device. This device may be a network firewall, a virtual private network (VPN) device, a router, a switch, a cache, a TCP proxy, a virus scanner, an intrusion detection system, an intrusion prevention system or any other device logically or physically placed between the client and the server.

In a preferred embodiment, the authorization key is inserted by the network device requesting the TCP connection.

In another preferred embodiment, the authorization key is inserted by an intervening network device. This device may be a network firewall, a virtual private network (VPN) device, a router, a switch, a cache, a TCP proxy, a virus scanner, an intrusion detection system, an intrusion prevention system or any other device logically or physically placed between the client and the server.

III. Overview of Statistical Object Identification

Statistical Object Identification (SOI) is described and claimed in Pending U.S. Ser. No. 13/373,586, filed on 18 Aug. 2011. The text and drawings of U.S. Ser. No. 13/373,586 are hereby incorporated by reference as of the date they are published.

A statistical object, the deterministic statistical representation of an original object, may be generally considered to be the output of a hash or similar function coupled with additional inputs of clocks, counters and other varying deterministic inputs. Unambiguously identifying a statistical object to a unique original object is essentially an exercise in mitigating the effects of the birthday problem. The birthday problem is the probability that output of the hash of different original objects and their deterministic inputs produce identical statistical objects. The generation of a single statistical object by two or more original objects causes a collision. Given a uniform distribution, the probability of a collision increases with the number of statistical objects in use. Statistical objects are designed to be used as components of security devices. As a component to security devices, in additional to uniquely identifying a statistical object back to the original object, the overall probability of guessing any valid statistical object must also be considered. The amount of space available to carry a statistical object will vary with the communications mechanism, but the size of an individual statistical object is expected to remain small, generally less than the number of bits required to uniquely identify an original object when large numbers of objects are in use. This requires the aggregation of two or more related statistical objects into a larger aggregate statistical object. Aggregating multiple related statistical objects into a single aggregate statistical object requires that all possible original object resolution matches are tracked and maintained. Multiple statistical objects from the same original object can be associated together by using information associated with the communication and reception of the statistical objects. This information, called communications characteristics, can include networking information, such as the source address or network session information including source and destination addresses and source and destination port numbers. Communications characteristics can also include physical information such as the physical port upon which the statistical object was received or the logical channel upon which the statistical object was received.

To unambiguously identify the original object from which a statistical object or a stream of statistical objects was generated, the device performing the identity must maintain a table of all valid statistical objects. This table may contain collisions where multiple original objects generate the same statistical object. When a statistical object is received, it is first looked up in the table of all statistical objects to determine if the received statistical object is valid. If the received statistical object is not found in the table, then no further processing occurs with respect to identifying the original object on that reception. When a statistical object is received and is matched in the table of all valid statistical objects, the communications characteristics associated with the reception of the statistical object and the list of all potential original objects are recorded. If the list of potential original objects has exactly a single entry, then the original object is identified and the process moves on to calculating the statistical probability.

When a statistical object is received and is not unambiguously identified, the partially identified statistical object and the list of potential original objects are recorded along with the communications characteristics associated with the reception of the statistical object. When a another statistical object with related communications characteristics is received, the list of potential original objects is pruned of original objects that cannot generate the complete set of received statistical objects found in the aggregate statistical object. Once the original object is unambiguously identified, the process moves on to calculating the statistical probability of guessing the information in the aggregate statistical object. If the original object is not unambiguously identified, nothing further is done at this time and the system awaits the reception of another statistical object with related communications characteristics to increase the number of bits of information received and again aggregates this information into the aggregate statistical object and the process repeats itself.

Calculating the probability of guessing the information in the aggregate statistical object requires the number of bits of statistical objects that have been received and aggregated and the number of statistical objects maintained in the table of all valid statistical objects. The specific probability p of a collision is $$p(n; d) = \frac{d!}{d^n(d-n)!}$$

where n is the number of statistical objects in the table of valid statistical objects and d is the total number of unique statistical objects available. For general use, the approximation $p(n; d) \approx 1 - e^{-n^2/(2 \times d)}$ is used. The total number of unique statistical objects available d is $d = 2^b$ where b is the number of bits of statistical object information received.

Once the probability has been calculated, it is compared against the probability threshold. If the calculated probability is less than the probability threshold, then the statistical object has been identified with a confidence that the aggregate information received does not exceed the probability threshold set beforehand. If the probability-exceed the threshold, nothing further is done and the system awaits the reception of another statistical object with related communications characteristics to increase the number of bits of information received and aggregates into the aggregate statistical object and the progress repeats itself.

A further optimization can be made by associating communications characteristics across multiple identifications of statistical objects. When a statistical object is identified and does not exceed the probability threshold, thereby confirming that it was generated from the original object, the communications characteristics are temporarily associated with that original object. When a subsequent statistical object with similar or identical communications characteristics is received, the received statistical object is checked against the associated original object. If the associated original object could produce the received statistical object, the statistical object is identified as being produced by the associated original object. When multiple original objects are associated with the same set of communications characteristics, the identification of the statistical object proceeds by aggregating the statistical object information and pruning the list of potential original objects until only a single original object remains. The statistical object is still aggregated in an aggregated statistical object to enable the aggregation of information for the probability calculation. The probability calculation is made using the number of bits of information received in the aggregate statistical object and the number of statistical objects that are associated with the communications characteristics that are associated with the original object. This results in a lesser amount of statistical object information being required to not exceed the probability threshold, because the communications criteria is being used as an additional descriminator. Multiple sets of communications characteristics can be associated original object and multiple original objects can be associated with a single set of communications characteristics. When a statistical object is identified as being produced by an original object, a timestamp or other mechanism for indicating recent activity is updated in the communications characteristics associated with the original object. The lack of communications characteristics associated with original objects after a period of time should have their association removed after such periods of inactivity exceed a threshold. Subsequent statistical object reception with those removed communications characteristics will proceed as unassociated communications until those communications are again associated with an original object.

To insure the security of the statistical objects being produced cannot be readily captured, copied and replayed as original, the algorithms used to generate the statistical objects uses additional information in addition to the original object as inputs. This additional information may include clocks, counters and other deterministic inputs. During the identification of a statistical object back to an original object, this additional information is also identified and used to further validate the identity of the original object.

The probability threshold has several unique uses. Firstly, the use of a probability threshold enables the system for statistical object identity to be used with varying numbers of statistical objects contained within the table of all valid statistical objects without having the probability of guessing a statistical object increase as statistical objects are added to the valid statistical object table. The system employed here simply requires additional statistical objects, thus increasing the amount of information available to maintain the desired probability. The second unique attribute of using the probability threshold is that the probability threshold can be changed by the entity performing statistical object identification without communication, knowledge or coordination of the change by the entity generating the statistical object. This is especially important in the context of cyber security where knowledge of a threat or attack may raise the level of security desired. This can be used by the entity receiving and performing statistical object identification to decrease the threshold, requiring more statistical information before the original object identity is confirmed. The ability to perform this function without requiring any communication or notification to the entity producing the statistical object is especially useful and novel.

Additional information can also be conveyed using statistical objects. When additional inputs are used in the generation of the statistical object, this information can be extracted during the statistical object identification process. Examples of such additional information includes, but is not limited to, information regarding the state of some system or process, an index into a table of information or other types of data.

One embodiment of SOI provides a method for authenticating a communication. Communications received by the remote system must be authenticated before they are allowed. In this Specification, and in the Claims that follow, the terms authenticate and authentication are intended to mean that the identity of a communicator or an initiator of a communication has been verified, and that a particular communication is permitted, allowed or otherwise approved to proceed into the remote system.

One limitation of current information networks is that it is difficult to verify or approve a communication before the communication has been allowed to penetrate a network. One reason for this difficulty is that the means of verification, which is called a "certificate," is too large to send to the network in the initial set of digital information which initiates the communication, and which ultimately leads to an authentication.

One embodiment of SOI solves this problem by reducing the information in the certificate which is used to authenticate the communication before it is allowed to proceed by converting the certificate to a much smaller "statistical object." The method allows the network to determine the identity of the initiator of the communication before the communication is given access to the network. This method provides a security feature that substantially eliminates potentially detrimental malicious attacks that could be perpetrated on the network using conventional technology.

IV. Definition of Terms

Authentication—Verifying the identity of a user, process, or device, often as a prerequisite to allowing access to resources in an information system.

Authenticating Device—A device that verifies the identity of a user, process or device.

Authentication Information—Information provided for the purpose of verifying the identity of a user, process or device.

Authentication Object—An object provided for the purpose of providing authentication of the entity making a resource request or providing a network resource.

Computing Object—Any object, code, script, instruction, parameter, URL, SQL command, or transaction that can cause a change in state of the entity performing the computation.

Connection—A logical pairing of two devices that enable them to communicate. A connection utilizes a series of packets to accomplish this. A TCP connection is an example of a connection.

Connection Request—A request by one device to another device to create a connection.

Cryptographic Hash—A hash function that takes a string of any length as input and produce a fixed-length hash value. A cryptographic hash function differs from a non-cryptographic hash function in that a cryptographic hash function is able to withstand cryptoanalytic attacks.

Cryptographic Token—The output of a cryptographic hash which uses a clock as one of the inputs to the hash function.

Device—A device is any object that is capable of being attached or wirelessly connected to and communicating on a network. Examples of devices include computers, servers, clients, laptops, PDAs, cell phones, smart phones, network appliances, storage systems, virtual appliances, switches, routers, load balancers, caches, intrusion detection systems, VPNs, authentication devices, intrusion prevention systems, and firewalls.

Digital Identity—A digital representation of a set of characteristics by which a user, process or device is uniquely recognized.

Hash or Hashing function—Any procedure or mathematical method that converts are large amount of data into a smaller amount of data. In one embodiment of the invention, the output may be a single integer or value which serves as an index to an array or database.

Honey Pot—A trap set to detect, deflect, or in some manner counteract attempts at unauthorized use of information systems.

Hypervisor—A hardware virtualization techniques that allows multiple operating systems, termed guests, to run concurrently on a host computer. It is so named because it is conceptually one level higher than a supervisory program.

IP—IP is the Internet Protocol. The Internet Protocol is a data oriented protocol used by devices to communicate across a packet switched network. IP information is carried by an IP header in an IP packet. The IP header contains device address information, protocol control information and user data information.

Management Entity—A network device that can provide one or more of the following services: monitoring, configuration, reporting, log and record aggregation services, responding to indications and events.

Network—A network is a collection of computers, servers, clients, routers and devices that are connected together such that they can communicate with each other. The Internet is an example of a network.

Network Client—A network device that actively sends a request to another entity with the expectation that the request will be fulfilled.

Network Load Balancer—A network device that directs network traffic to different network resources to provide system scalability and redundancy.

Network Request—A request for service provided by a network resource. At the TCP layer, a network request is a request to establish a TCP session, commonly known as a TCP SYN.

Network Resource—A network device that provides data or services in response to a received resource request.

Original Object—The inputs to the function that generates a statistical object. The original object can include additional inputs such as clocks, counters, nonces and other deterministic information.

Protocol—In the field of telecommunications, a protocol is the set of standard rules for data representation, signaling, authentication, error detection and other features required to send information over a communications channel. Not all protocols provide all of these features. Protocols with different features may be layered on top of one another to provide a more robust feature set. Examples of protocols are the IP protocol and the TCP protocol. These protocols are often used together and referred to as the TCP/IP protocol.

Protocol Entity—A device, function, process or procedure that implements a communications protocol.

Quarantine Resource—A network resource designed to contain an unauthenticated, unidentified or unauthorized computing object. The quarantined computing object can be a network resource request, a protocol transaction, transmitted code or any other computing object.

Remediation Server—A network resource that provides system updates or other computing health components. A request may be send to a remediation server to update the requesting client before the requesting client is allows access to other network resources.

Resource—In computing, a resource is data or services provided by a computing entity. Resources may be primitives such as memory, storage or raw network access, or resources may be more abstract objects such as a remote file, a webpage or the use of a display, printer or other input/output device.

Resource Request—A resource request is a description of storing, retrieving, sending, receiving, processing or manipulation of a computing resource.

Statistical Object—The output of a function that has a statistical distribution. Commonly, a statistical object is the output of a hashing function.

TAC—Transport Access Control. A method of embedding identity into a TCP header that allows the authentication of a TCP session request before providing a response to the requesting entity.

TCP—TCP is the Transmission Control Protocol. Using TCP, networked devices can create connections to one another, over which they can send data. The TCP protocol guarantees that data sent by one endpoint will be received in the same order by the other, and without any pieces missing. The TCP protocol also distinguishes data for different applications (such as a Web server and an email server) on the same device.

Trust Director—A network device that selects and directs resource requests to one or more authenticated network resources.

Trust Policy—A policy that determines the disposition of the handling of a resource request based on the trust of the sender of the resource request. For example, authenticated and thus trusted resource requests are passed to a trusted network resource, while unauthenticated and thus untrusted resource requests are discarded.

Virtual Appliance—A virtual machine image designed to run on a virtualization platform. Virtual appliances are a subset of the broader class of software appliances.

Virtualized Network Environment—The networking infrastructure residing inside of a virtualization platform.

Virtualization Platform—The hypervisor, management system, storage and network infrastructure that provide hardware virtualization services. Common virtualization platforms include VMware, Xen, and Microsoft Virtual PC.

Virtualization System Manager—A management system that sets policy for a hypervisor. Also called a Hypervisor System Manager.

V. Preferred and Alternative Embodiments

Figure 12:
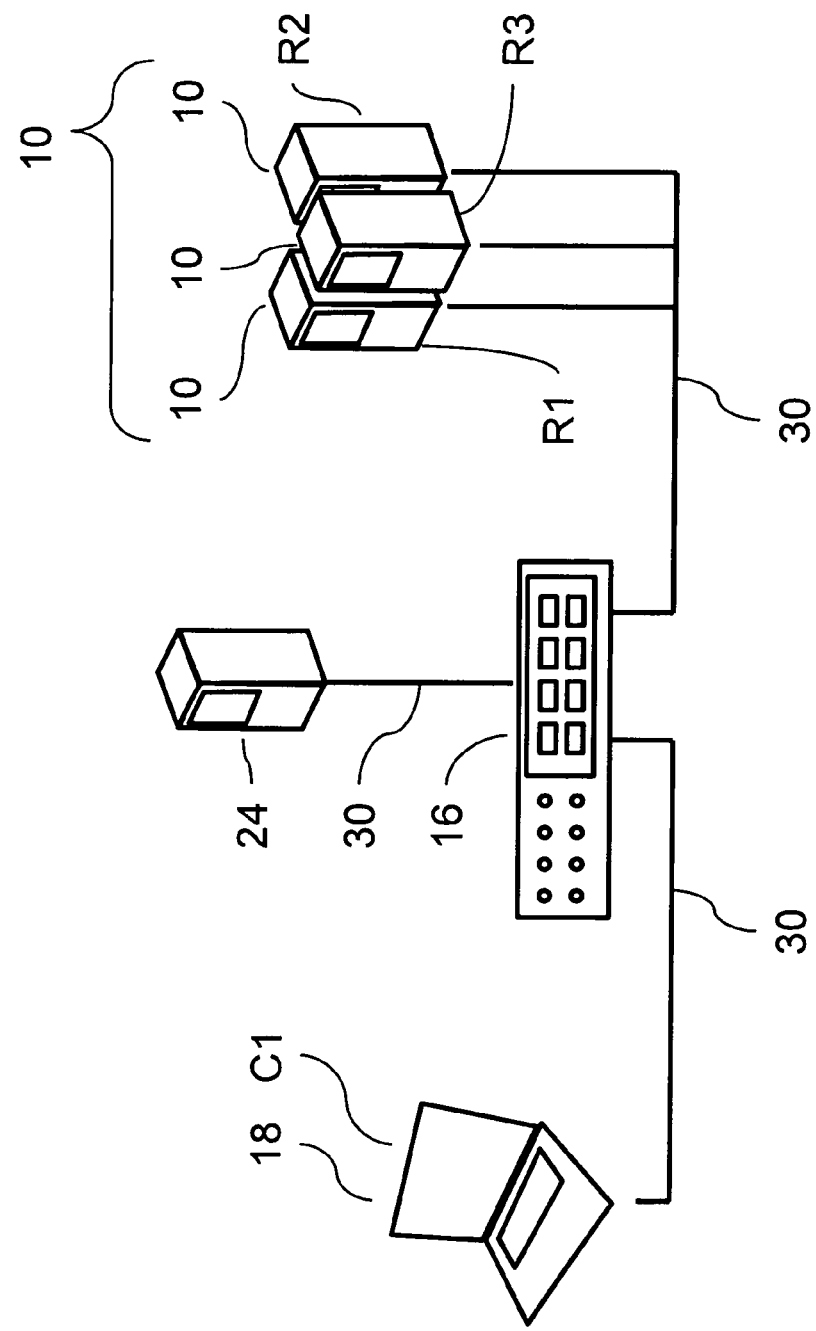
FIG. 12 is an illustration which shows one particular embodiment of the present invention.

FIG. 12 is an illustration which shows one particular embodiment of TAC, which includes a plurality of network resources 10 connected via a network 30 to a trust director 16. The plurality of network resources 10 comprises the specific instances of a network resource 10; network resource R1, network resource R2, and network resource R3. The trust director 16 is connected via a network 30 to a network client 18 and to a management entity 24. The specific instance of a network client 18 is network client C1.

Figure 13:
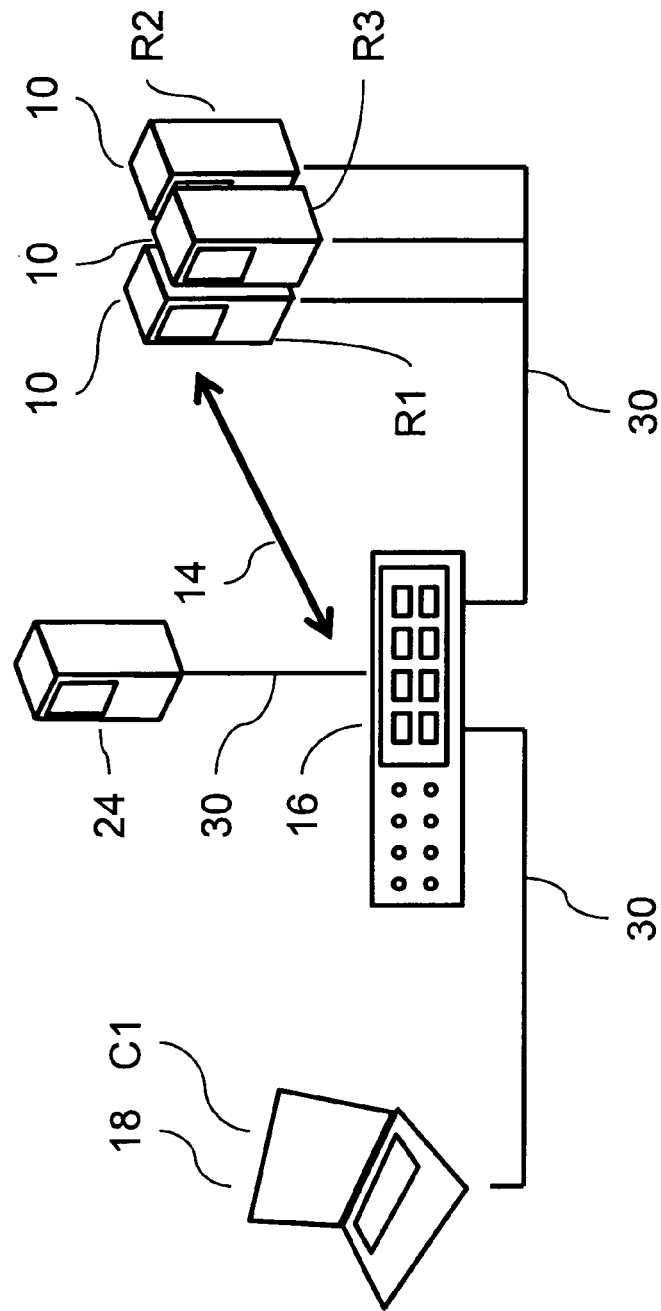
FIG. 13 shows a plurality of network resources authenticating themselves to the trust director.

FIG. 13 shows a plurality of network resources authenticating themselves to the trust director.

Figure 14:
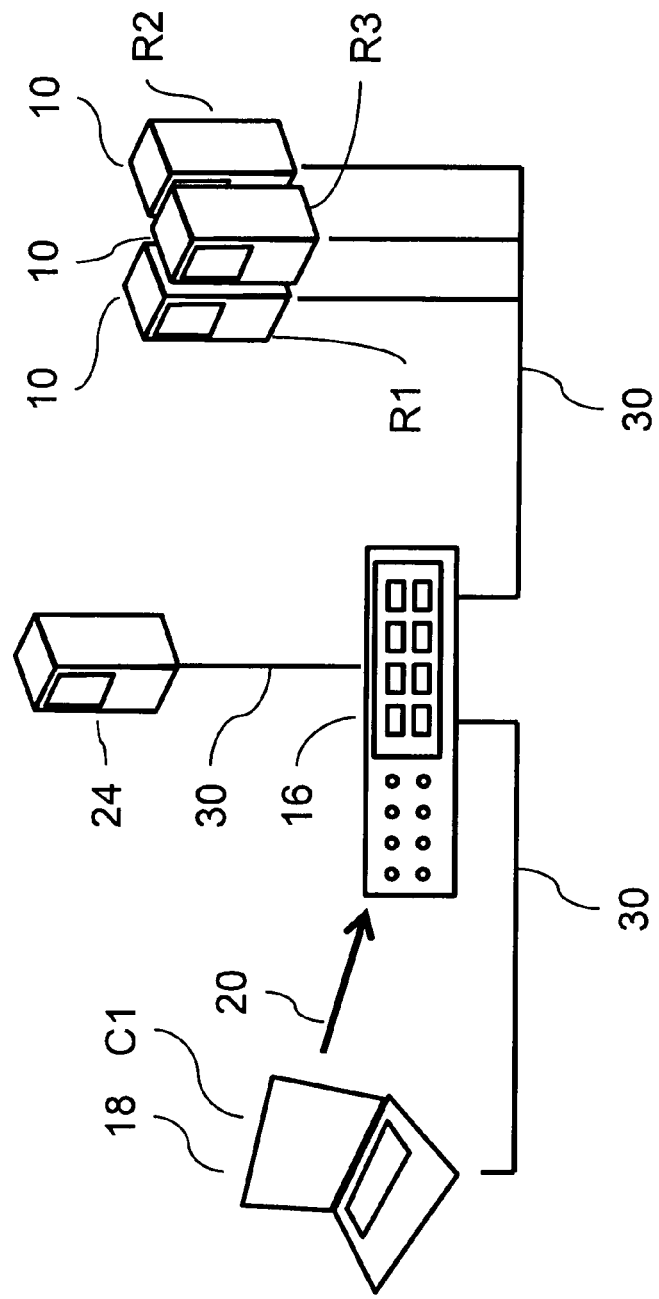
FIG. 14 shows a network client sending a resource request to a trust director.

FIG. 14 shows a network client sending a resource request to a trust director.

Figure 15:
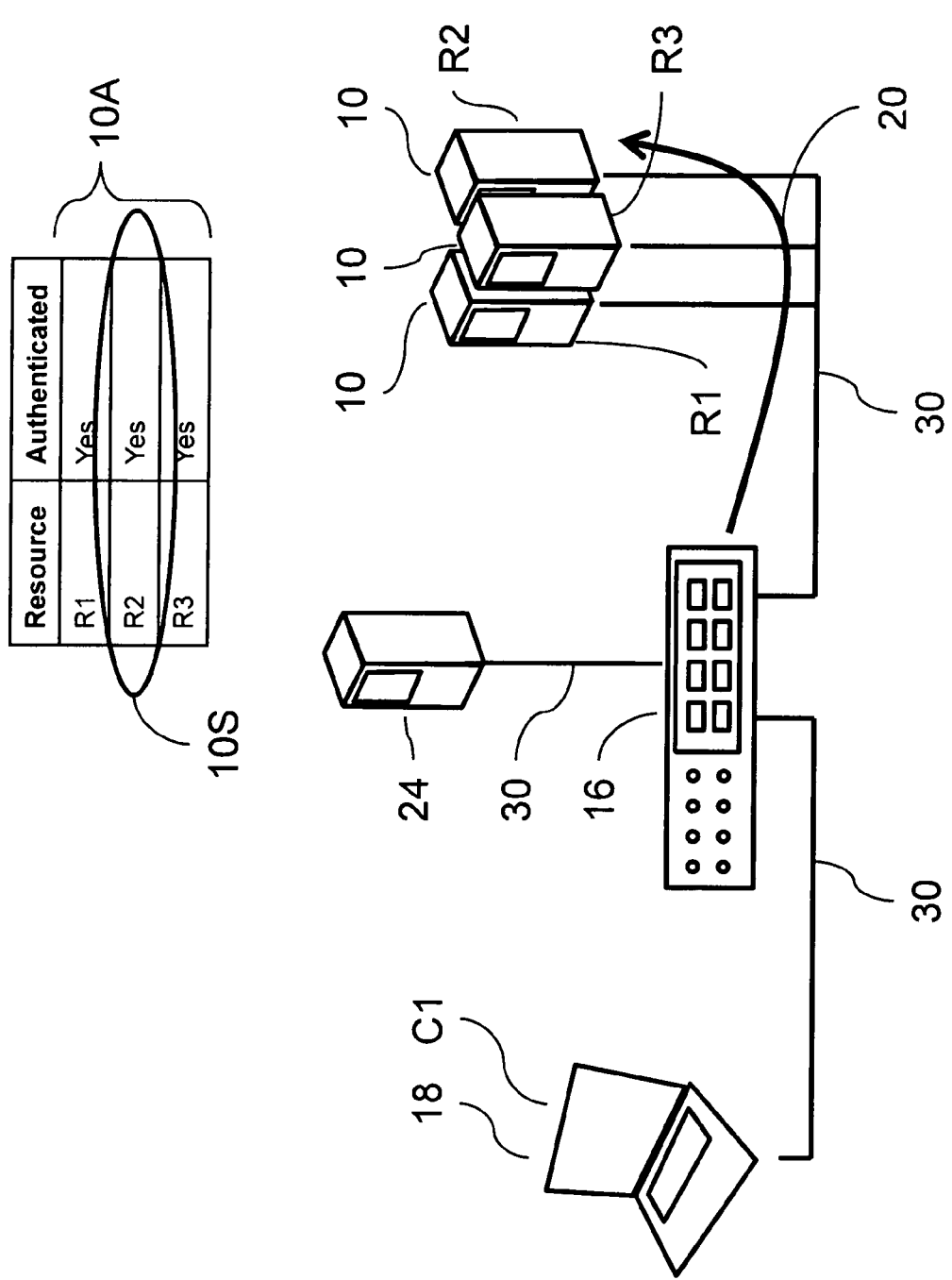
FIG. 15 shows a trust director selecting one of the plurality of authenticated network resources and sending the resource request to the selected network resource.

FIG. 15 shows a trust director selecting one of the plurality of authenticated network resources and sending the resource request to the selected network resource.

Figure 16:
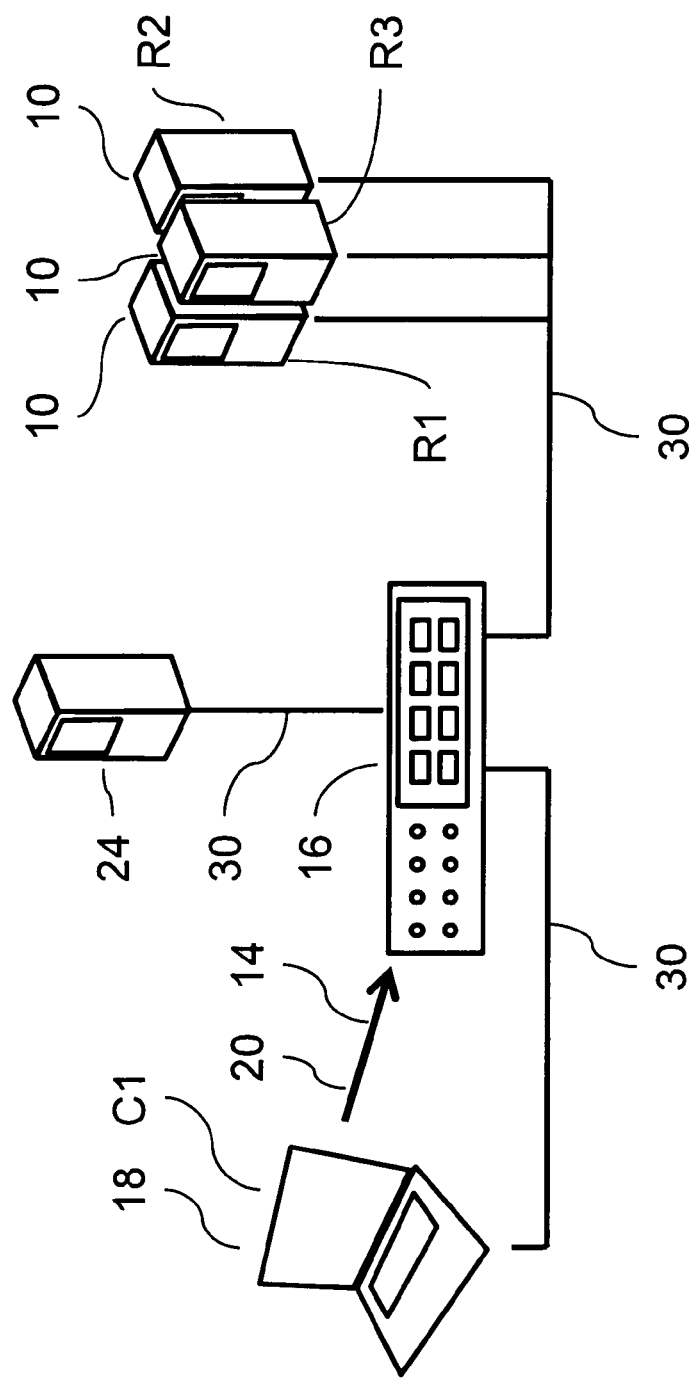
FIG. 16 shows a network client sending a resource request that includes an authentication object to a trust director and being authenticated by the trust director.

FIG. 16 shows a network client sending a resource request that includes an authentication object to a trust director and being authenticated by the trust director.

Figure 17:
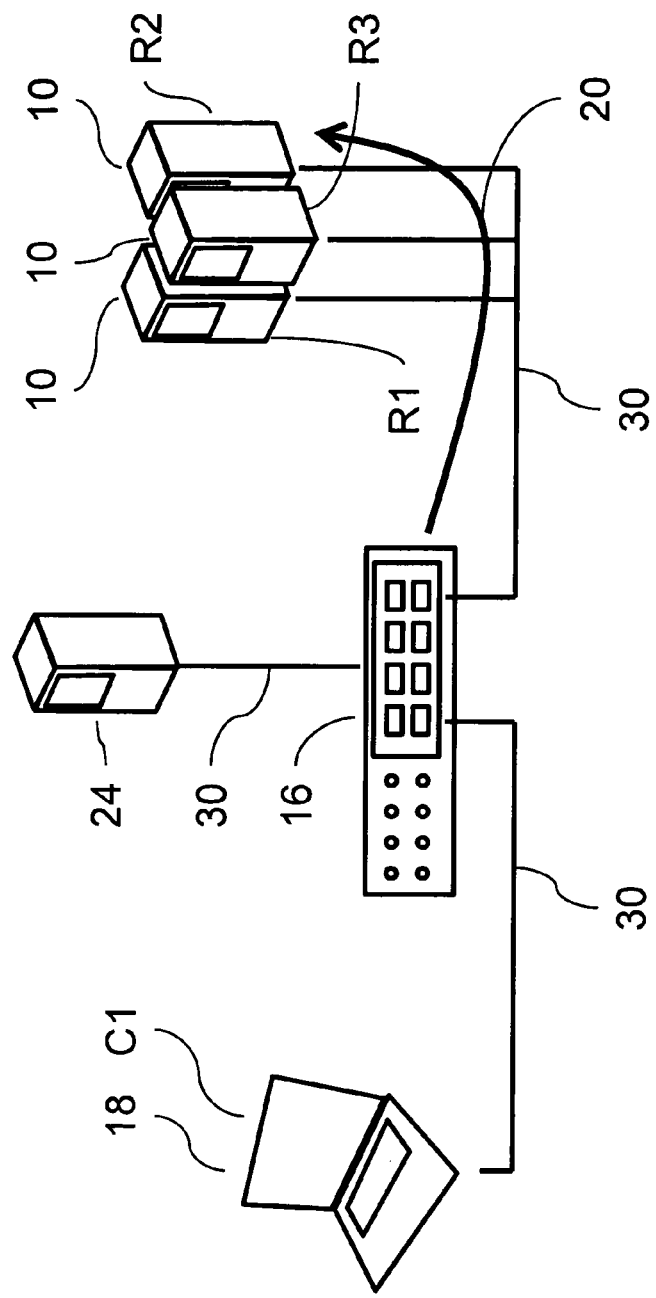
FIG. 17 shows a trust director selecting one of the plurality of authenticated network resources and sending the authenticated resource request to the selected network resource.

FIG. 17 shows a trust director selecting one of the plurality of authenticated network resources and sending the authenticated resource request to the selected network resource.

Figure 18:
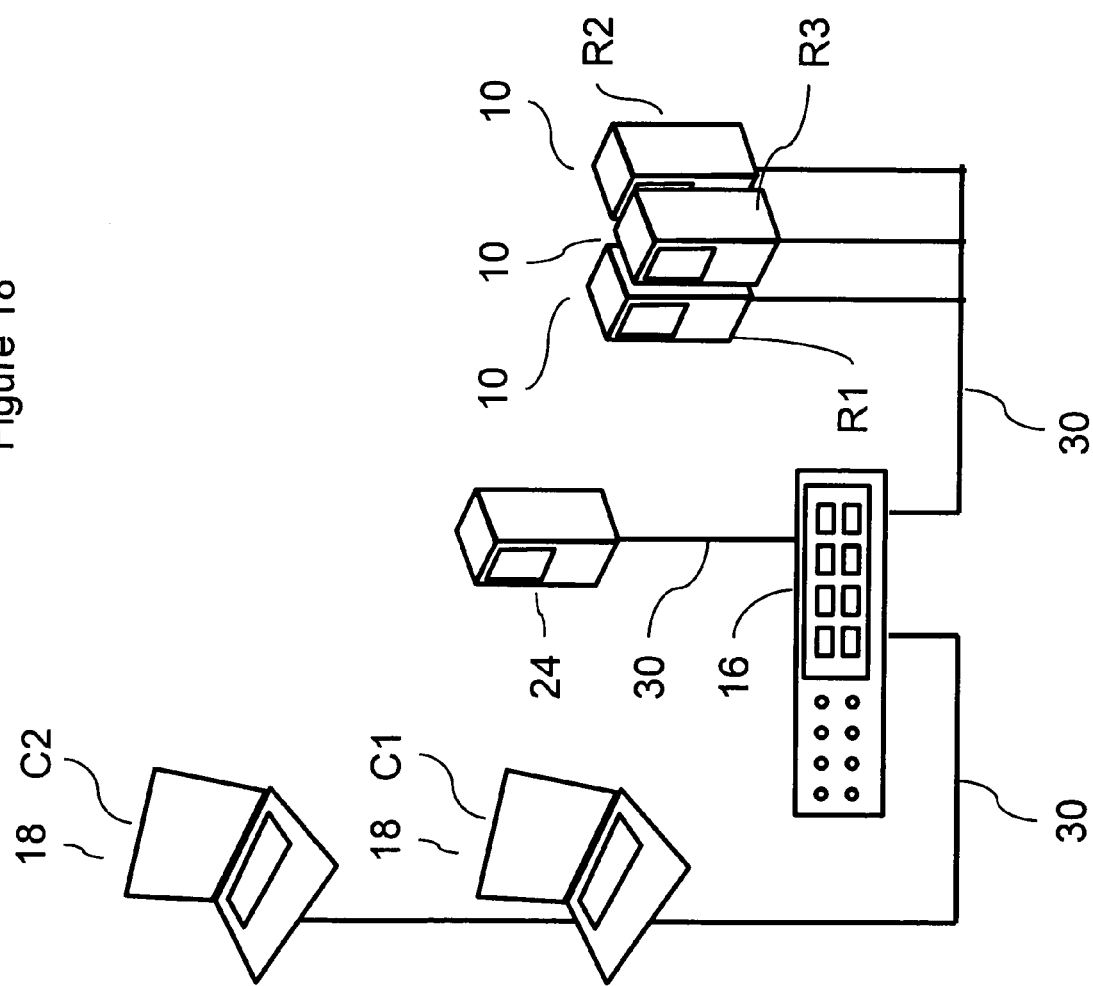
FIG. 18 is an illustration which shows an alternate embodiment of the present invention.

FIG. 18 is an illustration which shows an alternate embodiment of TAC, which includes a plurality of network resources 10 connected via a network 30 to a trust director 16. A second plurality of network resources 10U is also connected via a network 30 to a trust director 16. The plurality of network resources 10 comprises the specific instances of a network resource 10; network resource R1, network resource R2, and network resource R3. The second plurality of network resources 10U comprises the specific instances of a network resource 10; network resource R4, network resource R5, and network resource R6. The trust director 16 is connected via a network 30 to a plurality of network clients 18 and to a management entity 24. The specific instances of network clients 18 are network client C1 and network client C2.

Figure 19:
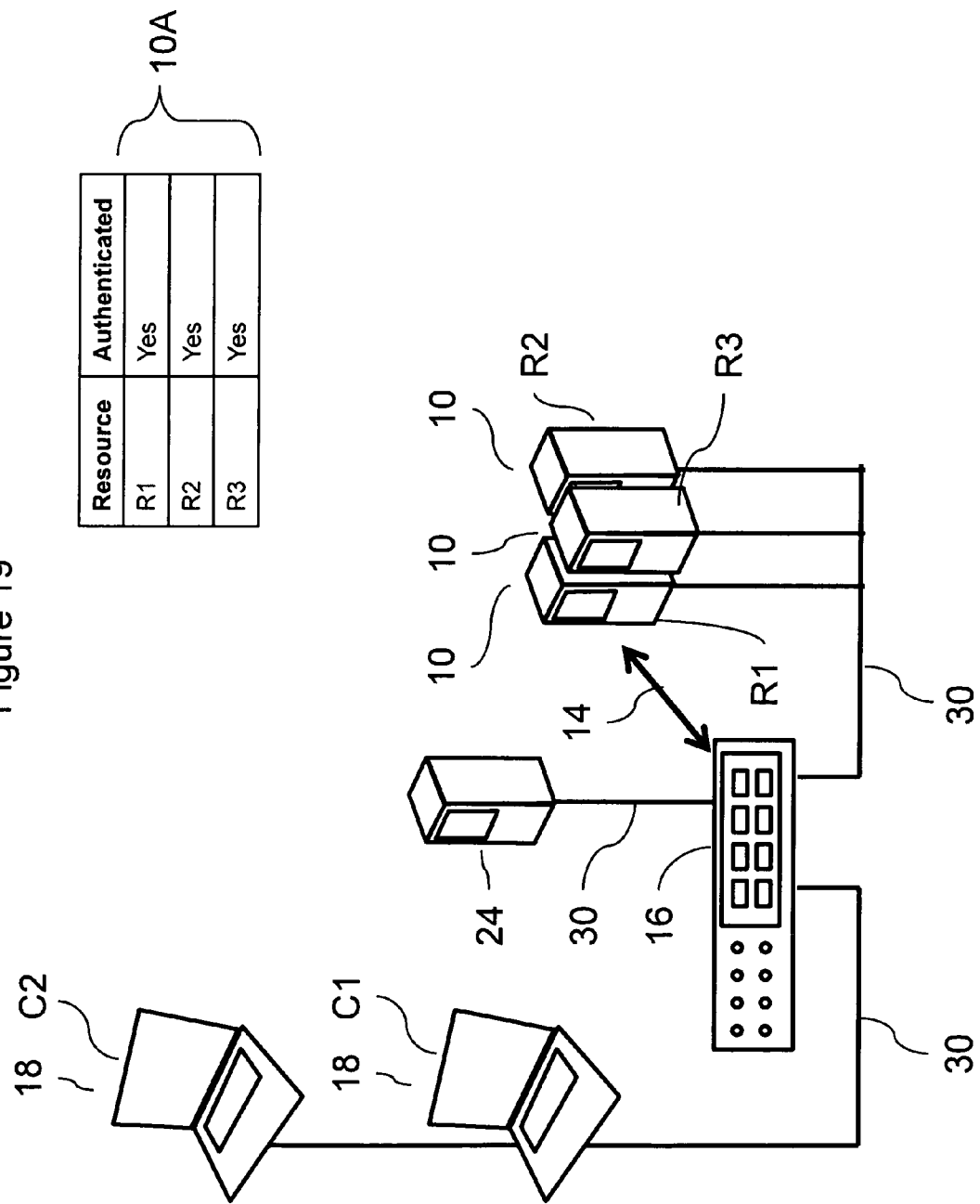
FIG. 19 shows a plurality of network resources authenticating themselves to the trust director.

FIG. 19 shows a plurality of network resources authenticating themselves to the trust director.

Figure 20:
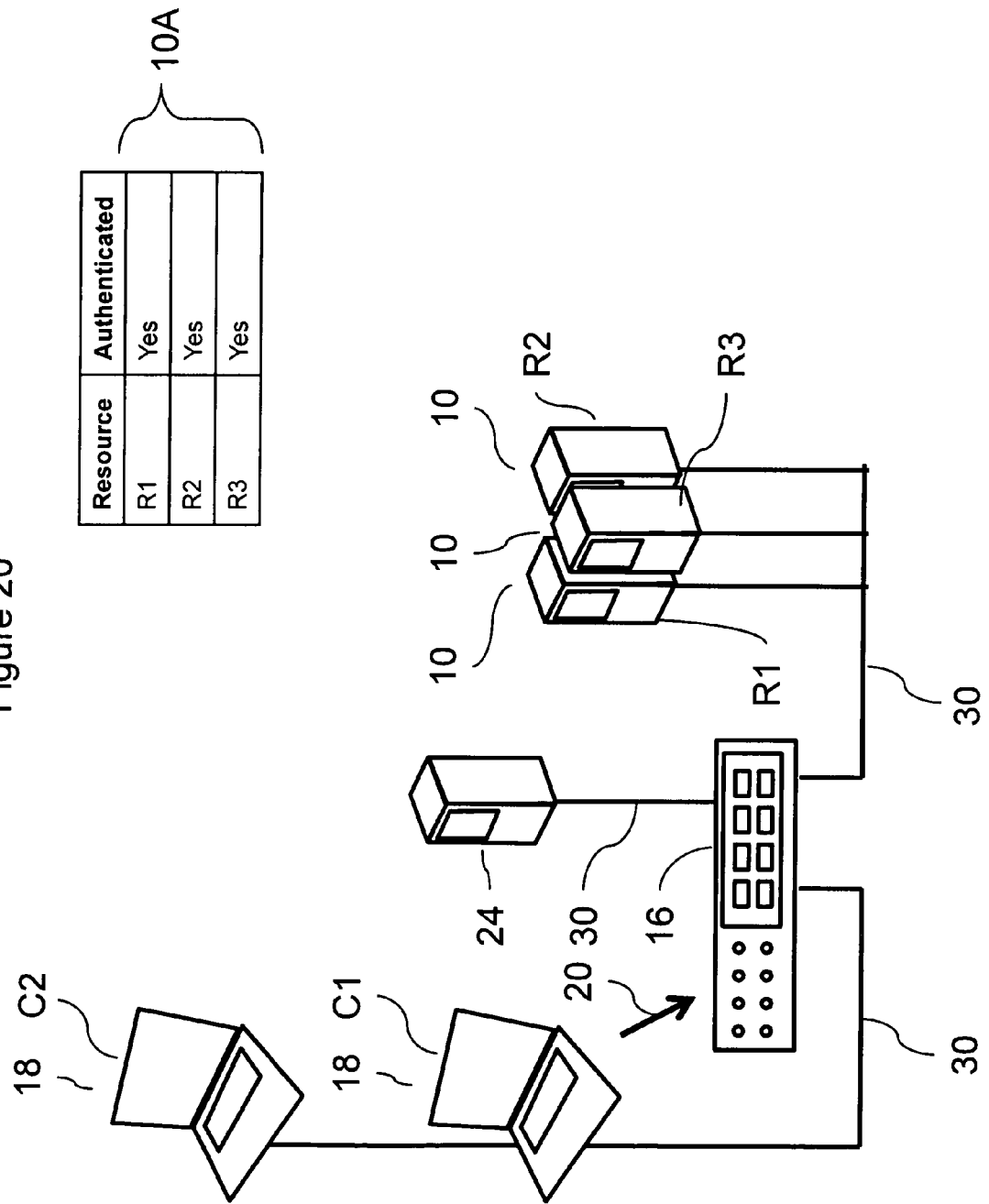
FIG. 20 shows a network client sending a resource request to a trust director.

FIG. 20 shows a network client sending a resource request to a trust director.

Figure 21:
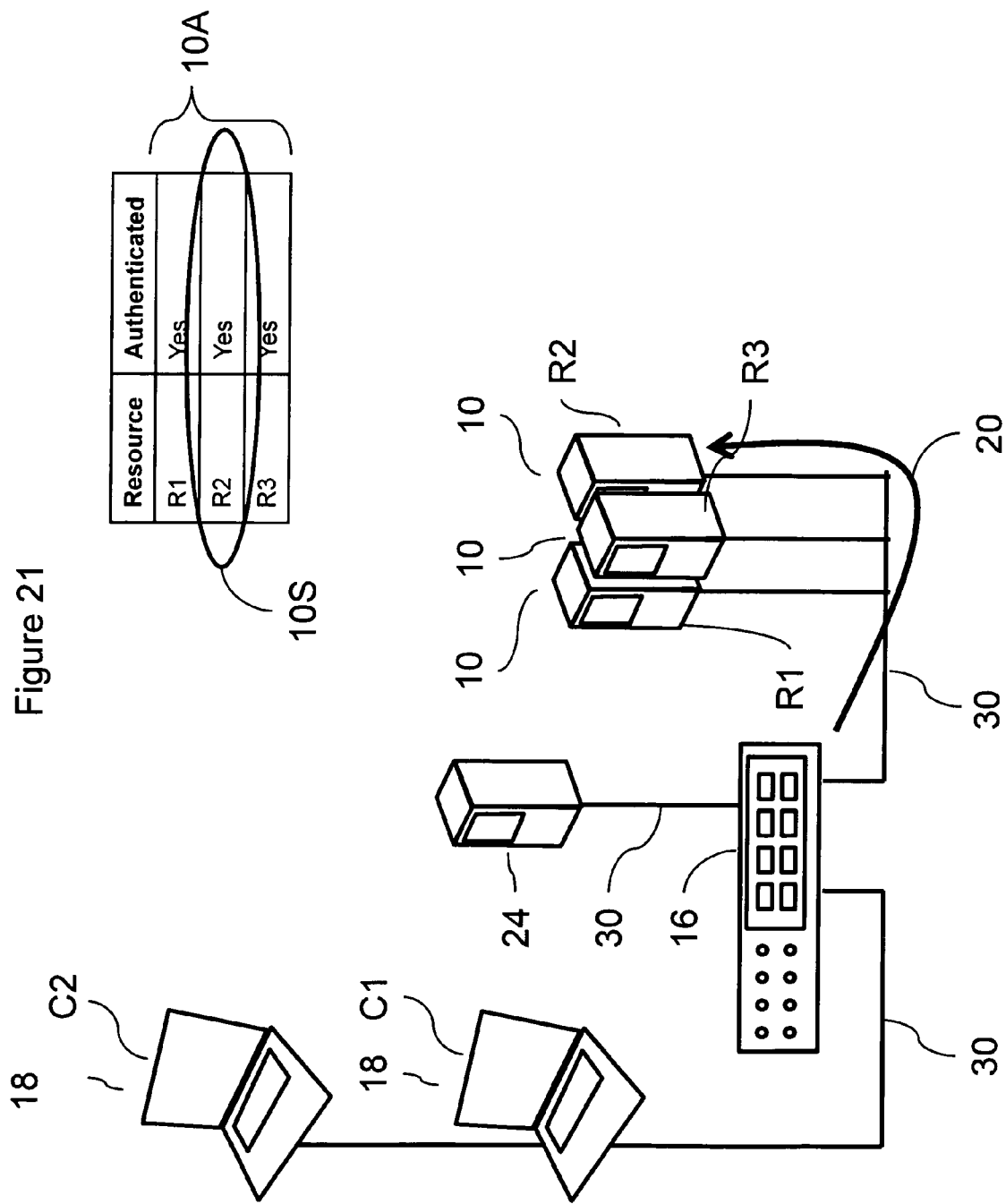
FIG. 21 shows a trust director selecting one of the plurality of authenticated network resources and sending the resource request to the selected network resource.

FIG. 21 shows a trust director selecting one of the plurality of authenticated network resources and sending the resource request to the selected network resource.

Figure 22:
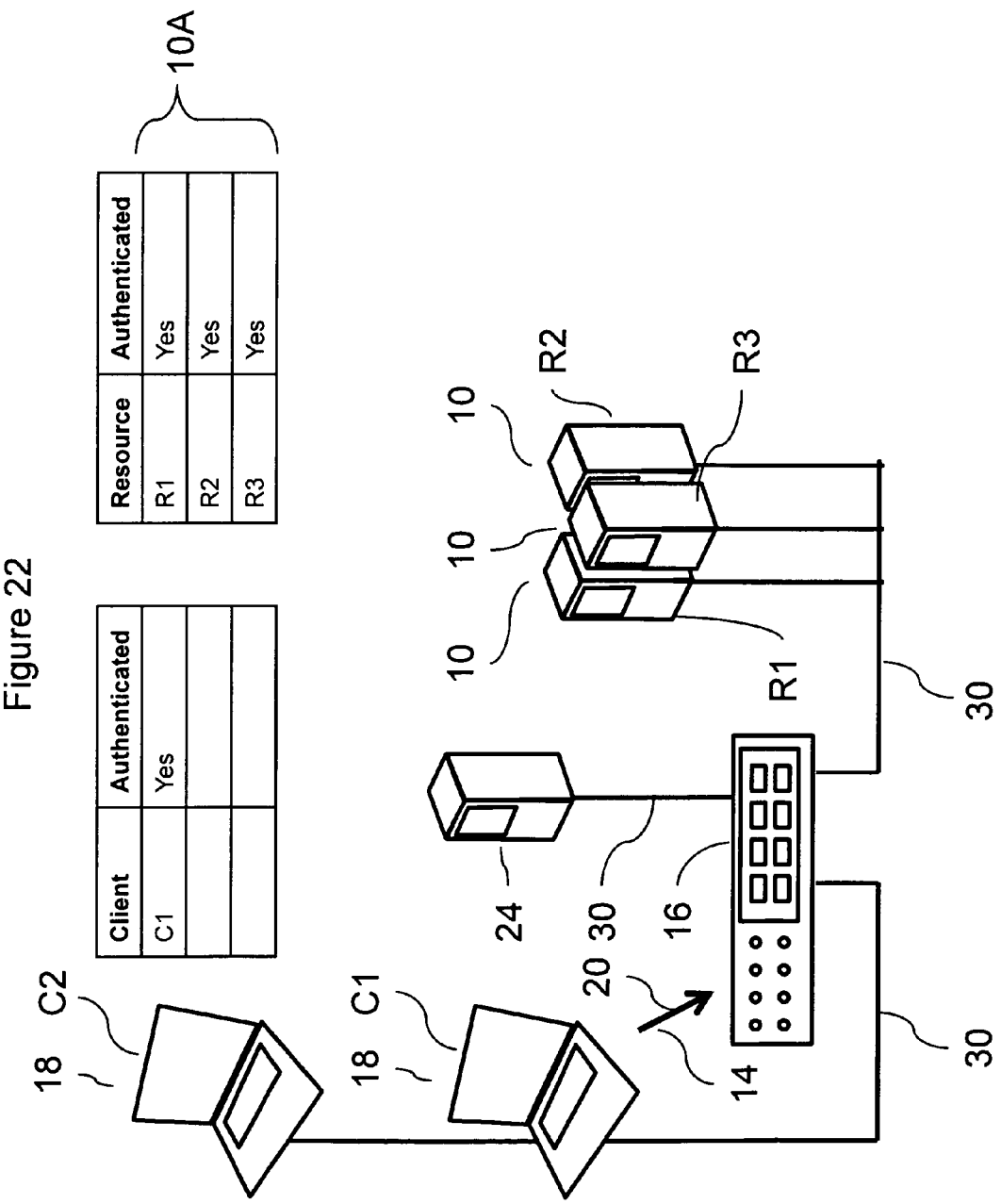
FIG. 22 shows a network client sending a resource request that includes an authentication object to a trust director and being authenticated by the trust director.

FIG. 22 shows a network client sending a resource request that includes an authentication object to a trust director and being authenticated by the trust director.

Figure 23:
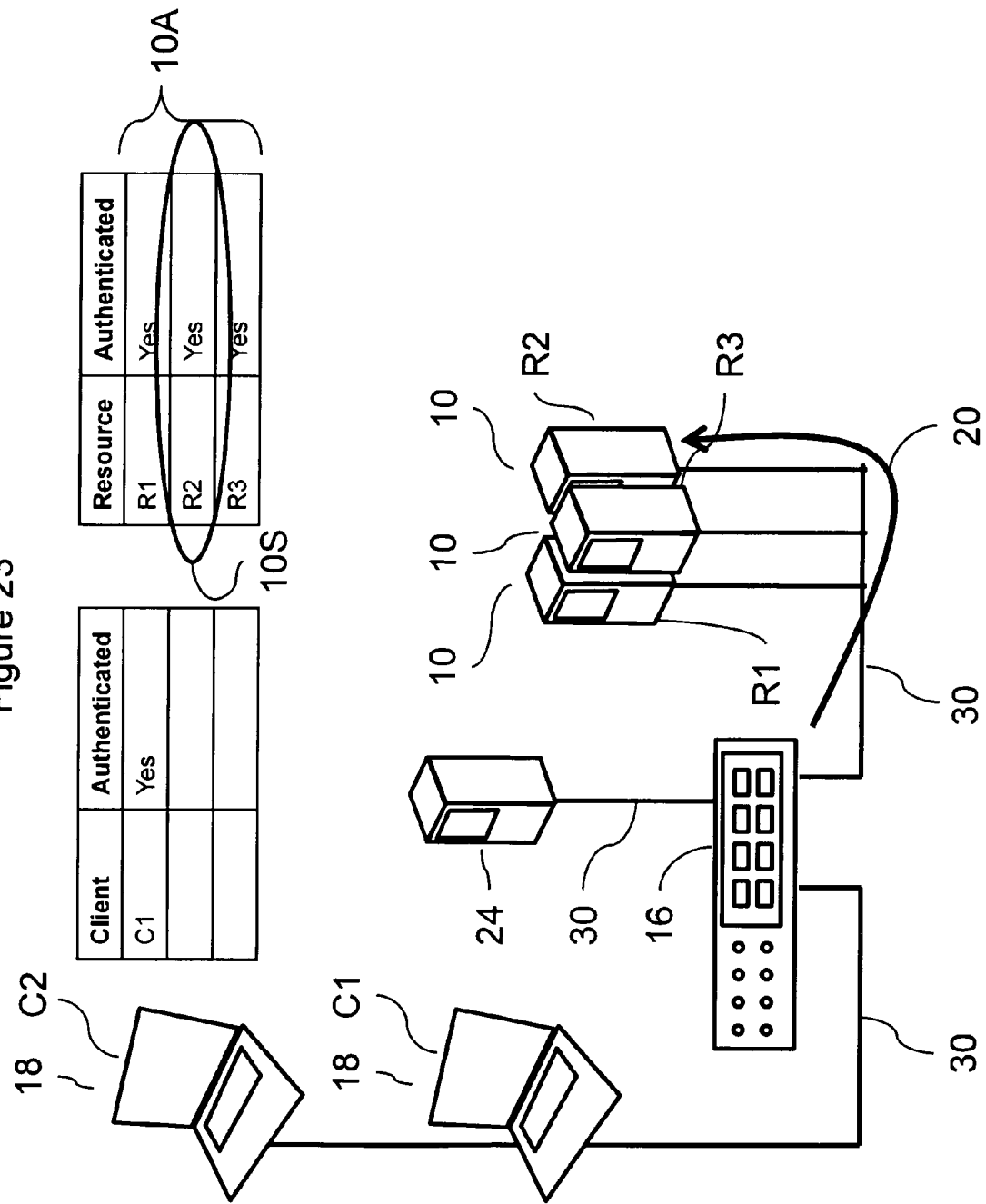
FIG. 23 shows a trust director selecting one of the plurality of authenticated network resources and sending the authenticated resource request to the selected network resource.

FIG. 23 shows a trust director selecting one of the plurality of authenticated network resources and sending the authenticated resource request to the selected network resource.

Figure 24:
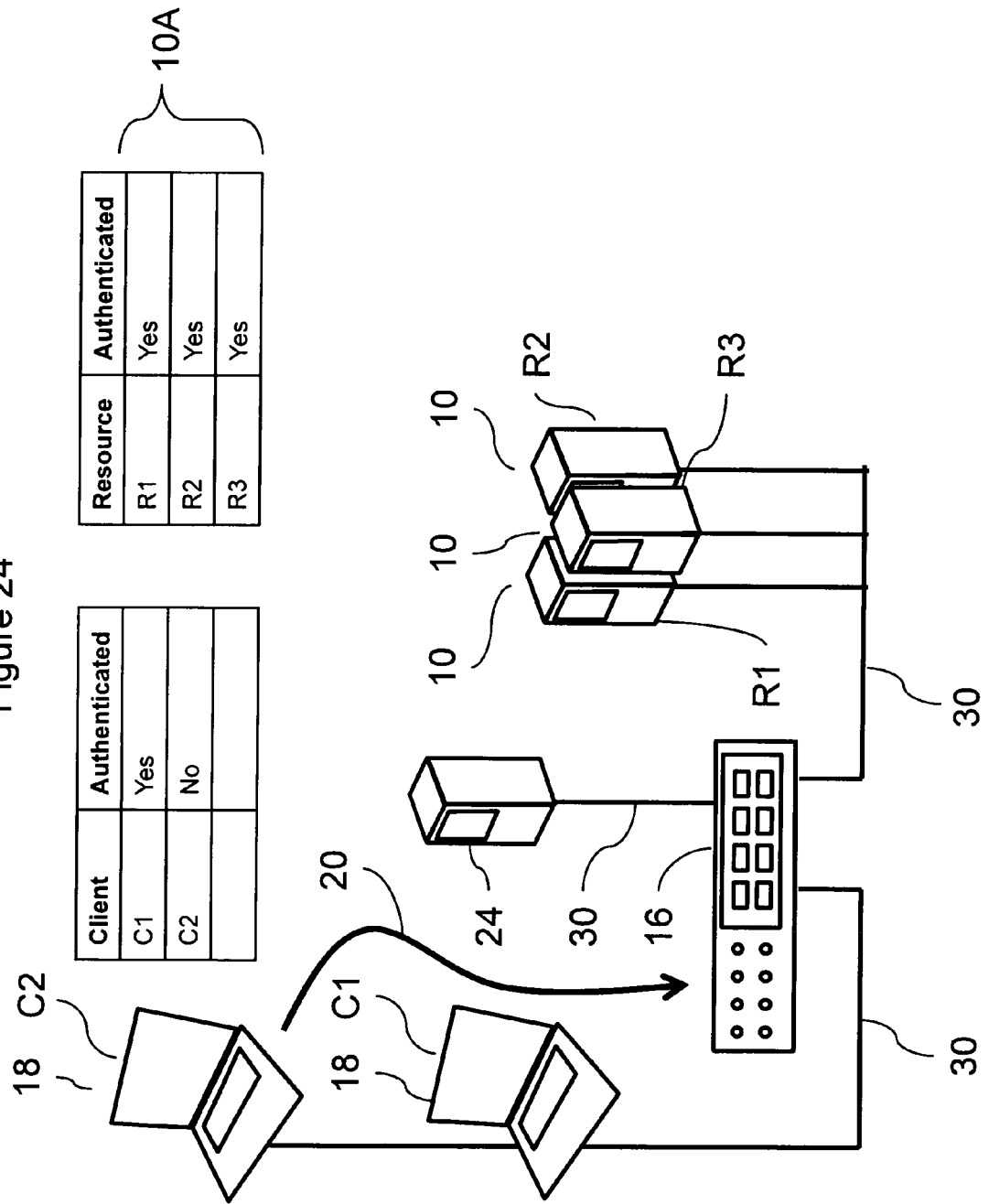
FIG. 24 shows a network client sending a resource request that does not include an authentication object to a trust director and being discarded by the trust director.

FIG. 24 shows a network client sending a resource request that does not include an authentication object to a trust director and being discarded by the trust director.

VI. Methods of Operation

The present invention provides a trust director 16 that receives authentication objects 14 from a plurality of network resources 10. The trust director 16 authenticates the authentication objects 14, and, in successfully authenticating the conveyed authentication objects 14, a network resource 10 becomes an authenticated network resource 10A. The authenticated network resource 10A is added to a group, if one exists, of authenticated network resource 10A resulting in a plurality of authenticated network resources 10A. In accomplishing this, we now have explicitly trusted network resources. An authentication object 14 conveyed by a network resource 10 may be conveyed in a single communication or the authentication object 14 may be conveyed in one or more transactions between the trust director 16 and the network resource. One embodiment uses x.509 certificates as authentication objects 14. An x.509 certificate is a form of a public key certificate (also known as a digital certificate or identity certificate) which is an electronic document which uses a digital signature to bind a public key with an identity. In the present invention, an x.509 certificate is used to convey identity information to the trust director 16. These x.509 certificates are conveyed between the trust director 16 and the network resource 10 using a secure protocol such as Transport Layer Security (TLS) or Datagram Transport Layer Security (DTLS). Other trusted conveyances may also be used. Other forms of digital identity can be used in place of the x.509 certificates, including cryptographic tokens or cryptographic hashes of a shared secret and challenge-response sequences. Each network resource 10 should use a unique identity 12. If an authentication object 14 is not conveyed to the trust director 16 or if the conveyed authentication object 14 is not authenticated, the trust director 16 does not add the new unauthenticated resources to the plurality of authenticated resources 10A. When an authentication object 14 from a network resource 10 is received by a trust director 16, the trust director 16 may convey the authentication object 14 to a management entity 24 to perform authentication of the authentication object 14. The trust director 16 may also convey the success or failure of the authentication of the authentication object 14 to the management entity 24. The authentication performed by the trust director 16 for a given network resource 10 should expire after a period of time, after which the network resource must again convey an authentication object 14 to perform authentication. Upon expiration, the trust director 16 should indicate the expiration to the network resource 10. A network resource 10 should be able to peremptorily convey an authentication object 14 as needed to the trust director 16 to prevent the authentication of an authenticated network resource 10A from expiring.

Once a trust director 16 has authenticated one or more of the plurality of network resources 10 creating one of more authenticated network resources 10A, the trust director 16 is ready to receive resource requests 20 and direct them to a selected authenticated network resource 10SA. A network client 18 conveys a resource request 20 to the trust director 16. The resource request 20 may take many forms, but in a preferred embodiment, the resource request will be a TCP/IP packet containing a TCP-SYN request. A TCP-SYN request is a request to establish a TCP session with the resource indicated by the destination IP address and destination TCP port number. In an alternate embodiment, the resource request 20 will be a UDP/IP packet. A UDP/IP packet is a request to deliver the UDP/IP packet to the resource indicated by the destination IP address and the destination UDP port number. When a network client 18 conveys a resource request 20, the trust director 16 extracts an authentication object 14 from the resource request 20 and authenticates it. Alternatively, the trust director 16 may convey the authentication object 14 to a management entity 24 to perform authentication of the authentication object 14. In one embodiment, when the resource request 20 is in the form of a TCP-SYN packet, the trust director 16 may use TAC to authenticate the authentication object 14 contained within the resource request 20. When TAC is used to provide authentication, the authentication object 14 is a statistical object 26.

Each network client 18 should use an identity unique to that client, described here as a unique client identity 12C. Upon successful authentication, the trust director 16 selects one of the plurality of authenticated network resources 10A that also matches the conveyed resource request 20. A trust director 16 may skip performing authentication of the conveyed resource request 20 and simply select one of the plurality of authenticated network resources 10A that also matches the conveyed resource request 20.

In one embodiment, the matching of conveyed resource requests 20 with a plurality of authenticated network resource 10A occurs in two steps. In the first step, the trust director 16 compares destination TCP port number from the conveyed resource request 20 with the advertised TCP port number of the plurality of authenticated network resources 10A. In the second step, the trust director 16 selects one of the plurality of authenticated network resources 10A that matches the previous comparison. A second selection is made by comparing the number of presently established TCP sessions on each of the plurality of authenticated network resources 10A and selecting the authenticated network resource 10A with the fewest number of established TCP/IP sessions. The rationale for this selection methodology is that the number of established TCP/IP sessions is a good indicator of the present workload of a network resource 10 and direct resource requests 20 to the authenticated network resource 10A with the lowest workload. For network resources 10 that provide resources that do not use TCP/IP, a trust director 16 can maintain workload distribution information and again distribute the resource request 20 to the authenticated network resource 10A with the lowest workload. Other mechanisms that provide a similar result can also be used.

In an alternate embodiment, in the second step, the trust director selects one of the plurality of authenticated network resources 10A that matches the previous comparison. A second selection is made by comparing the number of pending resource requests directed to each of the plurality of authenticated network resources 10A and selecting the authenticated network resource 10A with the fewest number of pending resource requests. The number of TCP/IP connections with a given authenticated network resource 10A can be used as a count of pending resource requests. The rational for this selection methodology is that the number of pending resource requests is a good indicator of the present workload of a network resource 10 and direct resource requests 20 to the authenticated network resource 10A with the lowest workload. Other mechanisms that provide a similar result can also be used.

In a second embodiment, the trust director 16 selects one of the plurality of authentication network resources 10A by generating a hash of the source address and selecting the authenticated network resource 10A associated with the hashed value. The rational for this selection methodology is that the all resource requests from the same address and thus the same network client will be directed to the same resource request. This is a requirement for some system architectures and applications. Other mechanisms that provide a similar result can also be used.

If the conveyed resource request fails to be authenticated, the trust director 16 processes the resource request 20 in accordance with a trust policy 22. A trust policy 22 describes the policies for handling resource requests 20 that meet certain criteria. Examples of trust policy include discarding a resource request, forwarding a resource request, redirecting a resource request to a alternate network resource, or distributing multiple resource requests across a number of network resources each of which are able to provide the requested resource. Trust policy can be used for both authenticated and unauthenticated resource requests. Conceptually, trust policy is the mapping of a condition associated with the authentication (trust) of a resource request with an action to be taken on that resource request. In a preferred embodiment, when a resource request 20 fails authentication, the resource request is discarded. In an alternate embodiment, when a resource request 20 fails authentication, the resource request is directed to a specially designated network resource. This can be a quarantine resource, a honey pot or a remediation server. The specially designated resource may be explicitly authenticated as described here or may be an untrusted or implicitly trusted network resource. For each of these trust policies 22, an indication of the resource request 20, the trust policy 22 and any designated network resource can be indicated to a management entity 24. This indication can take many forms. For example, it may be a message sent across a communications network or it may be a signal within an interproces communications system.

Once an authenticated network resource 10A has been selected, it is considered to be a selected authenticated network resource 10SA. The trust director 16 takes the conveyed resource request 20 and edits the destination IP address and/or the destination TCP port number as necessary to match that of the selected authenticated network resource 10SA. Any additional edits to the resource request 20 including updating the TCP or UDP and IP checksums are also performed. Then the edited resource request 20 is conveyed to the selected authenticated network resource 10SA. The trust director 16 may convey the resource request 20 and the selected authenticated network resource 10SA to a management entity 24. This enables accounting, logging and other administrative functions to be performed by the management entity 24.

To insure that a trust director 16 only conveys resource requests 20 to authenticated network resources 10A that are able to provide the resources advertised, the trust director 16 should perform a periodic health check of each of the plurality of the authenticated network resources. A health check is a resource request 20 generated by the trust director 16 or a management entity 24 for the purpose of determining of a given authenticated network resource 10A is presently capable of providing the requested resource. If the generated resource request 20 is properly responded to by the authenticated network resource 10A, operation of the trust director 16 continues normally. If the generated resource request 20 is not properly responded to by the authenticated network resource 10A, then the authentication of the authenticated network resource 10A is revoked, reducing the previously authenticated network resource 10A to an (unauthenticated) network resource 10. An indication by the trust director 16 should be made to the network resource 10 to indicate that the authentication has been revoked and that an authentication object 14 must again be conveyed to re-establish authentication. The trust director 16 may also convey the change in authentication to a management entity 24.

VII. Apparatus for Directing Requests to Trusted Resources

A trust director 16 can be implemented as a standalone network appliance, as a blade in a network equipment chassis, as a blade in a unified threat manager environment, as a virtual appliance within a virtualized network environment, as a component of a virtualization hypervisor and as a cloud computing service. A trust director 16 can be implemented using CPUs, memory, storage and network interfaces. It may also be implemented using custom semiconductors, ASICs, FPGAs, network processors, massively parallel processors, and any combination of hardware and software.

VIII. Examples of Statistical Objection Identification

Figure 25:
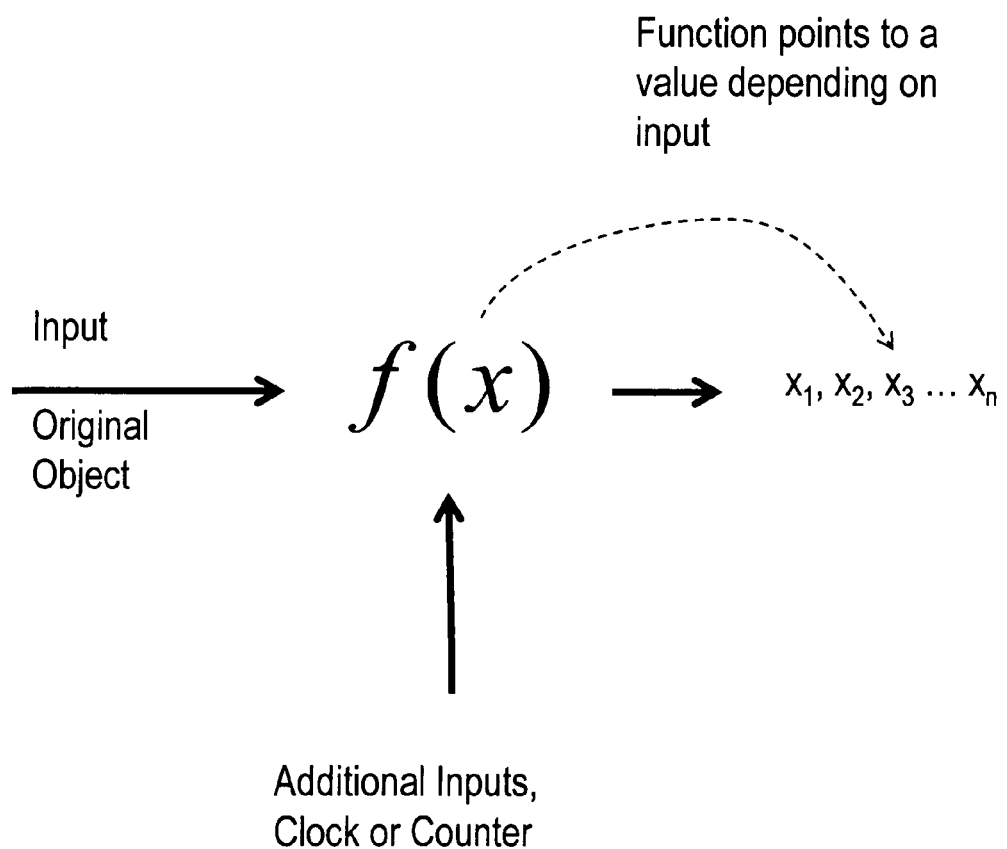
FIG. 25 illustrates the general operation of a hash function.

FIG. 25 illustrates the general operation of a hash function.

Figure 26:
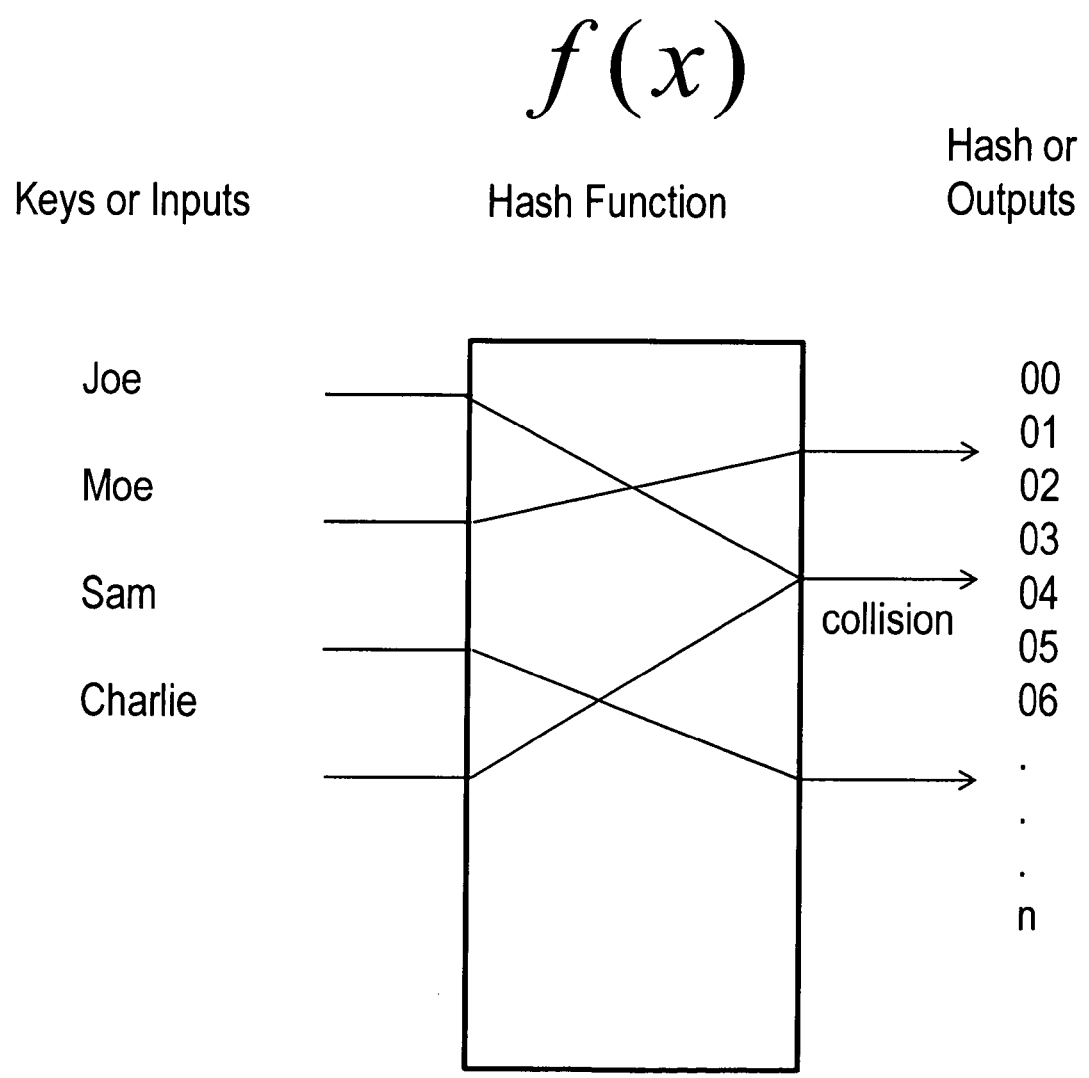
FIG. 26 shows how the hash function, which is illustrated in FIG. 1, maps a set of inputs to a set of outputs.

FIG. 26 shows how the hash function, which is illustrated in FIG. 1, maps a set of inputs to a set of outputs.

Figure 27:
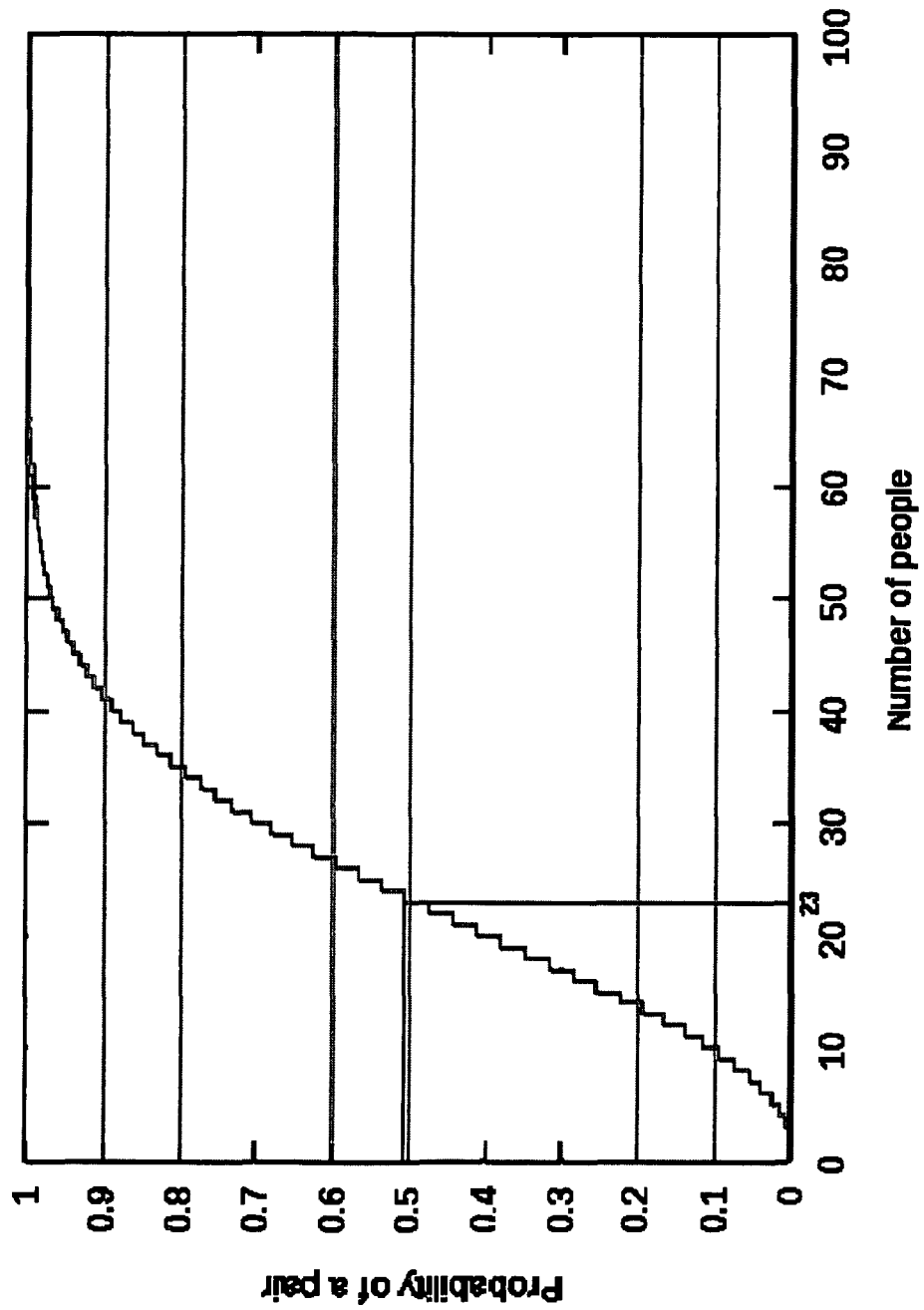
FIG. 27 is a graph that illustrates the birthday problem.

FIG. 27 is a graph that illustrates the birthday problem.

Figure 28:
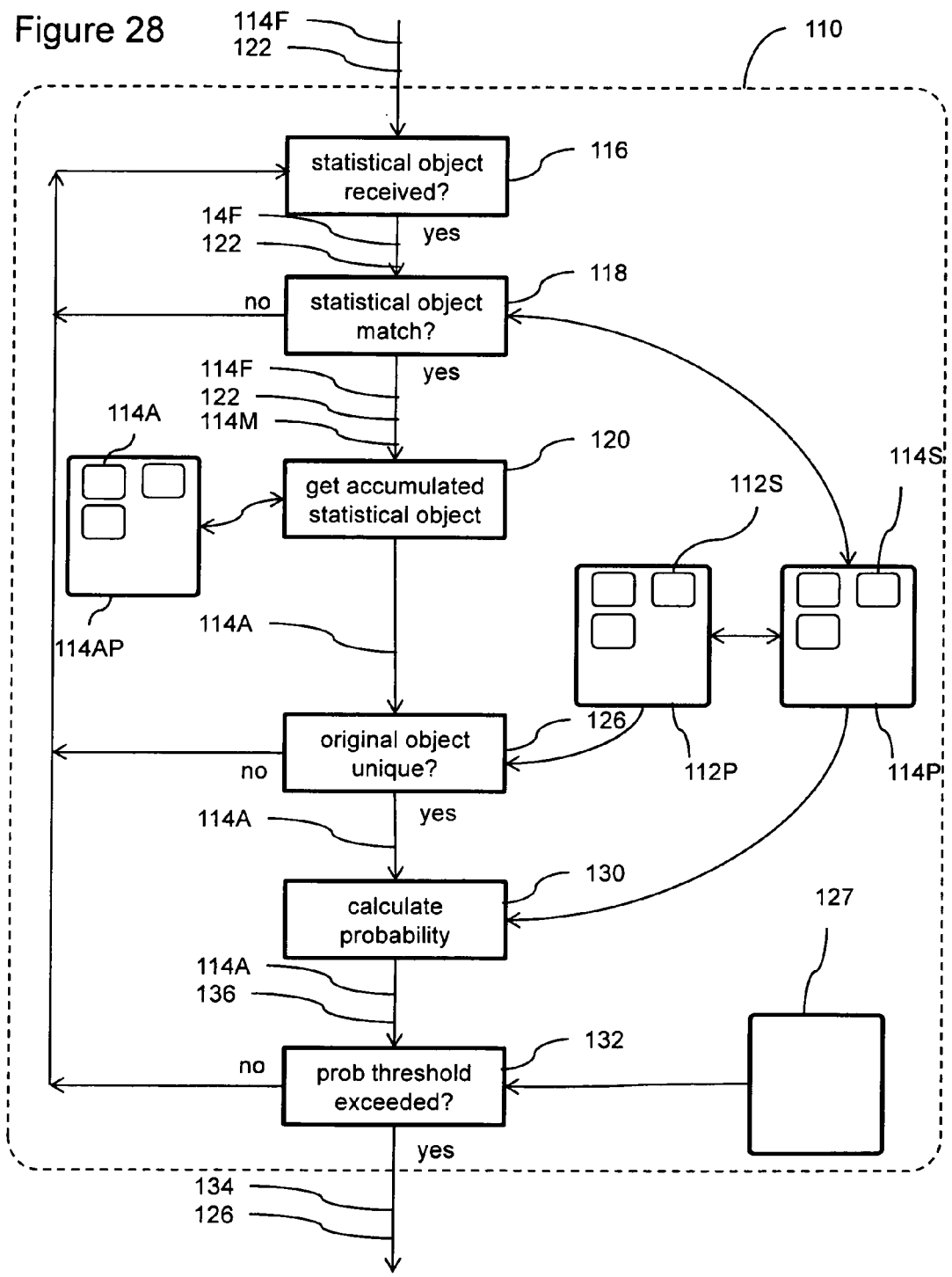
FIG. 28 is an illustration which shows an embodiment of one aspect of the present invention.

FIG. 28 is an illustration which shows an embodiment of one aspect of the present invention.

Figure 29:
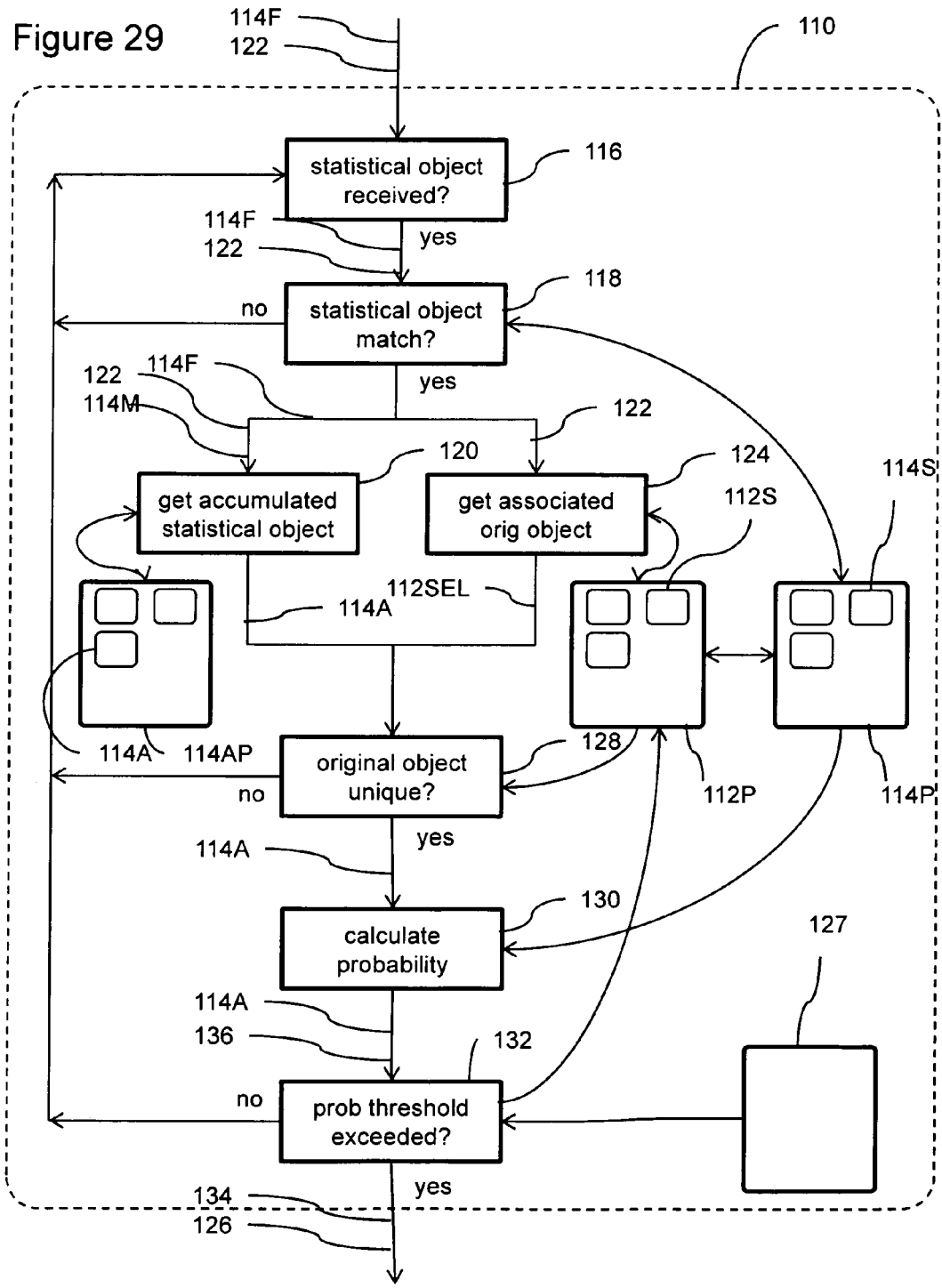
FIG. 29 is an illustration which shows an alternative embodiment of one aspect of the present invention.

FIG. 29 is an illustration which shows an alternative embodiment of one aspect of the present invention.

Figure 30:
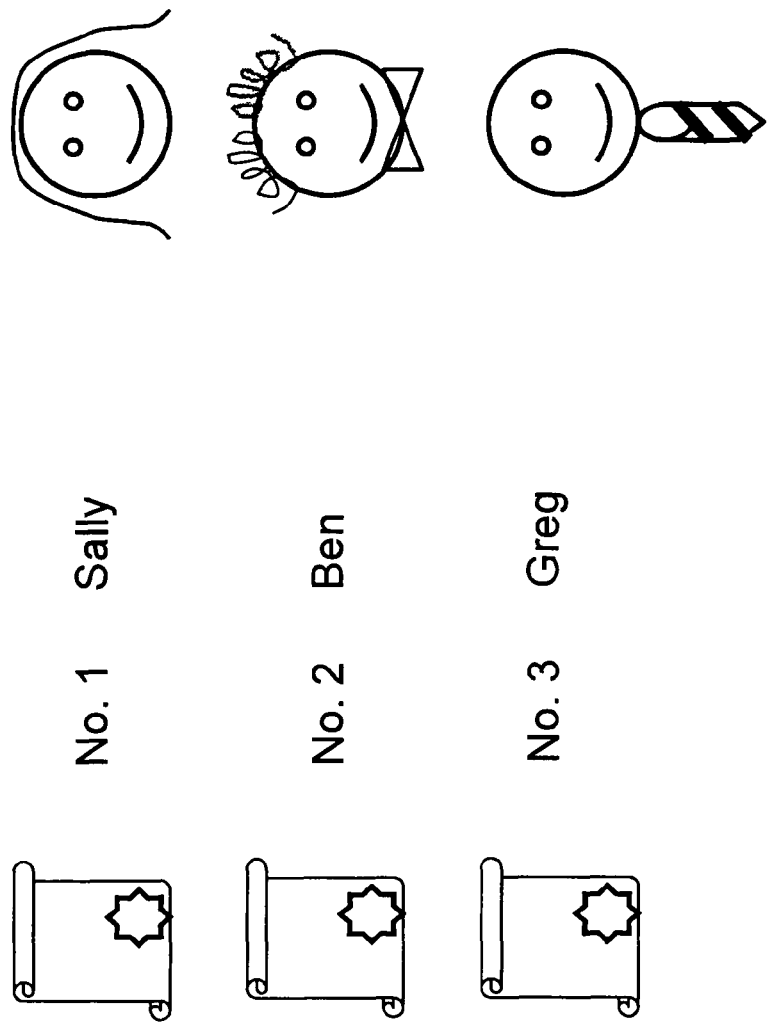
FIG. 30 illustrates certificates that may be used to authenticate a communication.

FIG. 30 illustrates certificates that may be used to authenticate a communication.

Figure 31:
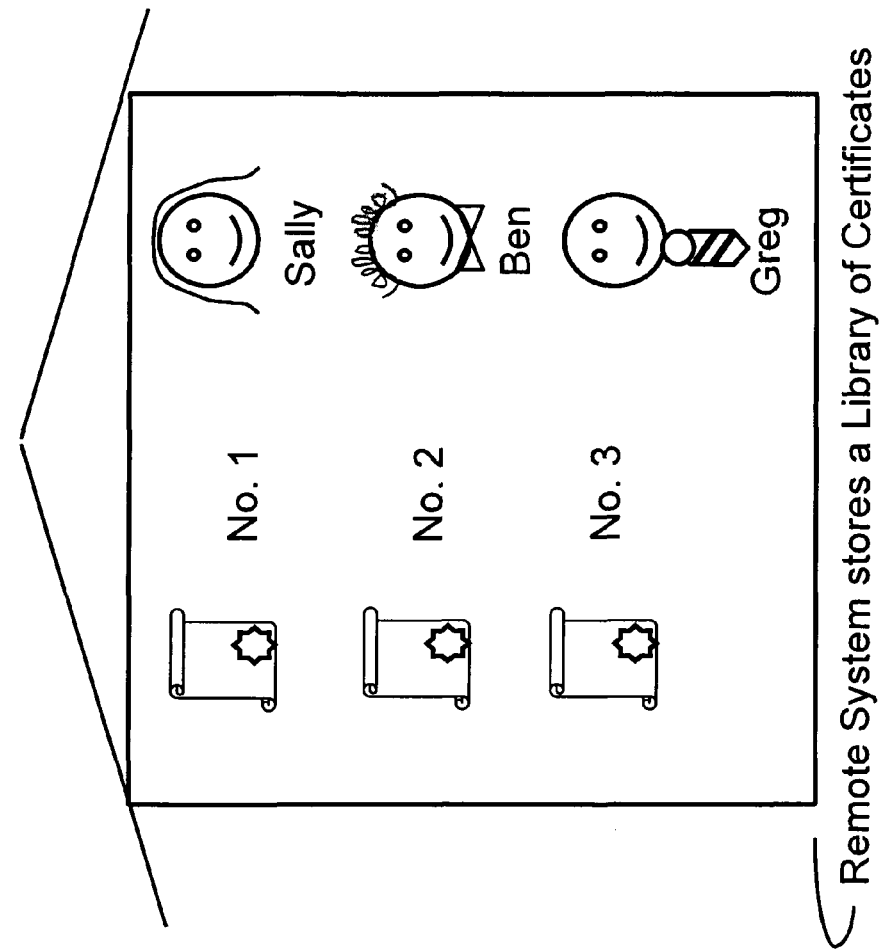
FIG. 31 shows certificates stored in a remote system.

FIG. 31 shows certificates stored in a remote system.

Figure 32:
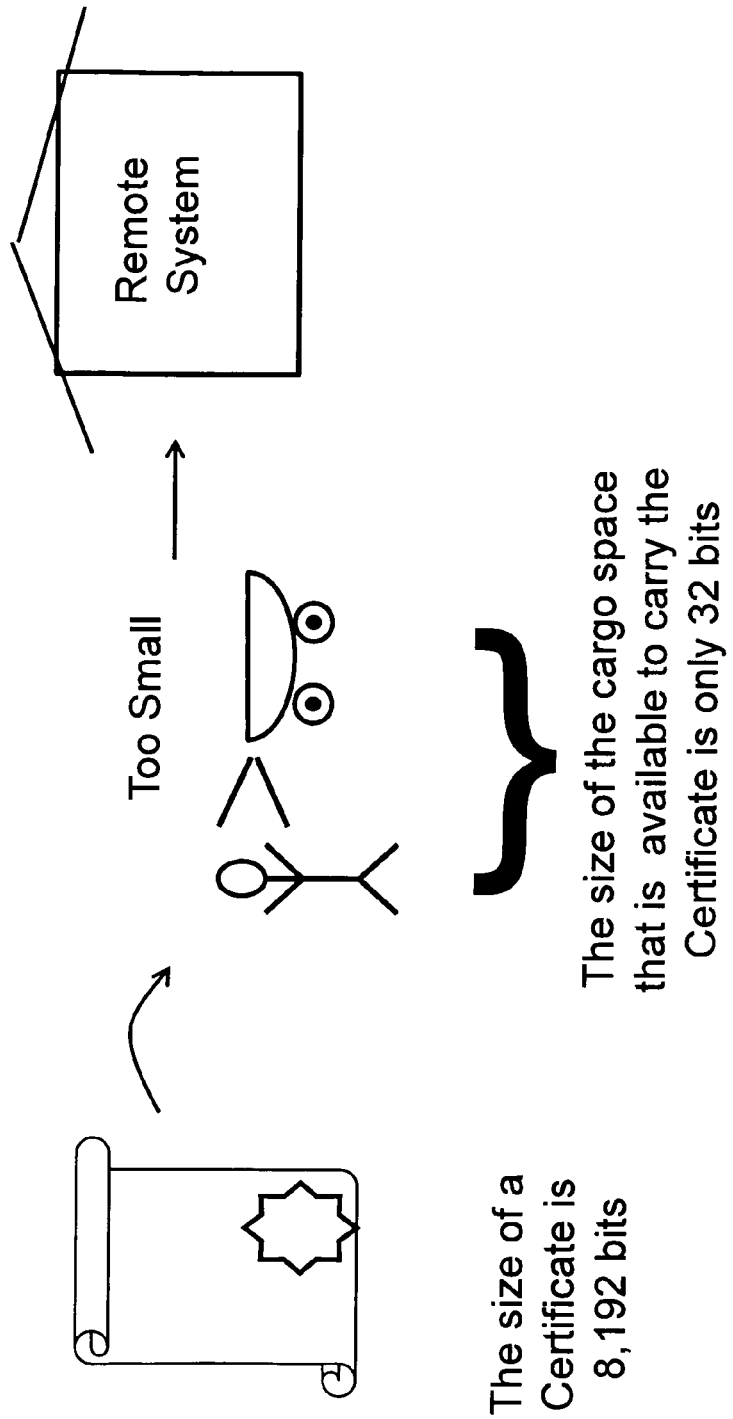
FIG. 32 shows that certificates are too large to send to the remote system in their original form.

FIG. 32 shows that certificates are too large to send to the remote system in their original form.

Figure 33:
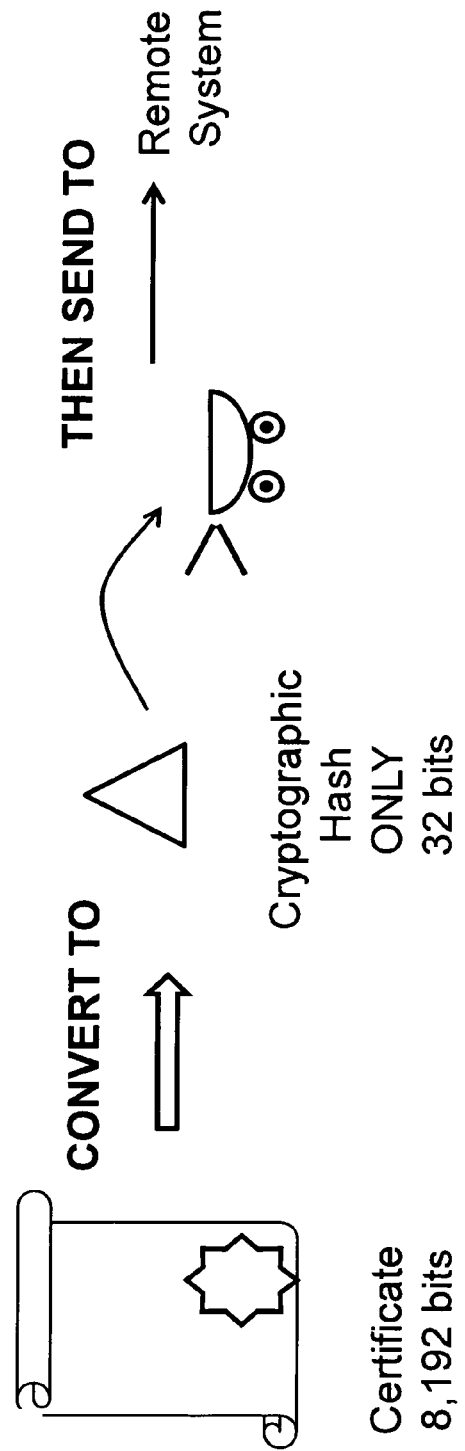
FIG. 33 depicts a solution: converting the certificates, which are original objects, to cryptographic hashes, or statistical objects.

FIG. 33 depicts a solution: converting the certificates, which are original objects, to cryptographic hashes, or statistical objects.

Figure 34:
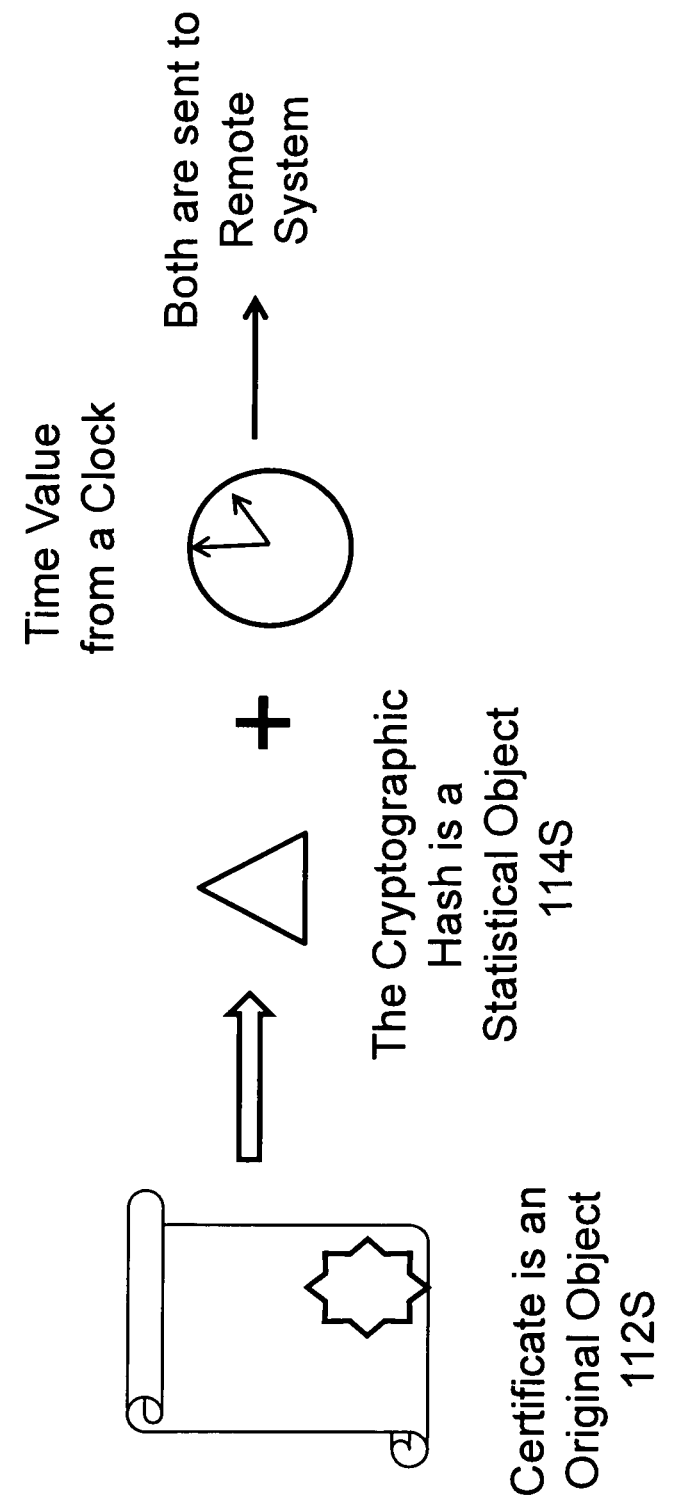
FIG. 34 shows how statistical objects and a time value from a clock are sent to the remote system.

FIG. 34 shows how statistical objects and a time value from a clock are sent to the remote system.

Figure 35:
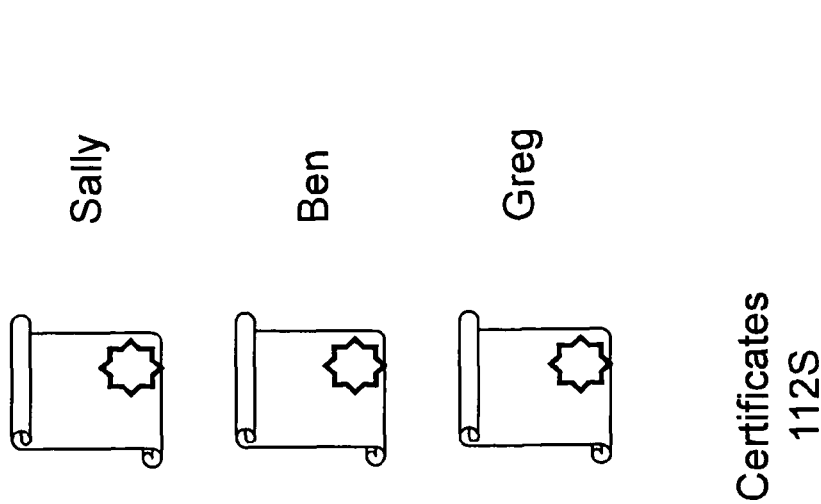
FIG. 35 illustrates the result of the conversion of three original objects to three statistical objects.

FIG. 35 illustrates the result of the conversion of three original objects to three statistical objects.

FIG. 36 furnishes a view of Ben's first communication with the remote system.

FIG. 37 depicts the comparison process that occurs within a statistical object matcher.

FIG. 38 illustrates the role of an accumulated statistical object selector.

FIG. 39 illustrates the function of an accumulated statistical object selector.

FIG. 40 illustrates the task of an original object identifier.

FIG. 41 shows that Ben's first communication has failed to be authenticated.

FIG. 42 supplies a schematic view of Ben's second attempt to communicate with the remote system.

FIG. 43 depicts the second communication, and the resulting match that is produced in the statistical object matcher.

FIG. 44 illustrates the process of finding a match.

FIG. 45 shows how the accumulated statistical object selector discards statistical objects that do not lead to an authenticating match.

FIG. 46 furnishes a view of a probability calculator, which computes the probability of a successful guess of accumulated statistical object information.

FIG. 47 reveals the function of a threshold comparator, which compares the calculated probability to a probability threshold value.

FIG. 48 exhibits the final result, the authentication of Ben's second communication.

One specific, simplified example of the present invention is disclosed in this Section of the Specification. The following example offers a description of:
1. an original object 112S;
2. how that original object 112S is transformed into a statistical object 114S; and
3. how that statistical object 114S is identified as having been generated by the original object 112S.

The numbering convention that is used in this Specification, the Drawings, and the Claims to identify original and statistical objects is presented in Table One:

TABLE ONE

| 110 | Device (In this example, the Remote System) |
|---|---|
| 112M | Matched Original Object |
| 112P | Plurality of Original Objects |
| 112S | Original Object |
| 112SEL | Selected Original Object |
| 114A | Accumulated Statistical Object |
| 114AP | Plurality of Accumulated Statistical Objects |
| 114F | First Statistical Object |
| 114N | New Statistical Object |
| 114S | Statistical Object |

The letter "S" is used to signify a single object, while the letter "P" is used to signify a plurality. The reference character that refers to an original object always includes the numeral "112", while the numeral "114" is always used to refer to a statistical object.

For these examples, we will consider that an original object 112S is an X.509 certificate. An X.509 certificate is used to provide identity, and is digitally signed to prove its authenticity. For this example, the X.509 certificates are 1 KB in size (1024 bytes, 8192 bits). We need to communicate that we are using a specific X.509 certificate to a remote system that has a copy of each X.509 certificate that is expected to be used. Unfortunately, the system was designed before there was a requirement to communicate the X.509 certificates, and there is only enough space to communicate 32 bits worth of information, certainly not enough to send an entire X.509 certificate which is 256 times larger. But still needing to communicate the X.509 certificate, a cryptographic hash, 32 bits in length, is generated for each X.509 certificate and a common clock. The cryptographic hash is a statistical object 114S generated from an original object 112S. Now let us assume that we have 100 of these X.509 certificates, that is 100 original objects 112S. And let us assume that for each original object 112S, we generate a cryptographic hash of each X.509 certificate and a common clock to produce 100 statistical objects 114S each 32 bits in length. For descriptive purposes, three of these X.509 certificates and their corresponding statistical objects will be described. X.509 certificate #1 identifies Sally, and generates a statistical object 114S of value 22443. X.509 certificate #2 identifies Ben, and generates a statistical object 114S of value 32415. X.509 certificate #3 identifies Greg, and also generates a statistical object 114S of value 32415. The device 110 has generated the plurality of statistical objects 114P corresponding to the plurality of original objects 112P.

Now Ben needs to send a communication containing Ben's statistical object to device 110. Device 110 receives Ben's communication using a communications receiver 116. Although we, the narrator, knows that it was Ben that sent the communication to device 110, device 110 does not know this. Ben's communication includes Ben's statistical object (first statistical object 114F) and communications characteristics 122. In this case, the communications occurred over a TCP/IP network and the IP source and destination addresses and the TCP source and destination port numbers are used as communications characteristics 122. The source IP address is 1.1.1.2 and the destination IP address is 1.1.1.3. The source TCP port number is 2000 and the destination TCP port number is 3000. The communications receiver 116 sends the received communications characteristics 122 and Ben's statistical object 114F to the statistical object matcher 118. The statistical object matcher 118 compares Ben's statistical object 114F with the plurality of statistical objects 114P, and determines that there it matches two statistical objects, Ben's and Greg's. The statistical object matcher 118 sends Ben's statistical object 114F, the two matched statistical objects 114M (Ben's and Greg's) and the communications characteristics 122 to the accumulated statistical object selector 120. The accumulated statistical object selector 120 compares Ben's communications characteristics 122 with the plurality of accumulated statistical objects 114AP and finds no matches. Because no matches were found, the accumulated statistical object selector 120 creates a new accumulated statistical object 114A including Ben's statistical object 114F, the two matched statistical objects 114M and the communications characteristics 122. The new accumulated statistical object 114A is added to the plurality of accumulated statistical objects 114AP. The accumulated statistical object information is set to 32 bits to reflect the information contained in statistical object 114F. The accumulated statistical object 114AP is passed to the original object identifier 126. The original object identifier 126 determines that the accumulated statistical object 114AP does not unambiguously identify a single original object 112S. This concludes the operation of the device 110 for the reception of Ben's statistical object. The device 110 does not respond to Ben's communication because it cannot unambiguously determine who sent the communication.

Now Ben, who sent the original communication did not receive a response, so he sends another communication. Since time has passed since the first communication attempt, the clock value used to generate the statistical objects has changed. The new statistical objects and their corresponding X.509 certificates are: X.509 certificate #1 identifies Sally and generates a statistical object 114S of value 84256. X.509 certificate #2 identifies Ben and also generates a statistical object 114S of value 84256. X.509 certificate #3 identifies Greg and generates a statistical object 114S of value 10845. Due to time passing, device 110 regenerates the plurality of statistical objects 114P corresponding to the plurality of original objects 112P which match Sally, Ben and Greg.

Now Ben sends a second communication containing Ben's current statistical object to device 110. Device 110 receives Ben's communication using a communications receiver 116. Ben's communication includes Ben's statistical object 114F and communications characteristics 122. Again, the communications characteristic 122 is source IP address of 1.1.1.2, destination IP address of 1.1.1.3, source TCP port number of 2000 and destination TCP port number of 3000. The communications receiver 116 sends the received communications characteristics 122 and Ben's statistical object 114F to the statistical object matcher 118. The statistical object matcher 118 compares Ben's statistical object 114F with the plurality of statistical objects 114P and determines that there it matches two statistical objects, Ben's and Sally's. The statistical object matcher 118 sends Ben's statistical object 114F, the two matched statistical objects 114M (Ben's and Sally's) and the communications characteristics 122 to the accumulated statistical object selector 120. The accumulated statistical object selector 120 compares Ben's communications characteristics 122 with the plurality of accumulated statistical objects 114AP, and finds a match with Ben's previous communication. The matched accumulated statistical object 114A includes the previous matched statistical object 114M containing Ben and Greg and is compared against the two matched statistical objects 114M matching Ben's statistical object 114F containing Ben and Sally. The intersection of both matched statistical sets is Ben. Greg and Sally are removed from the accumulated statistical object 114A. The accumulated statistical object information increases from 32 bits to 64 bits with the addition of statistical object 114F. The accumulated statistical object 114A is passed to the original object identifier 126. The original object identifier 126 takes the given accumulated statistical object 114A and determines if the accumulated statistical information within the accumulated statistical object could only be generated by a single, unique original object 112S. Original object 112S is Ben's X.509 certificate. Original object 112S is now indicated as selected original object 112SEL, and is passed to the probability calculator 130. The probability calculator 130 takes the given accumulated statistical object 114A, and, based on the number of bits of statistical object information that has been accumulated in the accumulated statistical object 114A and the number of statistical objects in the plurality of statistical objects 114P, calculates the probability of guessing the accumulated statistical object information.

In this example, we have 100 statistical objects and have received 64 bits of statistical object information (32 bits×2). The probability of guessing is calculated by using the formula:

$$p(n;d) \approx 1 - e^{-n^2/(2 \cdot d)}$$

where n is the number of statistical objects in the table of valid statistical objects;

d is the total number of unique statistical objects available; and d is $d=2^b$ where b is the number of bits of statistical object information received.

Therefore:

$$d=2^{64}, n=100 \text{ resulting in } p(100,2^{64}) \approx 1-e^{-100^2/(2 \times 2^{64})},$$
$$p(100,2^{64}) \approx 0.$$

In this case, with only a few original objects (100) and a relatively large amount of accumulated statistical object information, the probability of guessing those 64 bits of accumulated statistical object information is vanishingly small, approaching zero. This calculated probability 136 and the accumulated statistical object 122 are passed to the threshold comparator 132. The threshold comparator 132 takes the calculated probability 136 and compares it with the probability threshold value 127. In our example, the probability threshold value 127 is 1 in a million. The threshold comparator 132 determines that our calculated probability 127 of zero is less than the probability threshold value of 1 in a million. Having not exceeded our probability threshold value 127, the threshold comparator 132 makes an indication 130 that includes the selected original object 112SEL Ben. This indication 130 communicates to other functions within the device 110 that the communication was send by Ben and has not exceeded the probability threshold value 127, and that the device 110 should now respond to Ben's communication.

In a second example, we continue with the first example but change the number of original objects 112S from 100 to 100,000,000 (one hundred million). The calculated probability 136 of guessing the accumulated statistical object 114A with 64 bits of information is 2.674%, greater than the probability threshold value of 1 in a million. Since this is greater than the threshold, this concludes the operation of the device 110 for the reception of Ben's statistical object. The device 110 does not respond to Ben's communication because it has exceeded the probability threshold value 127. Now Ben, who sent the original communications again did not receive a response, so he sends another communication. Device 110 receives Ben's communication using a communications receiver 116. Ben's communication includes Ben's statistical object 114F and communications characteristics 122. Again, the communications characteristic 122 is source IP address of 1.1.1.2, destination IP address of 1.1.1.3, source TCP port number of 2000 and destination TCP port number of 3000.

The communications receiver 116 sends the received communications characteristics 122 and Ben's statistical object 114F to the statistical object matcher 118. The statistical object matcher 118 compares Ben's statistical object 114F with the plurality of statistical objects 114P and determines that there it matches only a single statistical object, Ben's. The statistical object matcher 118 sends Ben's statistical object 114F, the matched statistical object 114M (Ben's) and the communications characteristics 122 to the accumulated statistical object selector 120. The accumulated statistical object selector 120 compares Ben's communications characteristics 122 with the plurality of accumulated statistical objects 114AP, and finds a match with Ben's previous communication. The matched accumulated statistical object 114A includes the previous matched statistical object 114M containing only Ben and is compared against the matched statistical object 114M matching Ben's statistical object 114F containing Ben. The intersection of both matched statistical sets is Ben. The accumulated statistical object information increases from 64 bits to 96 bits with the addition of statistical object 114F. The accumulated statistical object 114A is passed to the original object identifier 126. The original object identifier 126 takes the given accumulated statistical object 114A and determines if the accumulated statistical information within the accumulated statistical object could only be generated by a single, unique original object 112S. Original object 112S is Ben's X.509 certificate. Original object 112S is now indicated as selected original object 112SEL, and is passed to the probability calculator 30. The probability calculator 130 takes the given accumulated statistical object 122, and, based on the number of bits of statistical object information that has been accumulated in the accumulated statistical object 122 and the number of statistical objects in the plurality of statistical objects 114P, calculates the probability of guessing the accumulated statistical object information. In a second example, we continue with the first example but change the number of original objects 112S from 100 to 100,000,000 (one hundred million). The calculated probability 136 of guessing the accumulated statistical object 114A with 96 bits of information is again vanishingly small, approaching zero. This calculated probability 136 and the accumulated statistical object 122 are passed to the threshold comparator 132. The threshold comparator 132 takes the calculated probability 136 and compares it with the probability threshold value 127. The threshold comparator 132 determines that our calculated probability 127 of 0 is less than the probability threshold value of 1 in a million. Having not exceeded our probability threshold value 127, the threshold comparator 132 makes an indication 30 that includes the selected original object 112SEL Ben. This indication 30 communicates to other functions within the device 110 that the communication was send by Ben and has not exceeded the probability threshold value 127 and that the device 110 should now respond to Ben's communication.

In a third example, we continue with the second example and add an association of the selected original object 112SEL (Ben) and the communications characteristics 122. This allows for the optimization of subsequence communication requests from Ben.

Continuing with the third example, Ben makes another communication to device 110 during which within device 110 an association exists between Ben's original object and the communications characteristics 122 of Ben's previous communication. Device 110 receives Ben's communication using a communications receiver 116. Ben's communication includes Ben's statistical object (first statistical object 114F) and communications characteristics 122. This time, the communications characteristics 122 is source IP address of 1.1.1.2, destination IP address of 1.1.1.3, source TCP port number of 5000 and destination TCP port number of 7000. The source IP address is the same source IP address that was used in the prior, accepted communications. The statistical object matcher 118 compares Ben's statistical object 114F with the plurality of statistical objects 114P, and determines that there it matches two statistical objects, Ben's and Greg's. The statistical object matcher 118 sends Ben's statistical object 114F, the two matched statistical objects 114M (Ben's and Greg's) and the communications characteristics 122 to the accumulated statistical object selector 120 and sends the communications characteristics 122 to the associated original object selector 124. The accumulated statistical object selector 120 compares Ben's communications characteristics 122 with the plurality of accumulated statistical objects 114AP and finds no matches. Because no matches were found, the accumulated statistical object selector 120 creates a new accumulated statistical object 114A including Ben's statistical object 114F, the two matched statistical objects 114M and the communications characteristics 122. The new accumulated statistical object 114A is added to the plurality of accumulated statistical objects 114AP. The accumulated statistical object information is set to 32 bits to reflect the information contained in statistical object 114F. The accumulated statistical object selector 120 sends the accumulated statistical object 114A to the associated original object identifier 128.

The associated original object selector 124 receives the communications characteristics 122, and compares them with the communications characteristics 122 associated with the plurality of original objects 112P. Because an association exists between Ben's original object and Ben's communications characteristics 122, the associated original object selector 124 selects Ben's original object, indicated as 112SEL and passes the selected original object 112SEL to the associated original object identifier 128.

The associated original object identifier 128 takes the accumulated statistical object 114A and the selected original object 112SEL (Ben) and insures that the accumulated statistical object 114A could have been generated from the selected original object 112SEL. Upon determining that the accumulated statistical object 114A was producible by the selected original object 112SEL, the intersection of the original objects 114 is calculated using the original objects associated with the matched statistical objects 114M (Ben and Greg) and the selected original object 112SEL (Ben) resulting in Ben. This intersection is indicated in the accumulated statistical object 114A. Since there is exactly one original object now contained in the accumulated statistical object 114A, the accumulated statistical object 114A is sent to the probability calculator 130.

The probability calculator 30 takes the given accumulated statistical object 114A, and, based on the number of bits of statistical object information that has been accumulated in the accumulated statistical object 114A and the number of statistical objects in the plurality of statistical objects 114P, calculates the probability of guessing the accumulated statistical object information.

In this example, we have 100,000,000 statistical objects and have received 32 bits of statistical object information, but we have only a single statistical object that is associated with the Ben's communications characteristics 122. Therefore, instead of using 100,000,000 as the number of statistical objects, the number of statistical objects is 1, resulting in a calculated probability 36 of $p=\frac{1}{2^{32}}$. This calculated probability 136 and the accumulated statistical object 122 are passed to the threshold comparator 132. The threshold comparator 132 takes the calculated probability 136 and compares it with the probability threshold value 127. The threshold comparator 132 determines that our calculated probability 127 of $p=\frac{1}{2}^{32}$ is less than the probability threshold value of 1 in a million. Having not exceeded our probability threshold value 127, the threshold comparator 132 makes an indication 130 that includes the selected original object 112SEL Ben. This indication 130 communicates to other functions within the device 110 that the communication was send by Ben and has exceeded the probability threshold value 127 and that the device 110 should now respond to Ben's communication. It should be noted that in this third example, because we are using the communications characteristics 122 associated with the original object 112, we can arrive at an selected original object 112SEL and not exceed the probability threshold value 127 while receiving fewer bits of information from the received statistical object 114F.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing an efficient means for statistical object identity that have been disclosed above are intended to educate the reader about preferred embodiments of the invention, and are not intended to constrain the limits of the invention or the scope of Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

C1 Network Client 1
C2 Network Client 2
R1 Network Resource 1
R2 Network Resource 2
R3 Network Resource 3
10 Network Resource
10A Authenticated Network Resource
10SA Selected Authenticated Network Resource
10U Network Resource
12 Unique Identity
12C Unique Client Identity
14 Authentication Object
16 Trust Director
18 Network Client
20 Resource Request
22 Trust Policy
24 Management Entity
26 Statistical Object
30 Network
110 Device (Remote System)
112M Matched Original Object
112P Plurality of Original Objects
112S Original Object
112SEL Selected Original Object
114A Accumulated Statistical Object
114AP Plurality of Accumulated Statistical Objects
114F First Statistical Object
114M Matching Statistical Object
114MA Matching Accumulated Statistical Object
114 MP Plurality of Matching Statistical Objects
114N New Statistical Object
114P Plurality of Statistical Objects
114S Statistical Object
116 Communications Receiver
118 Statistical Object Matcher
120 Accumulated Statistical Object Selector
122 Communications Characteristics
124 Associated Original Object Selector
126 Original Object Identifier
127 Probability Threshold Value
128 Associated Original Object Identifier
130 Probability Calculator
132 Threshold Comparator
134 Indication
136 Calculated Probability
(All components from 112M to 136 are included in device 110).

What is claimed is:

1. A method comprising the steps of:
providing a plurality of network resources (10);
each network resource (10) of said plurality of network resources (10) using transport access control to convey an authentication object (14) to a trust director (16);
said transport access control providing authentication without first requiring the establishment of a TCP session which strengthens the security of each of said plurality of network resources (10);
said trust director (16) using said conveyed authentication object (14) to authenticate each of said plurality of network resources (10);
providing a network client (18);
said network client (18) conveying a resource request (20) to said trust director (16);
said trust director (16) selecting one of said authenticated plurality of network resources (10A) that matches said conveyed resource request (20); and
said trust director (16) conveying said conveyed resource request (20) to said selected authenticated network resource (10SA).

2. A method as recited in claim 1, in which:
said authentication object (14) includes identity information.

3. A method as recited in claim 1, in which:
said network resource (10) includes a unique identity (12).

4. A method as recited in claim 1, in which:
the authentication of said network resource expires after a period of time.

5. A method as recited in claim 1, in which:
the selection of one of said authenticated plurality of network resources (10) is based on a number of resource requests currently pending on each of said plurality of network resources.

6. A method as recited in claim 1, in which:
the selection of one of said authenticated plurality of network resources (10) is based on a statistical distribution that results in the selection of said selected authenticated network resource (10SA) for every resource request by said network client.

7. A method as recited in claim 1, which includes the additional steps of:
determining if each of said authenticated plurality of network resources (10) is presently able to provide an advertised resource when a resource request is presented to it; and revoking said authentication of network resource when said network resource is unable to provide said advertised resource when requested.

8. A method as recited in claim 1, which includes the additional steps of:
indicating said selected authenticated network resource (10SA) to a management entity (24).

9. A method as recited in claim 1, in which:
said conveyance of said resource request (20) from said trust director (16) to said selected authenticated network resource (10SA) is indicated by editing a destination address of said resource request (20) to indicate an destination address of said selected authenticated network resource (10SA).

10. A method as recited in claim 1, in which:
said conveyance of said resource request (20) from said trust director (16) to said selected authenticated network resource (10SA) is indicated by editing the destination port number of said resource request (20) to indicate a destination port number of said selected authenticated network resource (10SA).

11. A method comprising the steps of:
providing a plurality of network resources (10);
each network resource (10) of said plurality of network resources (10) conveying an authentication object (14) to a trust director (16);
said trust director (16) using said conveyed authentication object (14) to authenticate each of said plurality of network resources (10);
providing a network client (18);
said network client (18) using transport access control to convey a resource request (20) to said trust director (16);
said transport access control providing authentication without first requiring the establishment of a TCP session which strengthens the security of said network client (18);
said resource request (20) containing a second authentication object (14);
said trust director (16) using said second authentication object (14) to authenticate said network client (18);
said trust director (16) selecting one of said authenticated plurality of network resources (10A) that matches said conveyed resource request (20); and
said trust director (16) conveying said conveyed resource request (20) to said selected authenticated network resource (10SA).

12. A method as recited in claim 11, in which:
said second authentication object (14) includes identity information.

13. A method as recited in claim 11, in which:
said network client (18) includes a unique client identity (12C).

14. A method as recited in claim 11, in which:
said network resource (10) includes a unique identity (12).

15. A method as recited in claim 11, in which:
said authentication of said network resource expires after a period of time.

16. A method as recited in claim 11, in which:
the selection of one of said authenticated plurality of network resources (10) is based on the number of resource requests currently pending on each of said plurality of network resources.

17. A method as recited in claim 11, in which:
the selection of one of said authenticated plurality of network resources (10) is based on a statistical distribution that results in the selection of said selected authenticated network resource (10SA) for every resource request by said network client.

18. A method as recited in claim 11, which includes the additional steps of:
determining if each of said authenticated plurality of network resources (10) is presently able to provide an advertised resource when said resource request is presented to it; and revoking said authentication of network resource when said network resource is unable to provide said advertised resource when requested.

19. A method as recited in claim 11, which includes the additional steps of:
indicating said selection to a management entity (24).

20. A method as recited in claim 11, in which:
said authentication object (14) contained in said resource request (20) is a statistical object (26).

21. A method comprising the steps of:
providing a plurality of network resources (10);
each network resource (10) of said plurality of network resources (10) conveying an authentication object (14) to a trust director (16);
said trust director (16) using said conveyed authentication object (14) to authenticate each of said plurality of network resources (10);
providing a network client (18);
said network client (18) using transport access control to convey a resource request (20) to said trust director (16);
said transport access control providing authentication without first requiring the establishment of a TCP session which strengthens the security of said network client (18);
said resource request (20) containing a second authentication object (14);
said trust director (16) failing to authenticate said network client (18) using said second authentication object (14); and
said trust director (16) processing said conveyed resource request (20) in accordance with a trust policy (22).

22. A method as recited in claim 21, in which:
said second authentication object (14) includes identity information.

23. A method as recited in claim 21, in which:
said network resource (10) includes a unique identity (12).

24. A method as recited in claim 21, in which:
the authentication of said network resource expires after a period of time.

25. A method as recited in claim 21, which includes the additional steps of:
determining if each of said authenticated plurality of network resources (10) is presently able to provide an advertised resource when a resource request is presented to it; and revoking said authentication of network resource when said network resource is unable to provide said advertised resource when requested.

26. A method as recited in claim 21, in which:
said trust policy (22) includes discarding said resource request (20).

27. A method as recited in claim 21, in which:
said trust policy (22) includes conveying said resource request (20) to a management entity (24).

* * * * *